(12) United States Patent
Ezrahi

(10) Patent No.: US 12,008,512 B2
(45) Date of Patent: Jun. 11, 2024

(54) SYSTEMS METHODS DEVICES CIRCUITS AND MACHINE EXECUTABLE CODE FOR USER-INTERACTIVE DYNAMIC LUGGAGE ROUTING

(71) Applicant: Ariel Ezrahi, Tel-Aviv (IL)

(72) Inventor: Ariel Ezrahi, Tel-Aviv (IL)

(*) Notice: Subject to any disclaimer, the term of this patent is extended or adjusted under 35 U.S.C. 154(b) by 0 days.

(21) Appl. No.: 17/785,499

(22) PCT Filed: Dec. 16, 2020

(86) PCT No.: PCT/IL2020/051294
§ 371 (c)(1),
(2) Date: Jun. 15, 2022

(87) PCT Pub. No.: WO2021/124327
PCT Pub. Date: Jun. 24, 2021

(65) Prior Publication Data
US 2023/0031219 A1 Feb. 2, 2023

Related U.S. Application Data

(60) Provisional application No. 62/988,512, filed on Mar. 12, 2020, provisional application No. 62/967,887, (Continued)

(51) Int. Cl.
*G06Q 10/0833* (2023.01)
*B64F 1/36* (2017.01)

(52) U.S. Cl.
CPC ......... *G06Q 10/0833* (2013.01); *B64F 1/368* (2013.01)

(58) Field of Classification Search
CPC ............... G06Q 10/0833; B64F 1/368
See application file for complete search history.

(56) References Cited

U.S. PATENT DOCUMENTS

2004/0111279 A1* 6/2004 Schoen ............... G06Q 20/102
705/40
2005/0246224 A1* 11/2005 McKanna ............. G06Q 10/08
705/13
(Continued)

FOREIGN PATENT DOCUMENTS

CN 109257695 A * 1/2019 ............. H04W 4/02

OTHER PUBLICATIONS

Newsbytes News Network, "Bluetooth Intelligent Luggage Tagging On The Way," Washingtonpost Newsweek Interactive, Mar. 9, 2001.*

*Primary Examiner* — Nathan Erb

(57) ABSTRACT

Disclosed are systems for dynamically routing a luggage item, including a system server for receiving and associating each of a set of unique identifiers of checked-in luggage items, with unique identifiers of their checking-in passengers. One or more luggage identifier acquisition devices, positioned along the routes of an arrival terminal's luggage handling system, acquire and relay to the system server the identifiers of luggage items mobilized through the luggage handling system, as they pass specific luggage identifier acquisition devices. The system server sends a notification to a passenger associated with a luggage item identifier acquired by a specific luggage identifier acquisition device, wherein the notification includes an indication relating to the position of the luggage item along the routes of the arrival terminal's luggage handling system, based on the known position of the specific luggage identifier acquisition device.

4 Claims, 33 Drawing Sheets

Related U.S. Application Data filed on Jan. 30, 2020, provisional application No. 62/948,425, filed on Dec. 16, 2019, provisional application No. 62/948,435, filed on Dec. 16, 2019.

(56) References Cited

U.S. PATENT DOCUMENTS

| | | | |
|---|---|---|---|
| 2016/0029174 A1* | 1/2016 | Morgaine | H04W 4/50 |
| | | | 455/456.3 |
| 2016/0042316 A1* | 2/2016 | Gates | G06Q 10/0833 |
| | | | 700/230 |
| 2017/0039791 A1* | 2/2017 | Baruch | G07C 9/00309 |
| 2018/0204030 A1* | 7/2018 | Bruce | G06K 19/07758 |
| 2018/0293871 A1* | 10/2018 | Malinofsky | H04W 4/80 |
| 2018/0321050 A1* | 11/2018 | Chase | G06F 15/76 |
| 2019/0066033 A1* | 2/2019 | Mains, Jr. | G06Q 10/083 |

\* cited by examiner (1) Possessor Details and Digital Signature Communicated to Server and Activated Server Updates Mobile Application (2) Server Updated by Mobile Application or by Automated Checkpoint Device and Luggage Add-On Deactivated (3) Luggage Add-on Digital Signature Read by Interrogator
Communicated to Server and Examined for Activation Status (1) User Details and Lock ID Communicated to Server.
Server Updates User Mobile Application and Sends Locking Command to Lock (2) Server Updated by Mobile Application or by Automated Checkpoint Device and Sends Opening Command to Lock. Lock Removed and Dispensed (3) Luggage Lock Add-on Digital Signature Read by Interrogator and Examined - Communicated to Server or Checked for Signature Format - If Signature Belongs to a System Lock Add-on then Lock is Still Attached (1) Possessor Digital Signature or Details and Associated Luggage Add-on Digital Signature Communicated to Server. Server Updates Database and Mobile Application (2) Upon Arrival Possessor - Carrying Digital Signature on Card/Boarding-Pass/Mobile-Device/Associated-CC-IC - Collects Luggage with Add-on (3) Possessor Digital Signature/Details and Luggage Digital Signature Read and Communicated to the Server's - or to a Local - Correlation and Comparison Logic for Matching Confirmation Check-in Luggage Pickup Transportation System Boundary

Check-in

Luggage Pickup

Transportation System Boundary

SYSTEMS METHODS DEVICES CIRCUITS AND MACHINE EXECUTABLE CODE FOR USER-INTERACTIVE DYNAMIC LUGGAGE ROUTING

RELATED APPLICATIONS SECTION

The present application is a national phase application of international PCT application number PCT/IL2020/051294, filed Dec. 16, 2020. The PCT/IL2020/051294 application claims priority from U.S. Provisional Patent Application Nos.: 62/948,425, filed Dec. 16, 2019, 62/948,435, filed Dec. 16, 2019, 62/967,887, filed Jan. 30, 2020, and 62/988,512, filed Mar. 12, 2020. All listed related applications are hereby incorporated by reference in their entirety.

FIELD OF THE INVENTION

The present invention generally relates to the field of luggage transport management and security. More specifically, the present invention relates to systems, methods, devices, circuits and machine executable code for user-interactive dynamic luggage routing.

BACKGROUND

Nowadays, there are no mechanisms in airports to ensure that passengers, airport employees, or any other arrival terminal visitors do not, intentionally or mistakenly, take luggage items not belonging to them. After collecting a suitcase from the luggage conveyer belt, a person can walk straight out of the airport with no further inspection to confirm that he is the rightful possessor of the luggage he collected. Paper luggage tags attached to boarding pass are used to enable a passenger to trace lost luggage by presenting the tags to an airline representative. Intentionally or mistakenly removed luggage items, however, remain untraceable.

In addition, there are no available solutions enabling an arriving passenger to interact, and dynamically control and be notified of, the route of his checked-in luggage items—from the time of their arrival at destination and all the way to and through passenger repossession by, for example, passenger collection at carousel, or delivery to a passenger selected hotel.

Electronic GPS type luggage tags may enable passengers to trace their lost luggage, but only helps trace luggage which is still in the airline/airport system (e.g. if a bag was delivered to the wrong airport) and does not apply to luggage that was removed from the airport/transport system and does not act to prevent such removal.

As a result, passengers do not have certainty that their luggage will not leave the airport with someone else, often having effects such as: Apprehension during travel amongst passengers worrying of someone else taking their luggage upon arrival; Concerns among anti-terrorist governmental authorities and law enforcement agencies that this security gap could be exploited by rouge elements; Concerns among anti-criminal (including narcotics and weapons) law enforcement agencies and personnel that this security gap could be exploited by rouge elements; Considerable costs to airlines to retrieve luggage taken erroneously; and others. In 2016 airlines spent over V billion on lost luggage. Costs associated with passengers removing other persons' luggage items, include retrieving them and then delivering them to the original passenger's destination and are thus considerable. Furthermore, passengers mostly remain with no knowledge in regard, and no means to affect, time and location aspects of their luggage's post-arrival journey.

There remains a need, in the field of luggage transport management and security, for comprehensive solutions that may electronically, or otherwise, link a luggage item with the passenger carrying it, as the passenger is arriving from a journey repossessing luggage items and leaving the airport or transportation-hub.

SUMMARY OF THE INVENTION

Embodiments of the present invention include systems, methods devices circuits and machine executable code for user-interactive dynamic luggage routing.

A system for user-interactive dynamic luggage routing may include a system server to obtain or receive a unique passenger identifier and a unique luggage identifier of a luggage item possessed by the passenger, prior to, or as part of, a travel check-in process of the passenger. The unique identifiers may be communicated to the server by a check-in terminal or computer at which the passenger is checking-in and/or by a passenger device application of the system, used by the passenger for online check-in.

The system server may associate each obtained identifier of a checked-in luggage item with an identifier of the passenger checking-in that luggage item and may store the associated identifiers records in a luggage items association and status database. Multiple checked-in luggage item identifiers may be associated with the identifier of the passenger.

The system server may notify the passenger's device application of the association of the checked-in luggage item(s) to him and/or of the departure of the checked-in luggage item from the travel origin.

The system may include one or more luggage identifier acquisition devices, positioned along the routes of an arrival terminal's luggage handling system, to each acquire and relay to the system server the unique identifiers of luggage items mobilized through the luggage handling system, as they pass a specific one of the luggage identifier acquisition devices.

Upon arrival at a destination, the unique identifiers of arriving luggage items may be obtained by a luggage identifier acquisition device(s) and the luggage-identifier associated passengers notified of the arrival of their luggage item(s) at destination. The passenger may be further notified with an indication(s) of the predicted post-arrival route of the luggage item.

An indication(s) of the predicted post-arrival route of the luggage item may for example include a combination of: (1) luggage collection carousel/dispenser number/location; (2) predicted release to collection carousel/dispenser time; (3) current luggage item location; (4) an update to any of the above; and (5) any other information such as: arrival related information and regulations and arrival related commercial offers such as arrival duty free, hotels, car rent, shopping malls and brand stores in the vicinity.

The system server, or a luggage handling system communicatively associated therewith, may automatically select a specific luggage collection carousel/dispenser number/location for release of the luggage item, based on the reference of carousel/dispenser workload level information. Arriving luggage items may accordingly be routed to carousels/dispensers experiencing lower workload.

The system may receive one or more control messages from the passenger's device application, indicating a routing instruction (e.g. selection, command, request) to affect the post-arrival routing of the luggage item. The instruction to affect post-arrival routing of the luggage item may for example include a combination of: (1) buffer luggage item for a selected time period; (2) buffer luggage item until notified otherwise; (3) release (on-demand) luggage item from buffering for passenger collection; (4) route/deliver luggage item to hotel, carousel, dispenser, lounge; (5) route/deliver to hotel, carousel, dispenser, lounge at a specific time; (6) route/deliver to a specific carousel or dispenser; and/or any other luggage routing instructions, selections, commands or requests.

Passenger control messages may dynamically apply—or be dynamically relayed to a luggage handling system/component to apply—upon the luggage item one or more luggage routing actions, in accordance with the received passenger instruction/selection.

Routing actions applied upon the luggage item may include any combination of: diverting, redirecting, buffering, loading off or loading onto a conveyer belt or a carousel, stopping advancement over conveyer belt or carousel, alerting of item, updating of item position and/or other.

The system server may notify the passenger's mobile device of updates relating to the post-arrival route of the luggage item, such as: delays, changes, current/last/predicted location along route. The system server may further notify the passenger of the luggage item being, or shortly being, released for carousel collection.

As part of luggage collection, the system server may monitor, based on communicated luggage identifier acquisition device(s) indications, luggage items entering and/or circulating-on a luggage collection carousel to detect, or predict, the removal of the luggage item associated with the passenger. The passenger may be notified by the system server of the luggage item associated with him: entering the collection carousel, being removed from the carousel and/or about to be removed from the carousel at/within a specified time/time-period.

The system server, based on communicated luggage identifier acquisition device(s) indications (e.g. a video signal analyzed), may detect a person removing the luggage item from the collection carousel and may obtain the identifier of the removed luggage item and one or more unique identifiers of the removing person, such as: an image of the person, voice of person, a biometric of the person such as a fingerprint and/or the person's mobile device token/code/application-generated-code.

The obtained passenger identifier(s) may then be compared to the database stored unique passenger identifier, of the passenger associated with the identifier of the removed luggage item.

If the compared associated-passenger-identifier and removing-passenger-identifier match—the system server may notify the passenger informing and/or requesting passenger confirmation (check-out) that the luggage item has indeed been collected by him.

If the compared associated-passenger-identifier and removing-passenger-identifier do not match—the system server may alert security informing that the luggage item was removed by other than its rightful possessor, optionally providing the unique identifier of the luggage item and/or obtained one or more unique identifiers of the removing person.

The system server may then notify the passenger, requesting a return 'check-out' message from the passenger—to confirm he collected the luggage item detected/predicted as being removed. The 'check-out' request may be associated with an escalation protocol to escalate the type of notification requesting a 'check-out', for example, from: an application notification, to an SMS, to a telephone call, to an announcement in the arrival hall and finally, to a security alert. Upon receipt of a 'check-out' message, the system may register the unique identifier of the removed luggage item as a checked-out/repossessed luggage item identifier.

The system's luggage identifier acquisition device(s), in accordance with some embodiments, may interrogate/acquire the unique identifiers of luggage items passing/being-carried out through an exit, or a path towards an exit, of the destination arrival terminal/hub—obtaining the unique luggage item identifier of the luggage item.

A database stored checked-in luggage items identifiers list may be referenced with the obtained unique luggage item identifier of the luggage item. If the luggage item records indicate a checked-out item—the system server may notify the passenger with a 'thank you' or a similar message. If the luggage item records indicate a still checked-in item (not checked-out)—the system server may notify the passenger and/or alert security that the luggage item was carried out by other than its rightful possessor, optionally providing unique identifier of the luggage item and/or obtained one or more unique identifiers of the carrying person.

The system's luggage identifier acquisition device(s), in accordance with some embodiments, may interrogate/acquire the unique identifiers of luggage items, and of luggage items carrying passengers, passing/being-carried out through an exit, or a path towards an exit, of the destination arrival terminal/hub—obtaining the unique identifier of the luggage item and the unique passenger identifier of the person carrying it.

The system server may then compare the unique luggage item identifier of the luggage item to the unique passenger identifier of the person carrying it. If the compared luggage-item-identifier and passenger-identifier match database stored identifiers association records—the system server may notify the passenger with a 'thank you' or a similar message. If the compared luggage-item-identifier and passenger-identifier do not match database stored identifiers association records—the system server may notify the passenger and/or alert security that the luggage item was carried out by other than its rightful possessor, optionally providing unique identifier of the luggage item and/or obtained one or more unique identifiers of the carrying person.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings:

Figure 1:
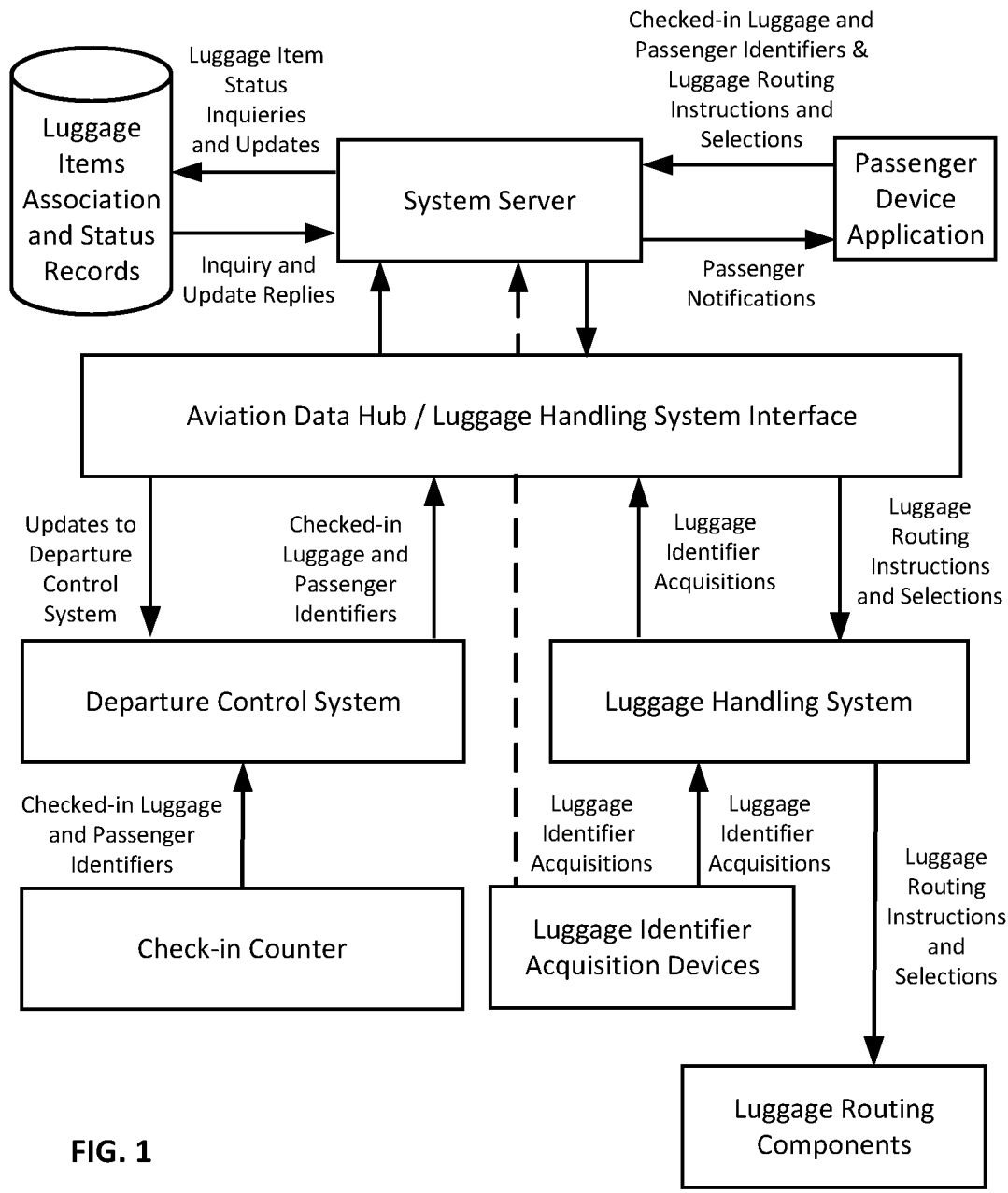
In FIG. 1 there is shown, in accordance with some embodiments, a system for user-interactive dynamic luggage routing.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals or element labeling may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, may refer to the action and/or processes of a computer, computing system, computerized mobile device, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device, for example a computerized device running a web-browser.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. The memory elements may, for example, at least partially include memory/registration elements on the user device itself.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "includes", "including", "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present disclosure is to be considered as an exemplification of the invention, and is not intended to limit the invention to the specific embodiments illustrated by the figures or description below.

Embodiments of the present invention include systems, methods devices circuits and machine executable code for user-interactive dynamic luggage routing.

A system for user-interactive dynamic luggage routing may include a system server to obtain or receive a unique passenger identifier and a unique luggage identifier of a luggage item possessed by the passenger, prior to, or as part of, a travel check-in process of the passenger. The unique identifiers may be communicated to the server by a check-in terminal or computer at which the passenger is checking-in and/or by a passenger device application of the system, used by the passenger for online check-in.

The system server may associate each obtained identifier of a checked-in luggage item with an identifier of the passenger checking-in that luggage item and may store the associated identifiers records in a luggage items association and status database. Multiple checked-in luggage item identifiers may be associated with the identifier of the passenger.

The system server may notify the passenger's device application of the association of the checked-in luggage item(s) to him and/or of the departure of the checked-in luggage item from the travel origin.

The system may include one or more luggage identifier acquisition devices, positioned along the routes of an arrival terminal's luggage handling system, to each acquire and relay to the system server the unique identifiers of luggage items mobilized through the luggage handling system, as they pass a specific one of the luggage identifier acquisition devices.

Upon arrival at a destination, the unique identifiers of arriving luggage items may be obtained by a luggage identifier acquisition device(s) and the luggage-identifier associated passengers notified of the arrival of their luggage item(s) at destination. The passenger may be further notified with an indication(s) of the predicted post-arrival route of the luggage item.

An indication(s) of the predicted post-arrival route of the luggage item may for example include a combination of: (1) luggage collection carousel/dispenser number/location; (2) predicted release to collection carousel/dispenser time; (3) current luggage item location; (4) an update to any of the above; and (5) any other information such as: arrival related information and regulations and arrival related commercial offers such as arrival duty free, hotels, car rent, shopping malls and brand stores in the vicinity.

The system server, or a luggage handling system communicatively associated therewith, may automatically select a specific luggage collection carousel/dispenser number/location for release of the luggage item, based on the reference of carousel/dispenser workload level information. Arriving luggage items may accordingly be routed to carousels/dispensers experiencing lower workload.

The system may receive one or more control messages from the passenger's device application, indicating a routing instruction (e.g. selection, command, request) to affect the post-arrival routing of the luggage item. The instruction to affect post-arrival routing of the luggage item may for example include a combination of: (1) buffer luggage item for a selected time period; (2) buffer luggage item until notified otherwise; (3) release (on-demand) luggage item from buffering for passenger collection; (4) route/deliver luggage item to hotel, carousel, dispenser, lounge; (5) route/deliver to hotel, carousel, dispenser, lounge at a specific time; (6) route/deliver to a specific carousel or dispenser; and/or any other luggage routing instructions, selections, commands or requests.

Passenger control messages may dynamically apply—or be dynamically relayed to a luggage handling system/component to apply—upon the luggage item one or more luggage routing actions, in accordance with the received passenger instruction/selection.

Routing actions applied upon the luggage item may include any combination of: diverting, redirecting, buffering, loading off or loading onto a conveyer belt or a carousel, stopping advancement over conveyer belt or carousel, alerting of item, updating of item position and/or other.

The system server may notify the passenger's mobile device of updates relating to the post-arrival route of the luggage item, such as: delays, changes, current/last/predicted location along route. The system server may further notify the passenger of the luggage item being, or shortly being, released for carousel collection.

As part of luggage collection, the system server may monitor, based on communicated luggage identifier acquisition device(s) indications, luggage items entering and/or circulating-on a luggage collection carousel to detect, or predict, the removal of the luggage item associated with the passenger. The passenger may be notified by the system server of the luggage item associated with him: entering the collection carousel, being removed from the carousel and/or about to be removed from the carousel at/within a specified time/time-period.

The system server, based on communicated luggage identifier acquisition device(s) indications (e.g. a video signal analyzed), may detect a person removing the luggage item from the collection carousel and may obtain the identifier of the removed luggage item and one or more unique identifiers of the removing person, such as: an image of the person, voice of person, a biometric of the person such as a fingerprint and/or the person's mobile device token/code/application-generated-code.

The obtained passenger identifier(s) may then be compared to the database stored unique passenger identifier, of the passenger associated with the identifier of the removed luggage item.

If the compared associated-passenger-identifier and removing-passenger-identifier match—the system server may notify the passenger informing and/or requesting passenger confirmation (check-out) that the luggage item has indeed been collected by him.

If the compared associated-passenger-identifier and removing-passenger-identifier do not match—the system server may alert security informing that the luggage item was removed by other than its rightful possessor, optionally providing the unique identifier of the luggage item and/or obtained one or more unique identifiers of the removing person.

The system server may then notify the passenger, requesting a return 'check-out' message from the passenger—to confirm he collected the luggage item detected/predicted as being removed. The 'check-out' request may be associated with an escalation protocol to escalate the type of notification requesting a 'check-out', for example, from: an application notification, to an SMS, to a telephone call, to an announcement in the arrival hall and finally, to a security alert. Upon receipt of a 'check-out' message, the system may register the unique identifier of the removed luggage item as a checked-out/repossessed luggage item identifier.

The system's luggage identifier acquisition device(s), in accordance with some embodiments, may interrogate/acquire the unique identifiers of luggage items passing/being-carried out through an exit, or a path towards an exit, of the destination arrival terminal/hub—obtaining the unique luggage item identifier of the luggage item.

A database stored checked-in luggage items identifiers list may be referenced with the obtained unique luggage item identifier of the luggage item. If the luggage item records indicate a checked-out item—the system server may notify the passenger with a 'thank you' or a similar message. If the luggage item records indicate a still checked-in item (not checked-out)—the system server may notify the passenger and/or alert security that the luggage item was carried out by other than its rightful possessor, optionally providing unique identifier of the luggage item and/or obtained one or more unique identifiers of the carrying person.

The system's luggage identifier acquisition device(s), in accordance with some embodiments, may interrogate/acquire the unique identifiers of luggage items, and of luggage items carrying passengers, passing/being-carried out through an exit, or a path towards an exit, of the destination arrival terminal/hub—obtaining the unique identifier of the luggage item and the unique passenger identifier of the person carrying it.

The system server may then compare the unique luggage item identifier of the luggage item to the unique passenger identifier of the person carrying it. If the compared luggage-item-identifier and passenger-identifier match database stored identifiers association records—the system server may notify the passenger with a 'thank you' or a similar message. If the compared luggage-item-identifier and passenger-identifier do not match database stored identifiers association records—the system server may notify the passenger and/or alert security that the luggage item was carried out by other than its rightful possessor, optionally providing unique identifier of the luggage item and/or obtained one or more unique identifiers of the carrying person.

Luggage, in accordance with embodiments, may include one or more luggage items, baggage items, parcels, packages, suitcases, bags, checked-in items, or the like.

Passenger, in accordance with embodiments, may include a traveler, flyer, rider, or the like—Individual/person traveling with one or more luggage items he is the authorized possessor of, checking-in at least one of the luggage items prior to boarding a transportation vehicle (Airplane, Train, Bus, Hyperloop Pod) and repossessing the checked-in luggage items after disembarking the transportation vehicle.

A Unique Luggage Item Identifier, in accordance with embodiments, may include any machine-readable, machine-interrogatable, machine-acquirable and/or optically-readable-digital signature, return signal, or unique ID which signature/signal/ID may be read/received/acquired/obtained at some distance and which may associate or link the luggage item with a rightful possessor of the luggage item.

A Unique Luggage Item Identifier, or an add-on/luggage-add-on having/including a Unique Luggage Item Identifier, in accordance with embodiments, may include: (a) a Barcode tag; (b) a QR code tag; (c) an RFID tag; (d) an RF active insert integrated into luggage; (e) an RF or other active communication accessory affixed to luggage; (f) stored data, optionally encrypted, representing and indicative of a specific re-examinable (e.g. by an optical luggage parcel recognition functionality) characteristic of the luggage, such as visual look/image of the luggage item or a feature thereof, or the weight of the luggage item; and/or (g) any other form of machine-readable digital signature or identifier.

Unique Luggage Item Identifier obtaining/acquisition/interrogation may be executed by a luggage identifier acquisition device(s). A luggage identifier acquisition device, or luggage add-on interrogator, in accordance with embodiments, may include: (a) a Visual imager and an Optical recognition module; (b) an RF interrogator; (c) a Radio or wireless communication receiver; (d) an Add-on memory, or data storage, interface/querying logic; and/or (e) any other form of digital signature, or unique characteristic, reading machine or component.

Unique Passenger Identifier, for the registration and authentication of a passenger who is a possessor of luggage, in accordance with embodiments, may include or be based on: (a) visual documentation supported; (b) RF readable documentation supported; (c) possessor biometric—such as optical face recognition, fingerprint or other biometric-supported; (d) possessor personal communication device supported (e.g. device pin/token, application generated/allocated code); (e) possessor digital wallet or credit card IC/magnetic-code supported; and/or (f) any other form of machine-readable digital signature.

Unique Passenger Identifier obtaining/acquisition/interrogation may be executed by a passenger identifier acquisition device. A passenger identifier acquisition device, or a possessor interrogator, in accordance with some embodiments, may include: (a) a Visual imager; (b) a Computer vision system; (c) a biometric parameter reader—fingerprint, voice, eye, etc.; (c) an RF interrogator; (d) a Radio or wireless communication receiver; (d) an Add-on memory, or data storage, interface/querying logic; and/or (e) any other form of digital signature, or unique characteristic, reading machine or component.

Check-in, in accordance with embodiments, may refer to a travel/journey stage at which the unique identifier of a luggage item is registered into the dynamic luggage routing system as a 'checked-in item', associated with the unique identifier of its possessing passenger; and the luggage item is ingested into the luggage handling system.

Any of the system configurations, solutions, methods, processes, functions, components and components-interrelations, described or exemplified herein in the context of a luggage security system, may be likewise applicable to a user-interactive dynamic luggage routing system, in accordance with embodiments of the present invention.

Reference is now made to FIG. 1, where there is shown, in accordance with some embodiments, a system for user-interactive dynamic luggage routing. In the figure, checked-in luggage and passenger identifiers are shown to be communicated, by a check-in counter terminal and through a departure control system and an aviation data hub, or by a passenger device application, to a system server.

Luggage identifier acquisition devices are shown to provide luggage identifier acquisitions data to the system server, directly, or through a luggage handling system and interface thereof. The system server issues and communicates notifications to the passenger device application based on the received luggage identifier acquisitions data.

The passenger device application communicates passenger-made luggage routing instructions and selections to the system server. The luggage routing instructions and selections are communicated by the system server, through the luggage handling system interface, to the luggage handling system's controller/server for relay of corresponding execution commands to specific routing components of the luggage handling system.

The system server is also shown to communicate to the departure control system, through the aviation data hub, updates such as identifier receipt confirmations and shared luggage items or passenger status reports.

Embodiments of the present invention include systems, methods, devices, circuits and machine executable code for user-interactive dynamic routing, securing, controlling and authenticating of luggage passing through a luggage transport system of an airport or other transportation hub.

The luggage transport system according to embodiments may include all the points and locations in-between a luggage drop-off point and a luggage pickup area. There may be provided a machine-readable, optically-readable and/or other machine obtainable luggage add-on or marking with a machine-readable/machine-interrogatable/machine-acquirable/optically-readable digital signature, return signal, or unique identifier (ID) which signature/signal/ID may be read/received/acquired at some distance and which may associate or link the luggage with a rightful possessor of the luggage.

The luggage add-on/marking/identifier may be adapted for machine detection and/or machine reading (e.g. camera image acquisition, RFID interrogator acquisition) within or at the boundaries of the luggage transport system. Movement of the luggage add-on/marking/identifier towards, away from, or past a boundary/specific-point of the luggage transport system may be detected by a functionally associated luggage add-on/marking detector/tracker, such as a computer vision system.

An exemplary luggage security system, in accordance with embodiments of the present invention, may include processing circuits adapted to assess whether a specific piece of luggage—with a specific luggage add-on whose digital signature designates or is otherwise associated with a rightful possessor of the specific luggage—is in the possession or an individual who is designated as the rightful possessor of the specific luggage when the specific luggage, along with its add-on, is approaching and/or passing through a boundary of the luggage transport system. Alternatively, the luggage security system according to embodiments of the present invention may ignore a luggage add-on if it has been deactivated, either by the possessor (e.g. using a communication device) or by an automated border checkpoint device.

An Add-on, or luggage add-on, in accordance with some embodiments, may include: (a) a Barcode tag; a QR code tag; (c) an RFID tag; (d) an RF active insert integrated into luggage; (e) an RF or other active communication accessory affixed to luggage; (f) stored data, optionally encrypted, representing and indicative of a specific re-examinable (e.g. by an optical luggage parcel recognition functionality) characteristic of the luggage, such as visual look/image of the luggage item or a feature thereof, or the weight of the luggage item; and/or (g) any other form of machine-readable digital signature or identifier.

According to some embodiments, the association data of a luggage add-on to a possessor may be stored in a database associated with the luggage security system, wherein registration and authentication of a possessor of luggage may be based on: (a) visual documentation supported; (b) RF readable documentation supported; (c) possessor biometric—such as optical face recognition, fingerprint or other biometric-supported; (d) possessor personal communication device supported (e.g. device pin/token, application generated/allocated code); (e) possessor digital wallet or credit card IC/magnetic-code supported; and/or (f) any other form of machine-readable digital signature.

A Luggage add-on Interrogator, in accordance with some embodiments, may include: (a) a Visual imager and an Optical recognition module; (b) an RF interrogator; (c) a Radio or wireless communication receiver; (d) an Add-on memory, or data storage, interface/querying logic; and/or (e) any other form of digital signature, or unique characteristic, reading machine or component.

A Possessor Interrogator, in accordance with some embodiments, may include: (a) a Visual imager; (b) a Computer vision system; (c) a biometric parameter reader—fingerprint, voice, eye, etc.; (c) an RF interrogator; (d) a Radio or wireless communication receiver; (d) an Add-on memory, or data storage, interface/querying logic; and/or (e) any other form of digital signature, or unique characteristic, reading machine or component.

According to some embodiments, a luggage security system may include: (a) an add-on signature to detected possessor correlator for add-ons of luggage items approaching/crossing luggage transport system boundary or border; and/or (b) a luggage item activation status checker (not deactivated? still armed?) for add-ons of luggage items approaching/crossing luggage transport system boundary or border.

According to some embodiments, a luggage Add-on alarm trigger deactivation—for possessor deactivation upon arrival and repossession of his luggage at pickup area—may be executed by: (a) a Possessor controlled communication device and/or an application executed thereby; and/or (b) an Automated border (luggage) checkpoint device.

According to embodiments of the present invention, there may be provided a luggage tracking, controlling, routing and security system which may assign to luggage being checked-in a unique identifier (ID) which can be encoded within a visually, or otherwise, readable add-on placed on or attached to the luggage.

According to embodiments of the present invention, there may be provided a luggage tracking, controlling, routing and security system which may acquire (e.g. using check-in area cameras) or receive (e.g. self-obtained images acquired and communicated using a mobile device application) and associate with the checked-in luggage ID, visual and/or biometric signatures of parties/persons authorized/eligible to collect that luggage item.

The system may include a database which stores unique checked-in luggage IDs, along with their associated visual and/or biometric signatures of parties/persons authorized/eligible to collect the luggage item of that ID. The database may further store identifier(s) of the mobile device and/or mobile device application—of the user/passenger associated with the checked-in luggage ID and associated visual and/or biometric signatures.

According to embodiments of the present invention, system stored luggage related data may be utilized for dynamically routing luggage items and controlling and/or authenticating the rightful collection of luggage items arriving at their destination. Controlling and authenticating techniques, in accordance with embodiments, may include a combination of: (1) Passenger controlled release of her/his held/buffered luggage—for carousel collection, collection from a luggage dispenser to which the passenger may identify; (2) Comparison of luggage collecting/removing person visuals to visuals of authorized collectors for the same luggage ID; and/or (3) Comparison of removed luggage ID visuals to visuals/scans of luggage ID received from passenger's mobile device application after luggage repossession.

According to some embodiments, passenger controlled release of her/his held/buffered luggage may offer, through the mobile device application, a selection of one or more collection types or locations, such as: a luggage collection carousel; a specific luggage collection carousel(s); collection from a luggage dispenser, to which the passenger may identify using his mobile device or application, or his passport (e.g. dispenser at the collection area, dispenser at the VIP lounge); and/or delivery of luggage to hotel/other.

According to some embodiments, passenger controlled release of her/his held/buffered luggage may include the system server offering luggage collection options and receiving related passenger requests and selections, through the mobile device application. Offers and requests for preferred luggage release time, may for example time a combination of the following information, offer and request types: earliest possible time for release, latest possible time for release, request for a specific time of release (e.g. 3:45), offer for selection of a specific time for release (e.g. '3:45; 4:00, or 4:15'), request for release within a time period (e.g. in 30 minutes from now), request for passenger device location based release (e.g. when I am 200 meters from the carousel/when I am 2 minutes walking from the carousel), and/or other.

According to some embodiments, based on the time period for release of his luggage selected by a given passenger, the system may suggest matching offerings or pop-ups through the passenger's mobile device application. For example: if the passenger requested to collect his luggage within 30 minutes—a place for having coffee at the terminal may be suggested; if the passenger requested to collect his luggage within an hour, a longer time period—special offers in the terminal's duty free shops may be suggested; if the passenger requested to collect his luggage at a VIP lounge—food menu and services provided in the lounge may be presented to him; and/or if the passenger requested for his luggage to be delivered directly to the hotel, which may indicate the passenger is in hurry to leave the terminal, possible transportation suggestions for reaching the hotel such as train/bus details or taxi service phone-number/link may be presented.

According to some embodiments, comparison of removed luggage ID visuals to visuals/scans of luggage ID received from passenger's mobile device application after luggage repossession, may act as a passenger-application luggage checkout. Upon detection of a luggage item removal by the cameras, a computer vision system, or other luggage tracking mechanism (e.g. RFID based) of the luggage handling system and the relaying of the removed unique luggage ID visuals to the system server—a countdown may be initiated by the server, as it awaits the receipt of a matching unique luggage ID arriving from the mobile device application of a passenger associated with the removed luggage and authorized to collect it. The server may allocate a predetermined period of time, from the time of luggage removal—for receipt of a passenger scanned/photographed visually readable checked-in luggage ID from a passenger's mobile device, wherein the received luggage ID matches: the luggage ID of the carousel removed luggage item, detected by the luggage handling system; one of the luggage IDs previously associated with the specific mobile device application from which the scanned/photographed ID was received; and/or both.

Failure to receive a removed luggage matching ID from its associated mobile device application within the predefined period of time, or receipt of a non-matching ID, may trigger the issuing of an alert and optionally of corresponding alarms/notifications by the system server.

Any combination of one or more luggage removal control and authentication schemes/solutions described herein, may be utilized/implemented as part of a luggage collection control and security system, in accordance with some embodiments. Selected control/authentication solution(s) utilized/implemented may depend on the type of infrastructure at the arrival terminal/hub and/or the level of security needed—as multiple control/authentication layers may facilitate higher result accuracy and thus less mistakes and higher security level.

In addition, each of: the comparison of luggage collecting/removing person visuals to visuals of authorized collectors for the same luggage ID and/or, the comparison of removed luggage ID visuals to visuals/scans of luggage ID received from passenger's mobile device application after luggage repossession—may be used to override the results of the other.

For example, timely receipt and a successful comparison of a passenger application acquired visual luggage ID to the visual ID of a carousel removed luggage item, may indicate a successful passenger luggage checkout, and may prevent the triggering of an alert. Even if a prior attempt to match a visual of the luggage removing person to visuals of persons authorized to collect that luggage item was unsuccessful, an alarm would not be issued as the passenger made mobile device application luggage checkout, overrides the unsuccessful remover image comparison (e.g. collector out of cameras' coverage area, collector wore his hat and thus prevented successful comparison to previous visuals of his in which no hat is worn).

According to some embodiments of the present invention, a system for user-interactive dynamic routing, securing, controlling and authenticating of luggage passing through a luggage transport system of an airport or other transportation hub, may implement an Activation/Deactivation Based Luggage Authentication, wherein the possessor of a luggage item is required, for a luggage item repossessed at the pickup area, to deactivate an associated luggage item add-on signature activation. The luggage item add-on signature, associated with the possessor during luggage item check-in, may be deactivated through a mobile user application running on a computerized device of the luggage possessor, or at an automated border checkpoint device. Deactivation must be performed between luggage pickup and the interrogation boundary to prevent an alert.

At the interrogation boundary, add-ons of all passing luggage items may be interrogated. Replay data of each add-on—including add-on's identification return signal, a digital signature, or a signature/luggage-characteristic derived digital representation—is relayed to a server of the luggage security system for querying a luggage add-on to possessor association database including luggage items activation status records.

According to some embodiments, if the digital signature, of a given add-on reply data, is not found in the database records, or is found in the database records and its current status record is set to 'deactivated', then the server returns an 'ignore' command to the interrogation boundary and no further action is taken; If, conversely, the digital signature, of the given add-on reply data, is found in the database records and its current status record is set to 'activated', then the server returns an 'alert' command to the interrogation boundary that triggers corresponding notification or alarms in response.

According to some embodiments, passengers carrying luggage items giving no interrogation response may be regarded by the interrogation boundary as system non-users or non-opt/logged-out users and may thus be allowed to walk through and past the boundary with little or no delay.

An exemplary interrogation boundary and/or controller/control-logic thereof, in accordance with some embodiments, may only interrogate luggage add-ons (not possessors), and may relate/react to at least the following interrogation scenarios: (a) No luggage signature interrogation pickup in proximity/passing-through—No action; (b) Interrogation pickup of a luggage signature for which status records indicate a deactivated status—No action; or (c) Interrogation pickup of a luggage signature for which status records indicate an activated status—Alert/Notify (possible luggage theft/removal).

According to some embodiments, luggage items activation status records may be stored on: (a) a local (e.g. as part of the interrogation boundary) database or digital memory component, wherein the interrogation boundary may further include a database/memory querying logic to reference the database/memory add-on status records with interrogation replies being acquired; (b) a database associated with the luggage security system server; (c) a cloud data storage; and/or (d) any digital data storage type or location, accessible by the luggage security system's: server, luggage check-in computers or system components, user device applications and/or automated border checkpoint devices.

According to some embodiments of the present invention, a luggage security system implementing an Activation/Deactivation Based Luggage Authentication, may utilize a physical lock type luggage add-on for locking onto a luggage item, wherein the possessor of a luggage item is required, for a luggage item repossessed at the pickup area, to deactivate and thus unlock the physical lock add-on. The luggage item physical lock add-on, associated with the possessor during luggage item check-in, may be deactivated and thus unlocked and separated from the luggage item, through a mobile user application running on a computerized device of the luggage possessor, or at an automated border checkpoint device.

The luggage item physical lock add-on may be deactivated/unlocked as a result of a possessor lock add-on code, associated with and provided to the possessor at luggage drop-off, being: (a) communicated directly or through the system server to the lock add-on, by a mobile user application running on a computerized device of the luggage possessor or by an automated border checkpoint device; or (b) entered by direct interface of the possessor with the lock add-on or a user interface thereof (e.g. a numeric pad for code entering).

Upon deactivation and unlocking, the physical lock add-on may be separated from the luggage item and dispensed, optionally at a designated collection point, somewhere between the luggage pickup and the interrogation boundary to prevent an alert.

An exemplary interrogation boundary and/or controller/control-logic thereof, in accordance with some embodiments, may only interrogate luggage physical lock add-ons (not possessors), and may, for example, relate/react to at least the following interrogation scenarios: (a) No luggage lock interrogation pickup in proximity-of/passing-through boundary—No action; (b) Interrogation pickup of any luggage lock add-on in proximity-of/passing-through boundary (lock not dispensed)—Alert/Notify (possible luggage theft/removal).

A physical lock add-on, in accordance with some embodiments, may be adapted to include functional capabilities of a Transportation Security Administration (TSA) lock, enabling/allowing law and security authorities (e.g. TSA) access to the luggage without the passenger being present.

A physical lock add-on, in accordance with some embodiments, may take the form of any attachment type or mechanism—for example: a tag, a strap, a sticker, a wire, a key-lock, a code-lock, a handcuffs strap, a remotely controlled/communicated lock, a bio-metric lock and/or any other attachment solution—for connection of a luggage add-on/digital-signature in a manner which at least partially (e.g. key, code, scissors needed), or timely, prevents its disconnection or removal from the luggage item. A physical lock add-on may, or may not, prevent the opening of a luggage item to which it is connected (e.g. opening for law/security purposes, the TSA).

A physical lock add-on, in accordance with some embodiments, may be a reusable lock, utilized for the security of multiple luggage items, on multiple trips, with multiple different possessors. Following to their disposal at the luggage collection area, luggage possessors removed locks may be collected, returned to luggage check-in counters, optionally initiated/restarted/nulled and re-associated with new luggage possessors checking in.

Figure 2:
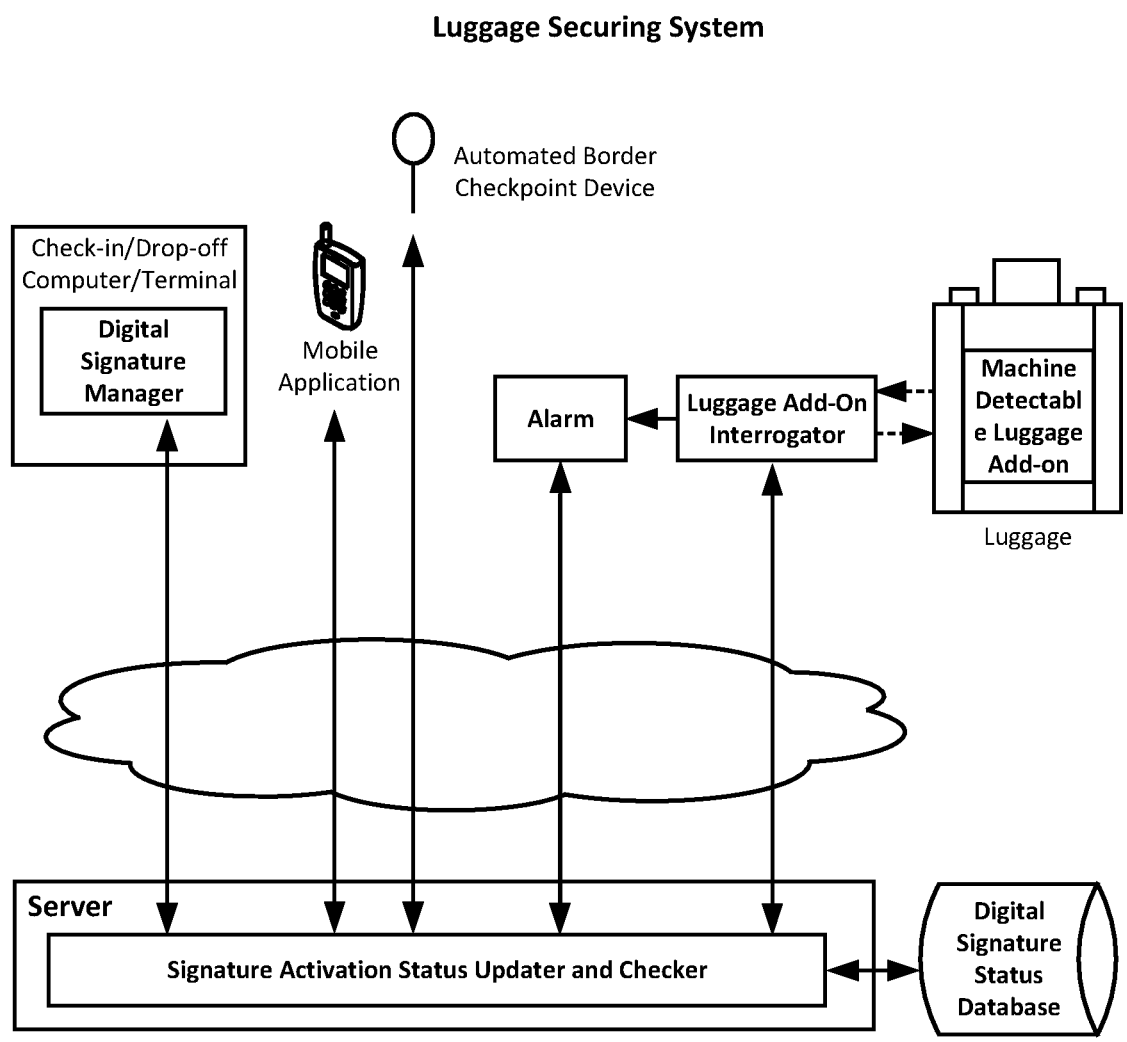
In FIG. 2 there is shown a block diagram of an exemplary system for securing luggage passing through a luggage transport system, in accordance with some embodiments of the present invention, wherein an exemplary activation/deactivation based luggage authentication is implemented.

Reference is now made to FIG. 2, where there is shown a block diagram of an exemplary system for securing luggage passing through a luggage transport system, in accordance with some embodiments of the present invention, wherein an exemplary activation/deactivation based luggage authentication is implemented.

In the figure, there is shown a system server comprising a signature activation status updater and checker, communicatively connected to: a digital signature manager component, plug-in, application, or module, of a check-in or luggage drop-off computer/terminal; a user (luggage possessor) application running on a mobile communication device; an automated border checkpoint device; an alarm or notification engine; and a luggage add-on interrogator interrogating the machine detectable luggage add-on for its digital signature.

The system server is shown to also be connected to a digital signature status database. The signature activation status updater and checker manages the generation, access, update and querying of signature status database data records.

Figure 3A:
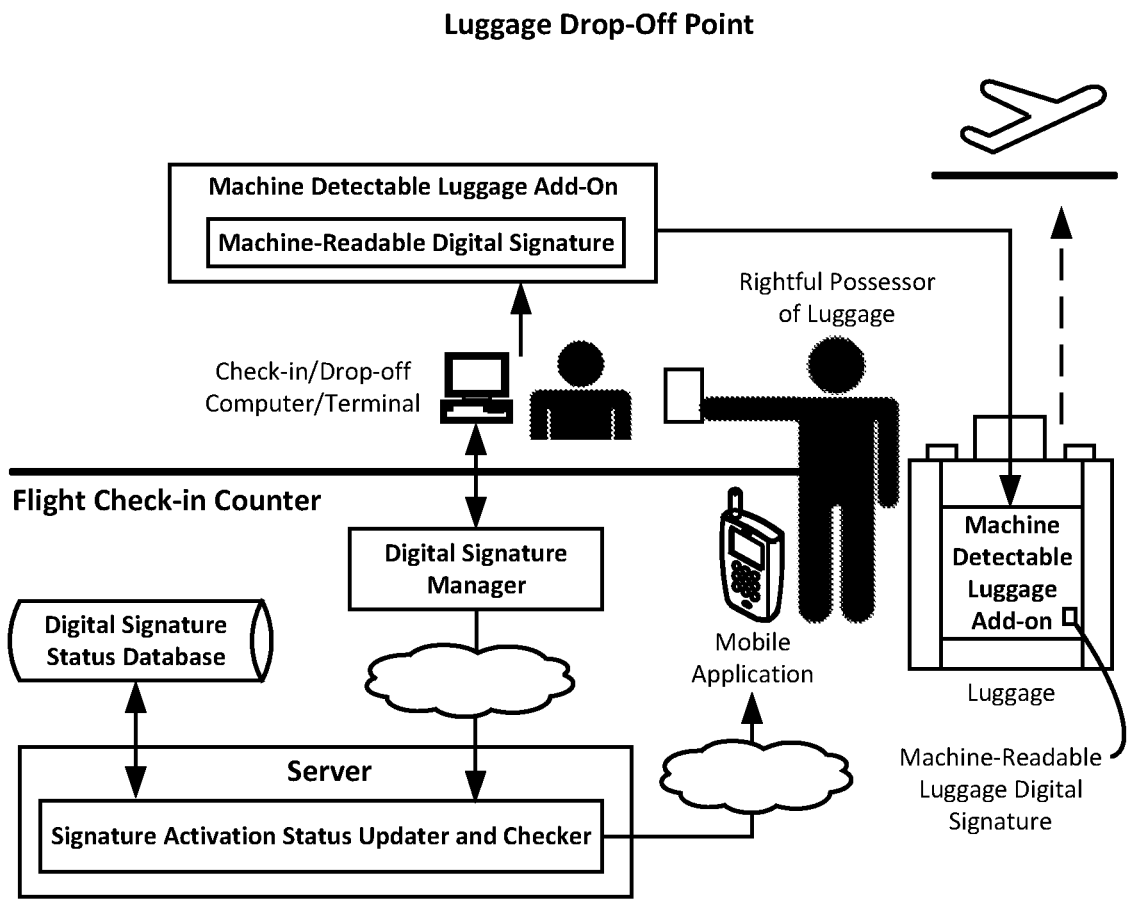
In FIG. 3A there is shown a schematic diagram of an exemplary system for securing luggage passing through a luggage transport system, in accordance with some embodiments of the present invention, wherein system components and system process flow at a luggage drop-off point is shown.

Reference is now made to FIG. 3A, where there is shown a schematic diagram of an exemplary system for securing luggage passing through a luggage transport system, in accordance with some embodiments of the present invention, wherein system components and system process flow at a luggage drop-off point is shown.

In the figure, a rightful possessor of a luggage item is shown to deposit it at a flight check-in counter. A machine detectable luggage add-on, including a machine-readable digital signature, is issued by the digital signature manager, generated (e.g. RFID tag printed) at the check-in computer/terminal and appended to the deposited luggage item. According to some embodiments, the tag/add-on generated (e.g. RFID tag printed) at the check-in computer/terminal and provided to the deposited luggage's possessor, may be likewise/alternatively generated at the boarding gate.

The digital signature manager then communicates check-in computer/terminal inputted possessor details and the add-on signature issued to the system server. The server's 'signature activation status updater and checker' updates the digital signature status database records of the issued signature's activation and then sends an activation confirmation notification to the possessor's mobile device application identified based on check-in computer/terminal inputted possessor details.

Figure 3B:
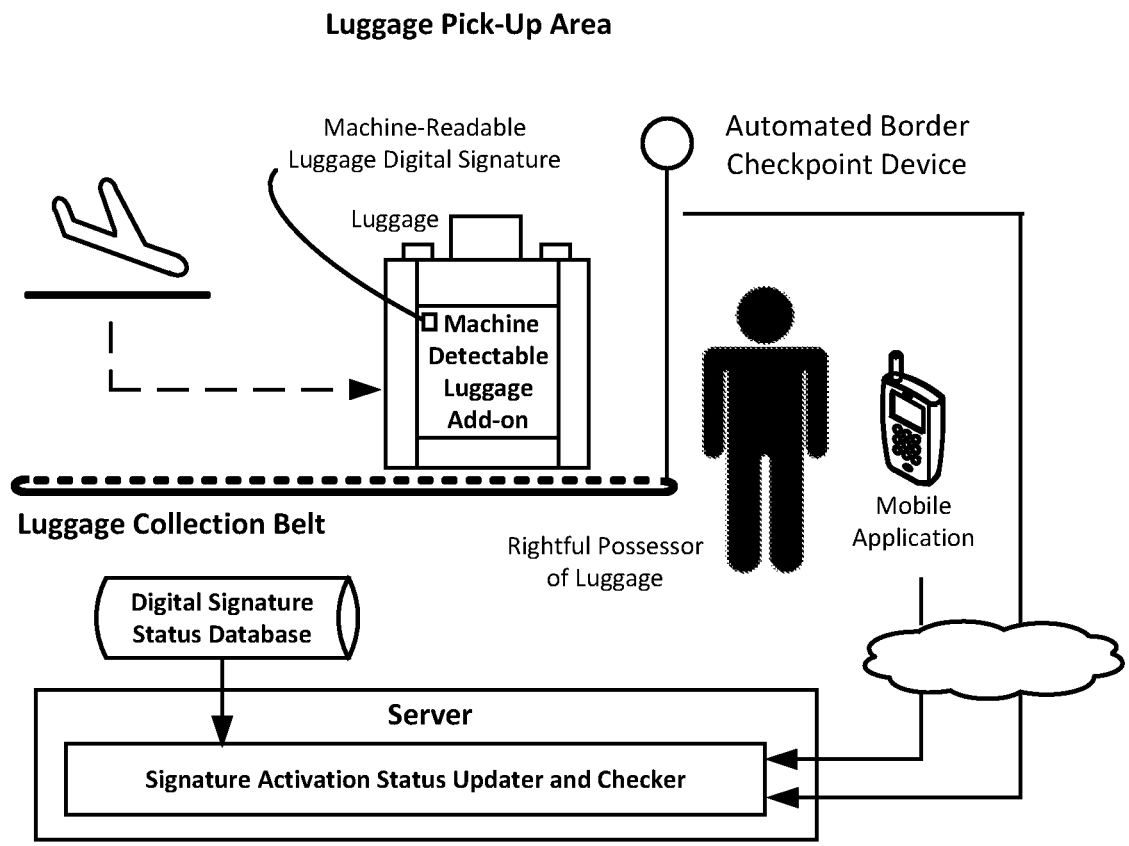
In FIG. 3B there is shown a schematic diagram of an exemplary system for securing luggage passing through a luggage transport system, in accordance with some embodiments of the present invention, wherein system components and system process flow at a luggage pick-up area is shown.

Reference is now made to FIG. 3B, where there is shown a schematic diagram of an exemplary system for securing luggage passing through a luggage transport system, in accordance with some embodiments of the present invention, wherein system components and system process flow at a luggage pick-up area is shown.

In the figure, the rightful possessor of the luggage item is shown to repossess his luggage item from the luggage collection belt. An automated border checkpoint device—adapted to identify the possessor by reading or receiving a possessor digital signature, or another identifying/association detail as described herein, from the possessor; or the possessor's mobile device application—where activation status of all past and current possessor items may be presented for user update—are used to update the server's 'signature activation status updater and checker' that updates the digital signature status database records of the issued signature's deactivation.

Figure 3C:
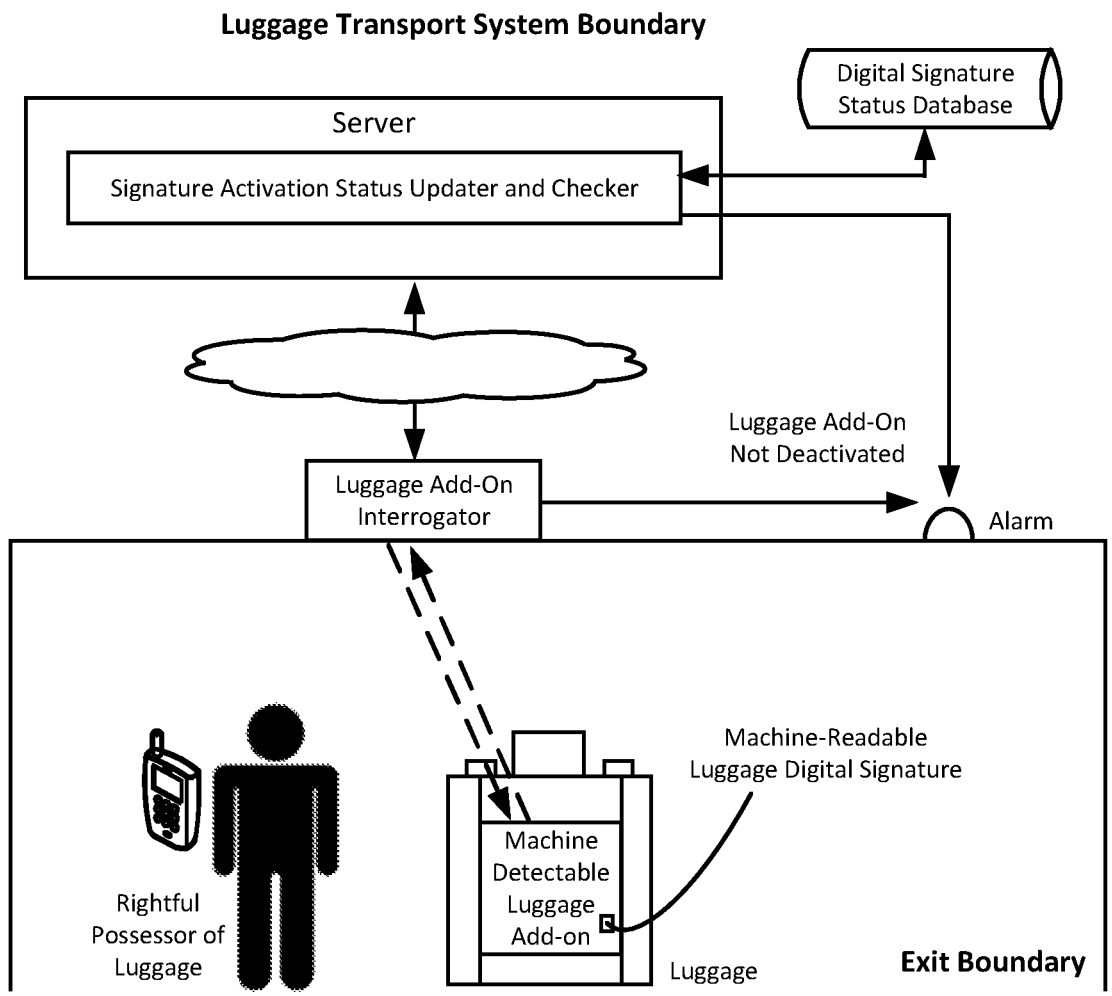
In FIG. 3C there is shown a schematic diagram of an exemplary system for securing luggage passing through a luggage transport system, in accordance with some embodiments of the present invention, wherein system components and system process flow at a luggage transport system boundary is shown.

Reference is now made to FIG. 3C, where there is shown a schematic diagram of an exemplary system for securing luggage passing through a luggage transport system, in accordance with some embodiments of the present invention, wherein system components and system process flow at a luggage transport system boundary is shown.

In the figure, the rightful possessor of the luggage item is shown to approach, or pass through, a luggage transport system boundary such as an airport customs or exit terminal gate. A luggage add-on interrogator detects/picks-up-signal—from the luggage add-on interrogating it for its digital signature. The read digital signature is then communicated to the server and the server's 'signature activation status updater and checker' queries the digital signature status database records for the current status of the read luggage add-on signature.

If the database record of the read luggage add-on signature indicates that it is still activated (i.e. has not been deactivated at pick-up area) the server issues a system alarm or updates a system notification engine, directly, or by updating the luggage add-on interrogator of the still activated digital signature it has just interrogated. Conversely, if the database record of the read luggage add-on signature indicates that it is deactivated (i.e. has been deactivated at pick-up area) then no action is triggered and the luggage possessor can continue beyond the luggage transport system boundary with his, now known to be rightful, luggage item.

Figure 4:
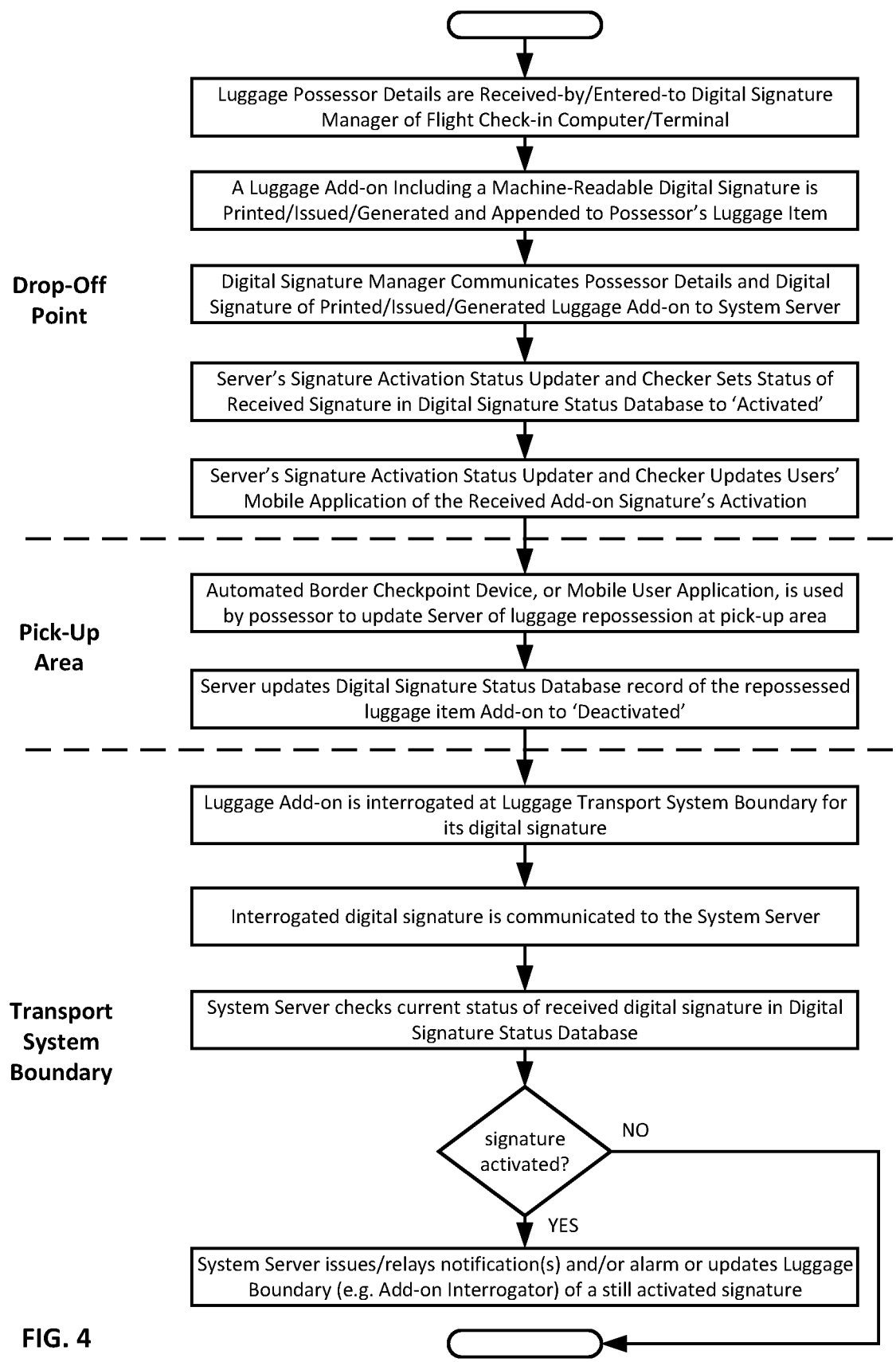
In FIG. 4 there is shown a flowchart of the main steps executed by an exemplary system for securing luggage passing through a luggage transport system, in accordance with some embodiments of the present invention, wherein an exemplary activation/deactivation based luggage authentication is implemented.

Reference is now made to FIG. 4, where there is shown a flowchart of the main steps executed by an exemplary system for securing luggage passing through a luggage transport system, in accordance with some embodiments of the present invention, wherein an exemplary activation/deactivation based luggage authentication is implemented.

Shown exemplary steps executed at the luggage transport system's drop-off point, include: (1) luggage possessor details are received-by/entered-to digital signature manager of flight check-in computer/terminal; (2) a luggage add-on including a machine-readable digital signature is printed/issued/generated and appended to possessor's luggage item; (3) digital signature manager communicates possessor details and digital signature of printed/issued/generated luggage add-on to system server; (4) server's signature activation status updater and checker sets status of received signature in digital signature status database to 'activated'; and (5) server's signature activation status updater and checker updates users' mobile application of the received add-on signature's activation.

Shown exemplary steps executed at the luggage transport system's pick-up area, include: (1) automated border checkpoint device, or mobile user application, is used by possessor to update server of luggage repossession at pick-up area; and (2) server updates digital signature status database record of the repossessed luggage item add-on to 'deactivated'.

Shown exemplary steps executed at the luggage transport system's transport system boundary, include: (1) luggage add-on is interrogated at luggage transport system boundary for its digital signature; (2) interrogated digital signature is communicated to the system server; (3) system server checks current status of received digital signature in digital signature status database; and (4) if add-on signature is not activated then end process iteration, else (5) system server issues/relays notification(s) and/or alarm or updates luggage boundary (e.g. add-on interrogator) of a still activated signature.

Figure 5:
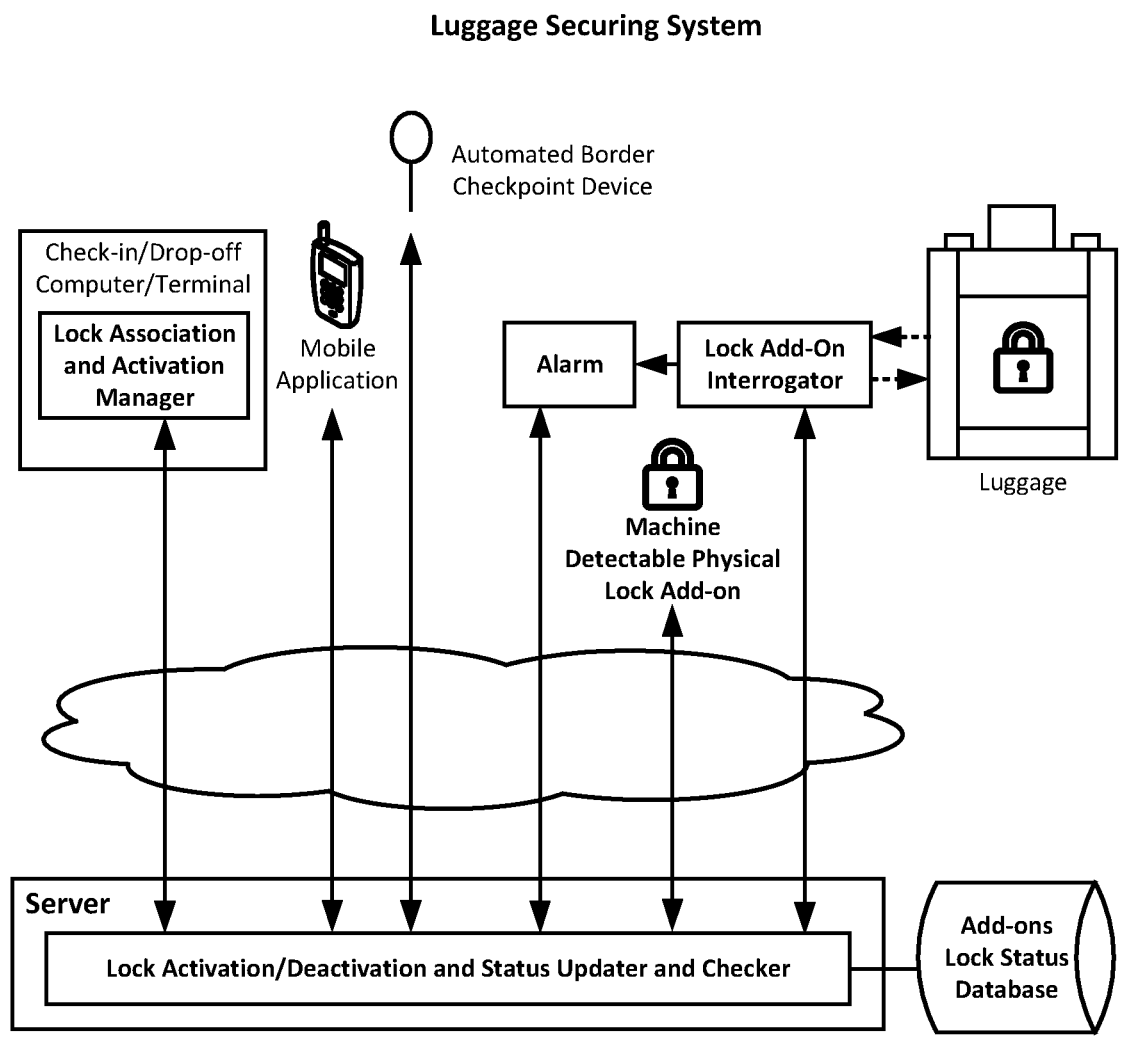
In FIG. 5 there is shown a block diagram of an exemplary system for securing luggage passing through a luggage transport system, in accordance with some embodiments of the present invention, wherein an exemplary physical lock activation/deactivation based luggage authentication is implemented.

Reference is now made to FIG. 5, where there is shown a block diagram of an exemplary system for securing luggage passing through a luggage transport system, in accordance with some embodiments of the present invention, wherein an exemplary physical lock activation/deactivation based luggage authentication is implemented.

In the figure, there is shown a system server comprising a 'lock activation/deactivation and status updater and checker', communicatively connected to: a lock association and activation manager component, plug-in, application, or module, of a check-in or luggage drop-off computer/terminal; a user (luggage possessor) application running on a mobile communication device; an automated border checkpoint device; an alarm or notification engine; and a luggage lock add-on interrogator interrogating the machine detectable luggage lock add-on for its digital signature.

The system server is shown to also be connected to an add-ons lock status database. The 'lock activation/deactivation and status updater and checker' manages the generation, access, update and querying of add-on lock status database data records.

Figure 6A:
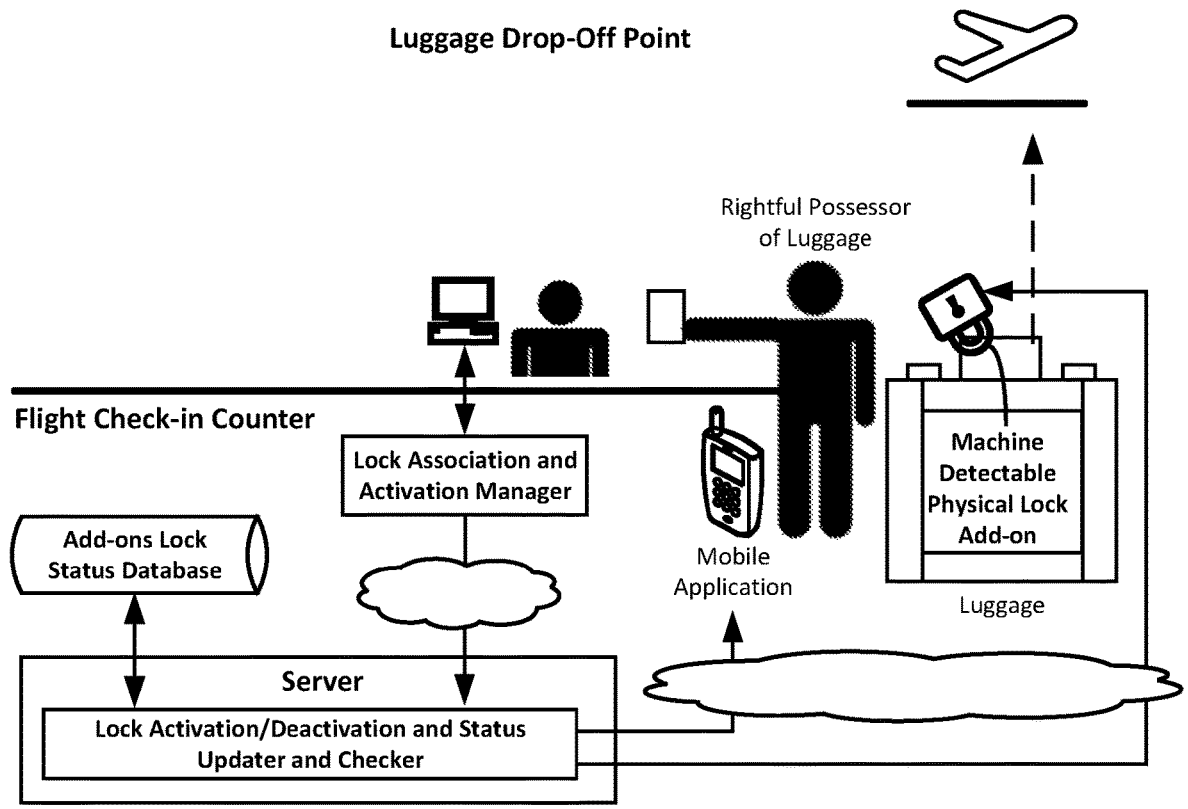
In FIG. 6A there is shown a schematic diagram of an exemplary lock activation/deactivation based system for securing luggage passing through a luggage transport system, in accordance with some embodiments of the present invention, wherein system components and system process flow at a luggage drop-off point is shown.

Reference is now made to FIG. 6A, where there is shown a schematic diagram of an exemplary lock activation/deactivation based system for securing luggage passing through a luggage transport system, in accordance with some embodiments of the present invention, wherein system components and system process flow at a luggage drop-off point is shown.

In the figure, a rightful possessor of a luggage item is shown to deposit it at a flight check-in counter. A machine detectable luggage lock add-on, including a machine-readable digital signature, is associated to the luggage item by the lock association and activation manager at the check-in computer/terminal and the lock is appended to the deposited luggage item.

The lock association and activation manager then communicates check-in computer/terminal inputted possessor details and the lock add-on signature or ID associated therewith to the system server. The server's 'lock activation/deactivation and status updater and checker' updates the add-on lock status database records of the lock add-on's activation, sends a locking command to the lock add-on and then sends an activation/locking confirmation notification to the possessor's mobile device application identified based on check-in computer/terminal inputted possessor details. Alternatively, the 'lock activation/deactivation and status updater and checker' may generate and communicate a lock add-in locking code/pin to the possessor's mobile device application, for the possessor to enter the code/pin directly into a lock interface of the lock in order to trigger its locking over the luggage item.

Figure 6B:
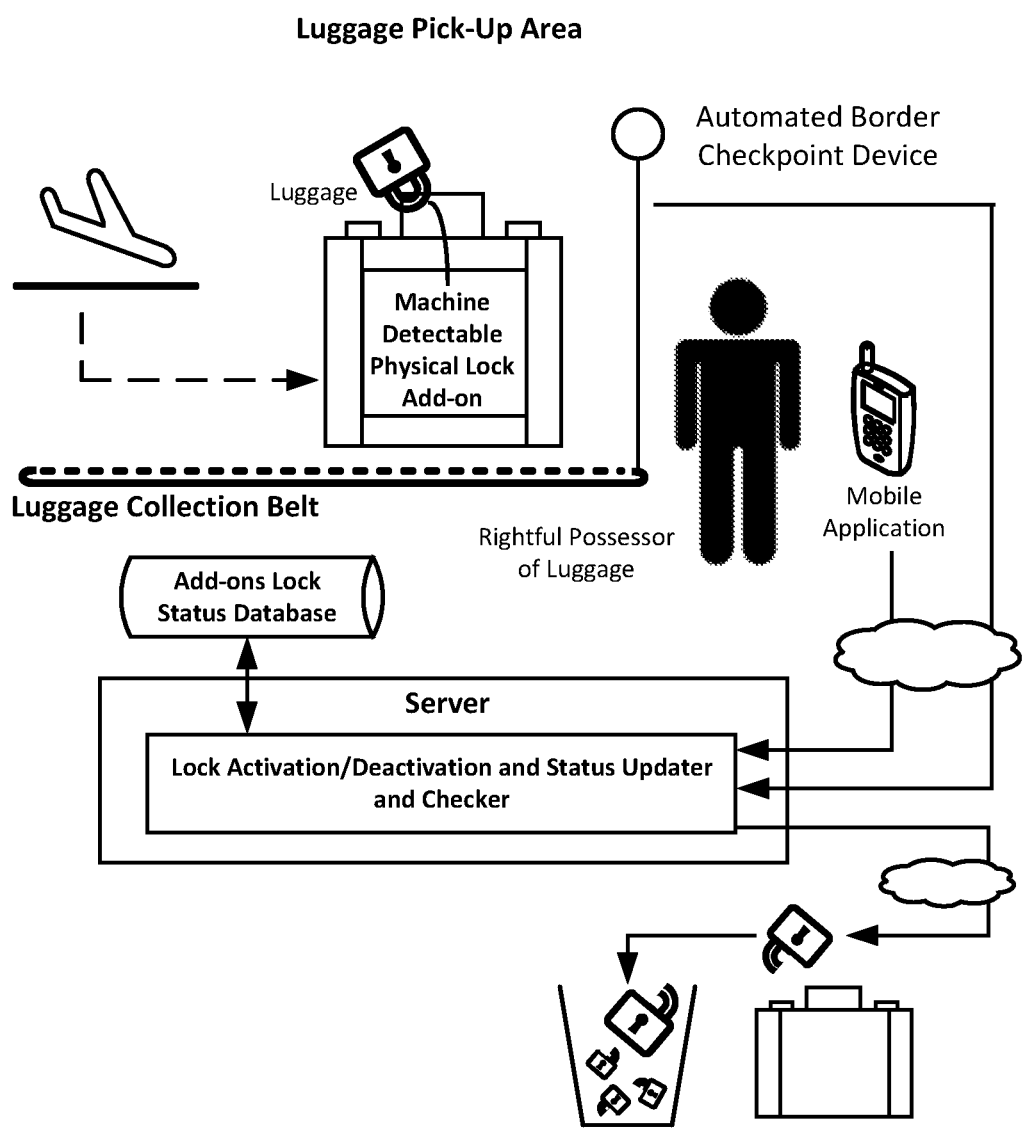
In FIG. 6B there is shown a schematic diagram of an exemplary lock activation/deactivation based system for securing luggage passing through a luggage transport system, in accordance with some embodiments of the present invention, wherein system components and system process flow at a luggage pick-up area is shown.

Reference is now made to FIG. 6B, where there is shown a schematic diagram of an exemplary lock activation/deactivation based system for securing luggage passing through a luggage transport system, in accordance with some embodiments of the present invention, wherein system components and system process flow at a luggage pick-up area is shown.

In the figure, the rightful possessor of the luggage item is shown to repossess his luggage item from the luggage collection belt. An automated border checkpoint device—adapted to identify the possessor by reading or receiving a possessor digital signature, or another identifying/association detail as described herein, from the possessor; or the possessor's mobile device application—where activation status of all past and current possessor items may be presented for user update—are used to update the server's 'lock activation/deactivation and status updater and checker' that updates the add-on lock status database records of the issued lock's deactivation and sends an unlocking command to the specific lock. Upon unlocking, the luggage possessor separates the physical lock add-on from the luggage item and dispenses it at a designated collection point.

Figure 6C:
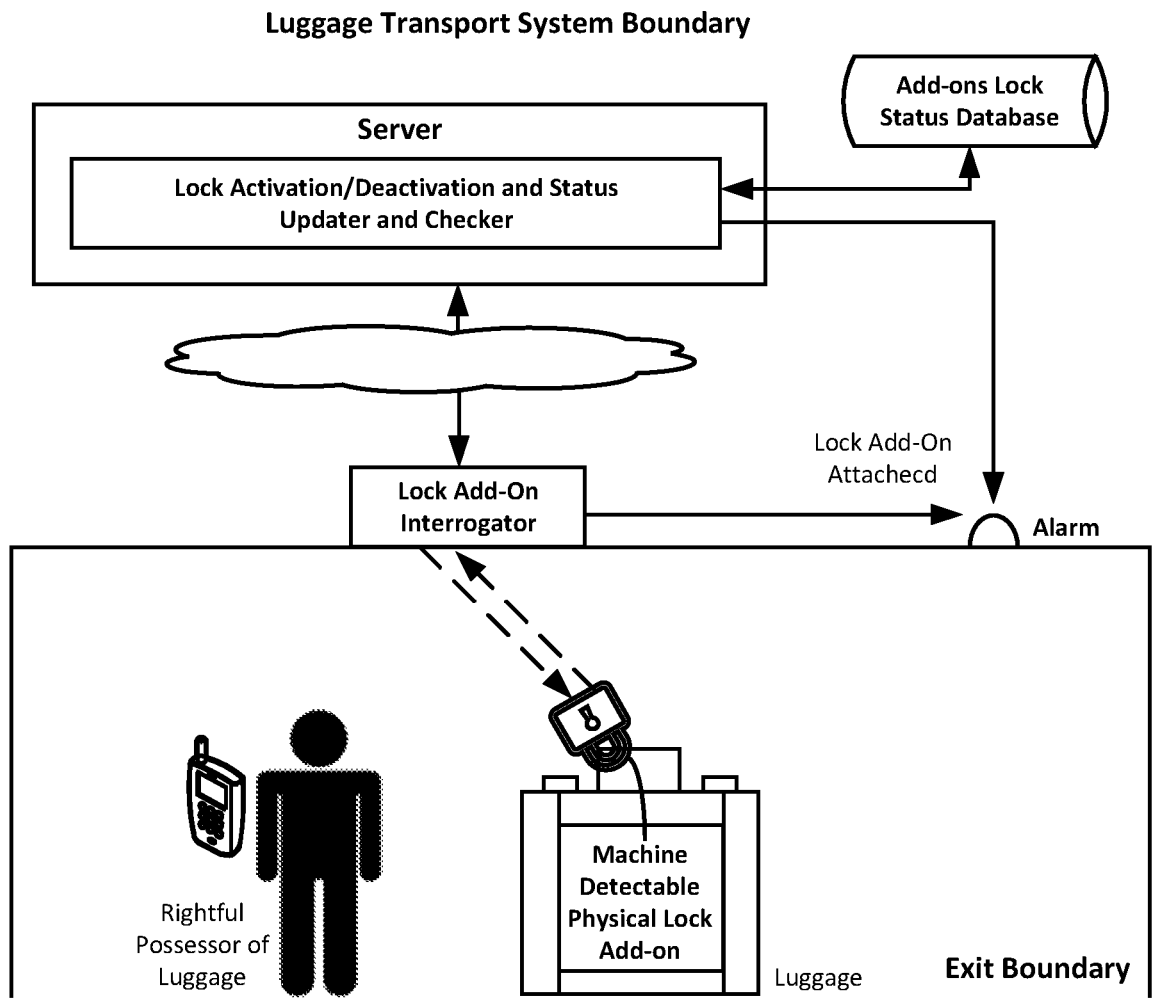
In FIG. 6C there is shown a schematic diagram of an exemplary lock activation/deactivation based system for securing luggage passing through a luggage transport system, in accordance with some embodiments of the present invention, wherein system components and system process flow at a luggage transport system boundary is shown.

Reference is now made to FIG. 6C, where there is shown a schematic diagram of an exemplary lock activation/deactivation based system for securing luggage passing through a luggage transport system, in accordance with some embodiments of the present invention, wherein system components and system process flow at a luggage transport system boundary is shown.

In the figure, the rightful possessor of the luggage item is shown to approach, or pass through, a luggage transport system boundary such as an airport customs or exit terminal gate. A lock add-on interrogator detects/picks-up-signal—from the luggage lock add-on interrogating it for its digital signature. The read digital signature is then communicated to the server and the server's 'lock activation/deactivation and status updater and checker' queries the digital signature status database records for verifying whether the interrogator read digital signature belongs to a system lock add-on.

If the database query indicates that the digital signature read off the lock add-on belongs to a system lock add-on (i.e. the lock has not been deactivated, unlocked and dispensed of at pick-up area) the server issues a system alarm or updates a system notification engine, directly, or by updating the lock add-on interrogator of the lock add-on digital signature it has just interrogated belonging to a system lock not dispensed. Conversely, if no database record of the read luggage lock add-on signature is found (i.e. has been unlocked and dispensed at pick-up area) then no action is triggered and the luggage possessor can continue beyond the luggage transport system boundary with his, now known to be rightful, luggage item.

Figure 7:
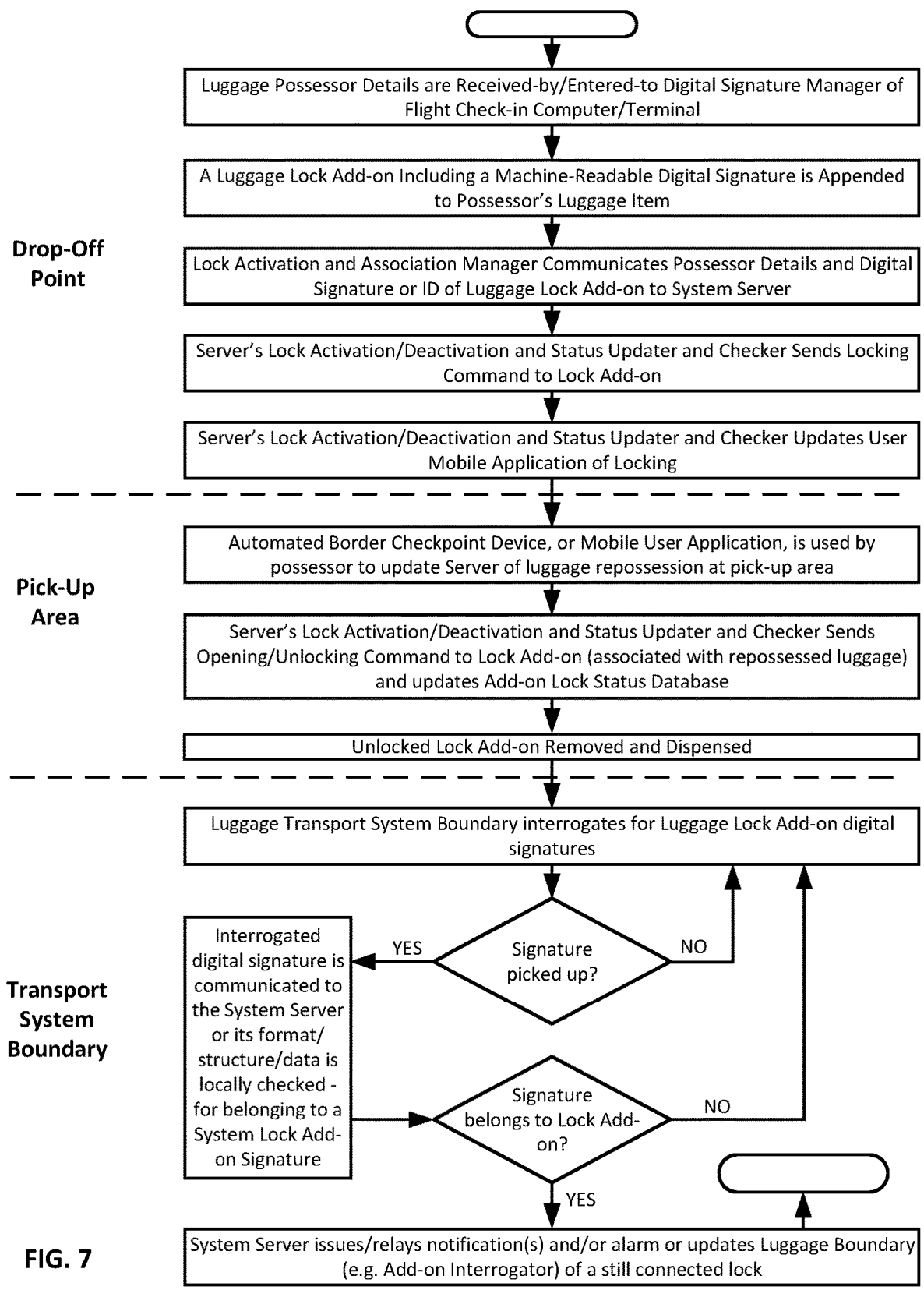
In FIG. 7 there is shown a flowchart of the main steps executed by an exemplary system for securing luggage passing through a luggage transport system, in accordance with some embodiments of the present invention, wherein an exemplary lock activation/deactivation based luggage authentication is implemented.

Reference is now made to FIG. 7, where there is shown a flowchart of the main steps executed by an exemplary system for securing luggage passing through a luggage transport system, in accordance with some embodiments of the present invention, wherein an exemplary lock activation/deactivation based luggage authentication is implemented.

Shown exemplary steps executed at the luggage transport system's drop-off point, include: (1) luggage possessor details are received-by/entered-to digital signature manager of flight check-in computer/terminal; (2) a luggage lock add-on including a machine-readable digital signature is appended to possessor's luggage item; (3) lock activation and association manager communicates possessor details and digital signature or identification of luggage lock add-on to system server; (4) server's lock activation/deactivation and status updater and checker sends locking command to lock add-on; and (5) server's lock activation/deactivation and status updater and checker updates user mobile application of locking.

Shown exemplary steps executed at the luggage transport system's pick-up area, include: (1) automated border checkpoint device, or mobile user application, is used by possessor to update server of luggage repossession at pick-up area; (2) server's lock activation/deactivation and status updater and checker sends opening/unlocking command to lock add-on (associated with repossessed luggage) and updates add-on lock status database; and (3) unlocked lock add-on removed and dispensed.

Shown exemplary steps executed at the luggage transport system's transport system boundary, include: (1) luggage transport system boundary interrogates for luggage lock add-on digital signatures; if (2) lock add-on signature is not picked up then end process iteration, else (3) interrogated digital signature picked up is communicated to the system server or its format/structure/data is locally checked—for belonging to a system lock add-on signature; if (4) signature does not belong to a system lock add-on then end process iteration, else (5) system server issues/relays notification(s) and/or alarm or updates luggage boundary (e.g. add-on interrogator) of a still connected lock.

According to some non-limiting embodiments, an exemplary comprehensive system may electronically link a luggage item with a passenger/possessor as the passenger is passing through an exit boundary (e.g. customs). Based on a code/signature status checking system, in the event that a luggage code/signature is activated, an alarm would sound alerting customs personnel. In the event the luggage code is deactivated, as it may be in most cases, no alarm sounds and the terminal leaving process is smooth.

The comprehensive solution may include two stages: Stage 1) at departure, the airline providing the passenger with a luggage add-on/sticker, using a machine/printer to generate the electronic tag sticker for the luggage item(s). Stage 2) on arrival, the passenger collects his/her luggage and updates the system/server thus deactivating his luggage tag sticker. The passenger then passes through customs/exit-boundary via an electronic article surveillance system (EAS) that may, to some extent, emulate systems used in shops against shop-lifting. As long as the code (on the luggage) is found to be deactivated, no alarm sounds. In the event of an activated code an alarm sounds and the activated luggage removal is investigated by alarmed/notified airport security personnel.

Figure 8A:
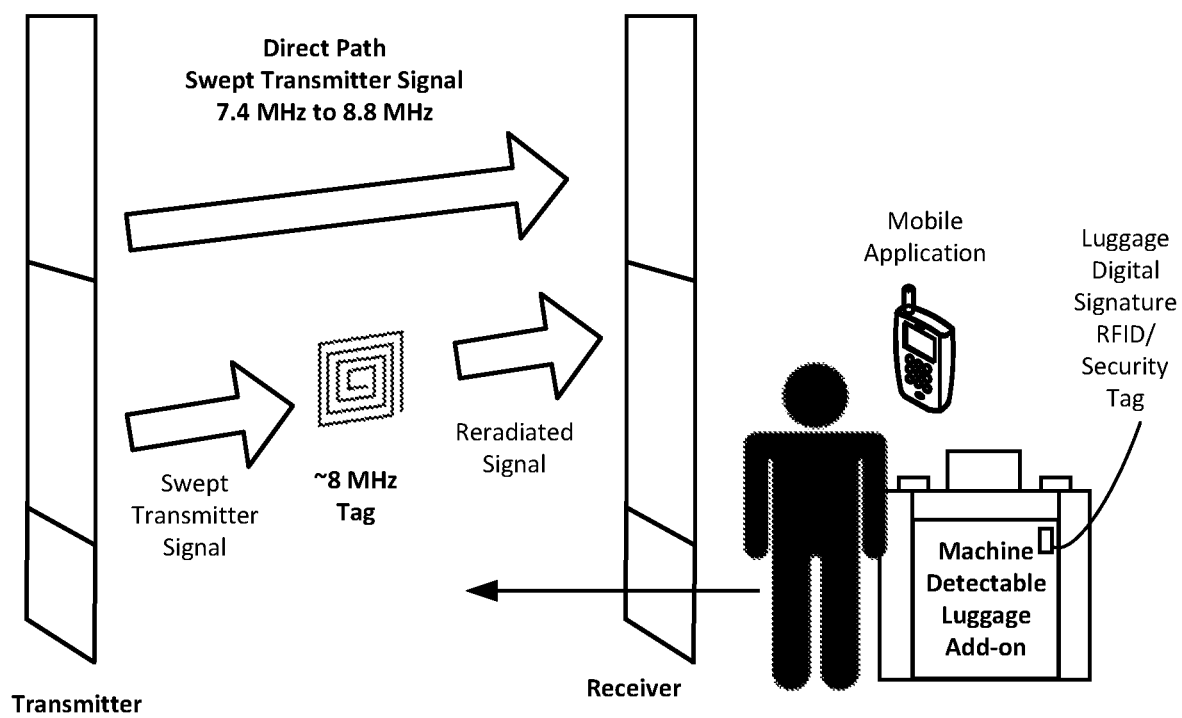
In FIG. 8A there is shown a first exemplary RF EAS interrogation boundary, of an exemplary system for luggage security, in accordance with some embodiments.

Reference is now made to FIG. 8A, where there is shown an exemplary RF EAS interrogation boundary, of an exemplary system for luggage security, in accordance with some embodiments. A label—in the example, a miniature, disposable electronic circuit and antenna—is attached to a label/tag/sticker/add-on and responds to a specific frequency emitted by a transmitter antenna (usually one pedestal of the entry/exit gate). The response from the label is then picked up by an adjacent receiver antenna (the other pedestal). This processes the label response signal and will trigger an alarm when it matches specific criteria—in the example, the deactivated status of a luggage tag. The electronic tag may be printed at the departure-airline/check-in counter, for example, using an EAS printing machine.

Figure 8B:
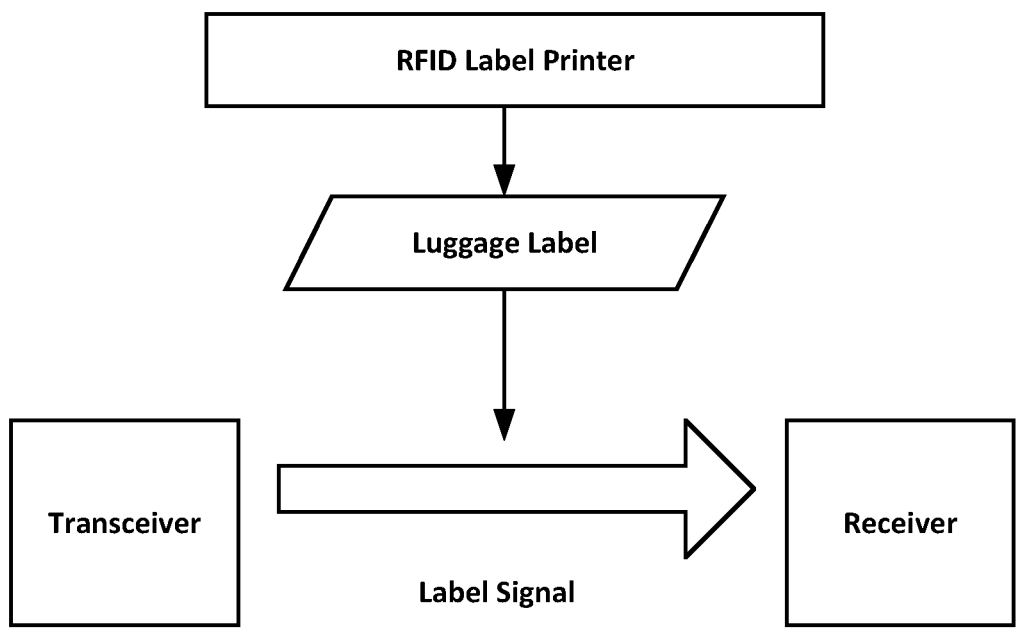
In FIG. 8B there is shown a block diagram of an exemplary luggage to possessor authentication flow of an exemplary system for securing luggage passing through a luggage transport system, in accordance with some embodiments of the present invention.

Reference is now made to FIG. 8B, where there is shown a block diagram of an exemplary luggage to possessor authentication flow of an exemplary system for securing luggage passing through a luggage transport system, in accordance with some embodiments of the present invention, wherein an exemplary activation/deactivation based luggage authentication is implemented. An RFID label printer, prints a luggage label. The label is interrogated, at an exit interrogation boundary, by a transmitter signal to generate a reradiated signal picked up by the receiver. Received signal is then used to reference a label signal/signature status table/database to verify deactivation.

According to some embodiments of the present invention, a system for user-interactive dynamic routing, securing, controlling and authenticating of luggage passing through a luggage transport system of an airport or other transportation hub, may implement a Correlation Based Possessor to Luggage Authentication, wherein the possessor is associated with a luggage item at check-in. Add-on digital signature of a luggage item repossessed at the pickup area and, a digital signature carried by the luggage possessor or stored to his mobile device, are both interrogated at an interrogation boundary, compared and must correlate/match to prevent an alert.

At the interrogation boundary, add-ons of all passing luggage items and all passing possessors/possessor-devices may be interrogated. Replay data of interrogated pairs of an add-on and a possessor—including identification return signal, a digital signature, or a signature/luggage-characteristic/possessor-bio derived digital representation—are relayed to a server of the luggage security system, or to a local 'luggage add-on signature to possessor signature correlation and comparison logic', for comparison or correlation check by reference of a digital signature correlation database including records of luggage-possessors and luggage-items associated therewith.

According to some embodiments, if the digital signatures, of a given add-on reply data and a given possessor, are found to be correlated in the database records, then the server returns an 'ignore' command to the interrogation boundary and no further action is taken; if the digital signatures, of a given add-on reply data and a given possessor, are found to be not correlated in the database records, then the server returns an 'alert' command to the interrogation boundary that triggers notification or alarms associated with a luggage mix-up (passengers taking each other's items), in response; if only the digital signature of a given luggage add-on reply data is picked-up at interrogation, then the server returns an 'alert' command to the interrogation boundary that triggers notification or alarms associated with a luggage theft or its removal by a non-rightful possessor, in response; if only the digital signature of a given luggage possessor reply data is picked-up at interrogation, then the server returns an 'alert' command to the interrogation boundary that triggers notification or alarms associated with a luggage being left-behind or forgotten, in response.

An exemplary interrogation boundary and/or controller/control-logic thereof, in accordance with some embodiments, may interrogate both luggage add-ons and possessors, and may relate/react to at least the following interrogation scenarios: (a) No signature interrogation pickup in proximity/passing-through—No action; (b) Interrogation pickup of a luggage signature only, or unsuccessful correlation of a picked-up luggage signature—Alert/Notify (possible luggage theft); (c) Interrogation pickup of a possessor signature only, or unsuccessful correlation of a picked-up possessor signature—Alert/Notify (possible luggage was left behind); or (d) interrogation pickup of both a luggage signature and a successfully correlated possessor signature in proximity—No action.

According to some embodiments, luggage items add-on signatures (or a digital representation/manipulation thereof) along with respective associated possessor signatures (or a digital representation/manipulation thereof) may be stored on: (a) a local (e.g. as part of the interrogation boundary) database or digital memory component, wherein the interrogation boundary may further include a database/memory querying logic to reference the database/memory luggage to possessor signatures correlation records with interrogation replies being acquired; (b) a database associated with the luggage security/anti-theft system server; (c) a cloud data storage; and/or (d) any digital data storage type or location, accessible by the luggage security system's: server, luggage check-in computers or system components, user device applications and/or automated border checkpoint devices.

Figure 9:
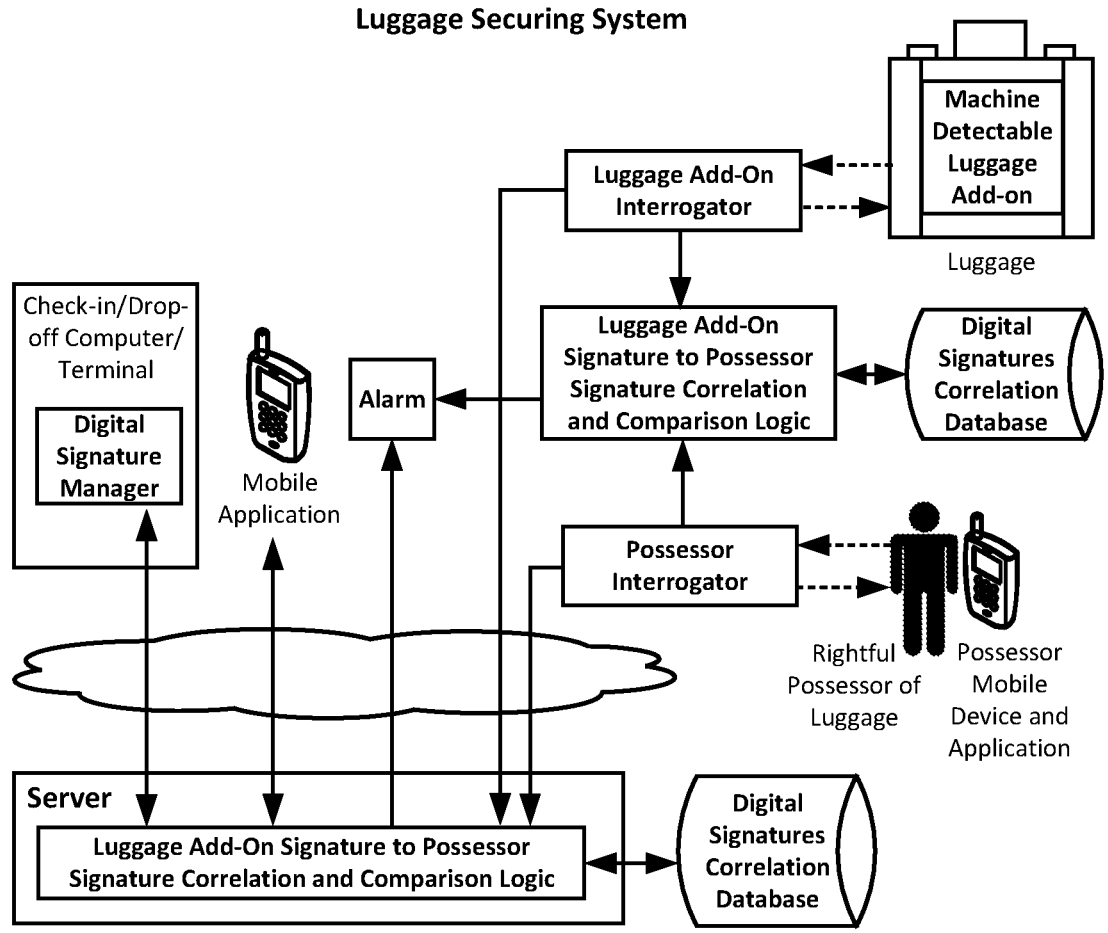
In FIG. 9 there is shown a block diagram of an exemplary system for securing luggage passing through a luggage transport system, in accordance with some embodiments of the present invention, wherein an exemplary correlation based possessor to luggage authentication is implemented.

Reference is now made to FIG. 9, where there is shown a block diagram of an exemplary system for securing luggage passing through a luggage transport system, in accordance with some embodiments of the present invention, wherein an exemplary correlation based possessor to luggage authentication is implemented.

In the figure, there is shown a system server comprising a 'luggage add-on signature to possessor signature correlation and comparison logic', communicatively connected to: a digital signature manager component, plug-in, application, or module, of a check-in or luggage drop-off computer/terminal; an optional, user (luggage possessor) application running on a mobile communication device—for device based possessor signature; an alarm or notification engine; a luggage add-on interrogator interrogating the machine detectable luggage add-on for its digital signature; and a possessor/possessor-device interrogator interrogating the machine detectable possessor-carried/possessor-device-stored digital signature.

A 'luggage add-on signature to possessor signature correlation and comparison logic'—in addition or instead of the server one shown—may, for example, be located/positioned in proximity to and functionally associated with, or may be integrated as part of, an interrogation boundary of a system for luggage security in accordance with embodiments of the present invention.

The system server, and the additional correlation and comparison logic, are shown to also be connected to a digital signatures correlation databases. The correlation and comparison logic manages the generation, access, update and querying of signatures correlation database data records.

Figure 10A:
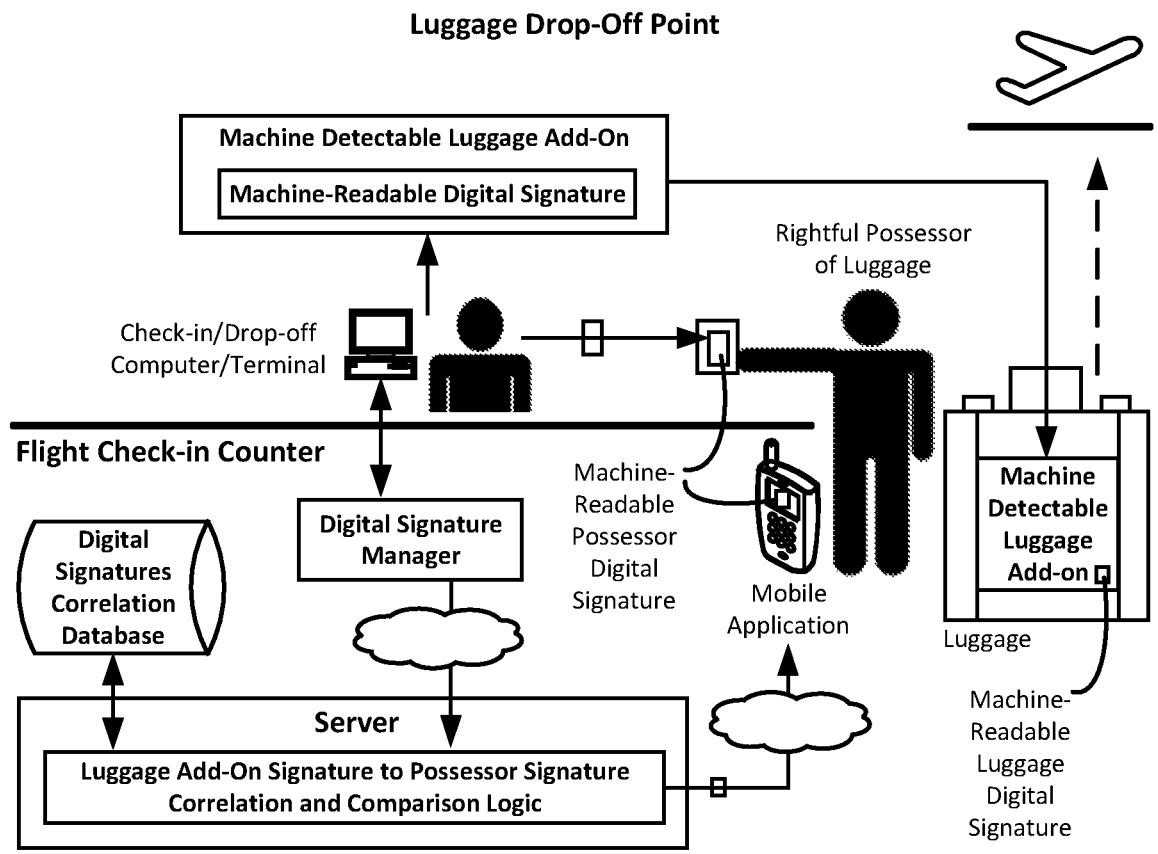
In FIG. 10A there is shown a schematic diagram of an exemplary system for securing luggage passing through a luggage transport system, in accordance with some embodiments of the present invention, wherein system components and system process flow at a luggage drop-off point is shown.

Reference is now made to FIG. 10A, where there is shown a schematic diagram of an exemplary system for securing luggage passing through a luggage transport system, in accordance with some embodiments of the present invention, wherein system components and system process flow at a luggage drop-off point is shown.

In the figure, a rightful possessor of a luggage item is shown to deposit it at a flight check-in counter. A machine detectable luggage add-on, including a machine-readable digital signature, is issued by the digital signature manager, generated (e.g. RFID tag printed) at the check-in computer/terminal and appended to the deposited luggage item. A machine detectable possessor carried tag/pass/other, including a machine-readable digital signature, is issued by the digital signature manager, generated (e.g. RFID tag printed) at the check-in computer/terminal and provided to the deposited luggage's possessor. According to some embodiments, the tags/add-ons generated (e.g. RFID tags printed) at the check-in computer/terminal and provided to the deposited luggage's possessor, may be likewise/alternatively generated at the boarding gate.

The digital signature manager then communicates check-in computer/terminal inputted possessor details/signature-issued and the luggage add-on signature issued to the system server. The server's 'luggage add-on signature to possessor signature correlation and comparison logic' correlatively stores the digital signatures as associated database records and then may send a confirmation notification to the possessor's mobile device application identified based on check-in computer/terminal inputted/issued possessor details/signature.

An alternative/additional type of machine detectable and machine-readable possessor digital signature, in accordance with embodiments, is shown to be generated by the system server, based on details/digital-signature provided by the digital signature manager, and then communicated to the deposited luggage's possessor device. Communicated machine-readable possessor digital signature may be stored to possessor device and, transmitted, communicated, broadcasted or otherwise presented/provided to system boundary interrogating components: intermittently, upon interrogation signal receipt, based on a predetermined schedule and/or based on a dynamically set schedule—in accordance with instructions provided by a mobile application running on the possessor device.

Figure 10B:
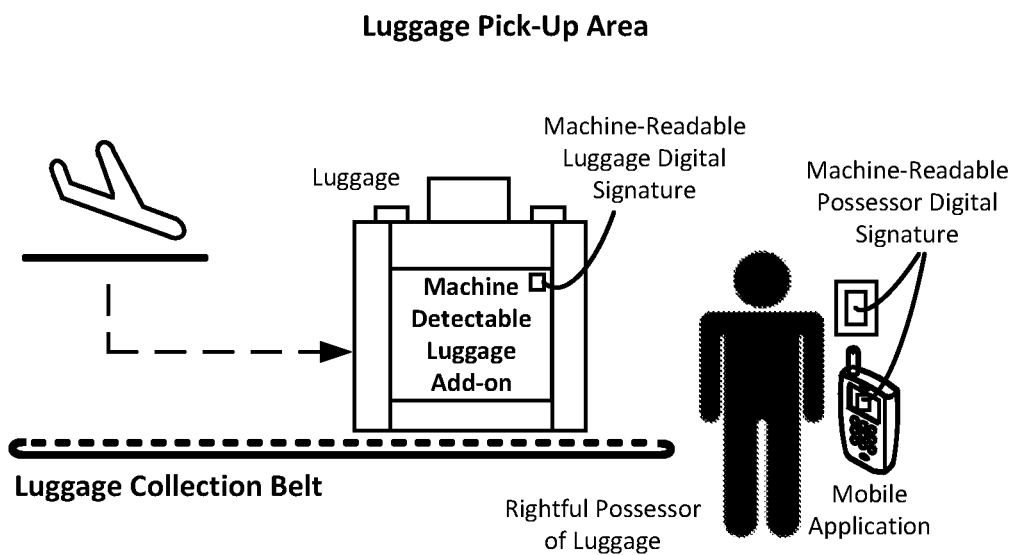
In FIG. 10B there is shown a schematic diagram of an exemplary system for securing luggage passing through a luggage transport system, in accordance with some embodiments of the present invention, wherein system components and system process flow at a luggage pick-up area is shown.

Reference is now made to FIG. 10B, where there is shown a schematic diagram of an exemplary system for securing luggage passing through a luggage transport system, in accordance with some embodiments of the present invention, wherein system components and system process flow at a luggage pick-up area is shown.

In the figure, the rightful possessor of the luggage item, carrying a machine-readable possessor digital signature or having one stored to his mobile device, is shown to repossess his luggage item—having a machine-readable luggage digital signature add-on—from the luggage collection belt.

Figure 10C:
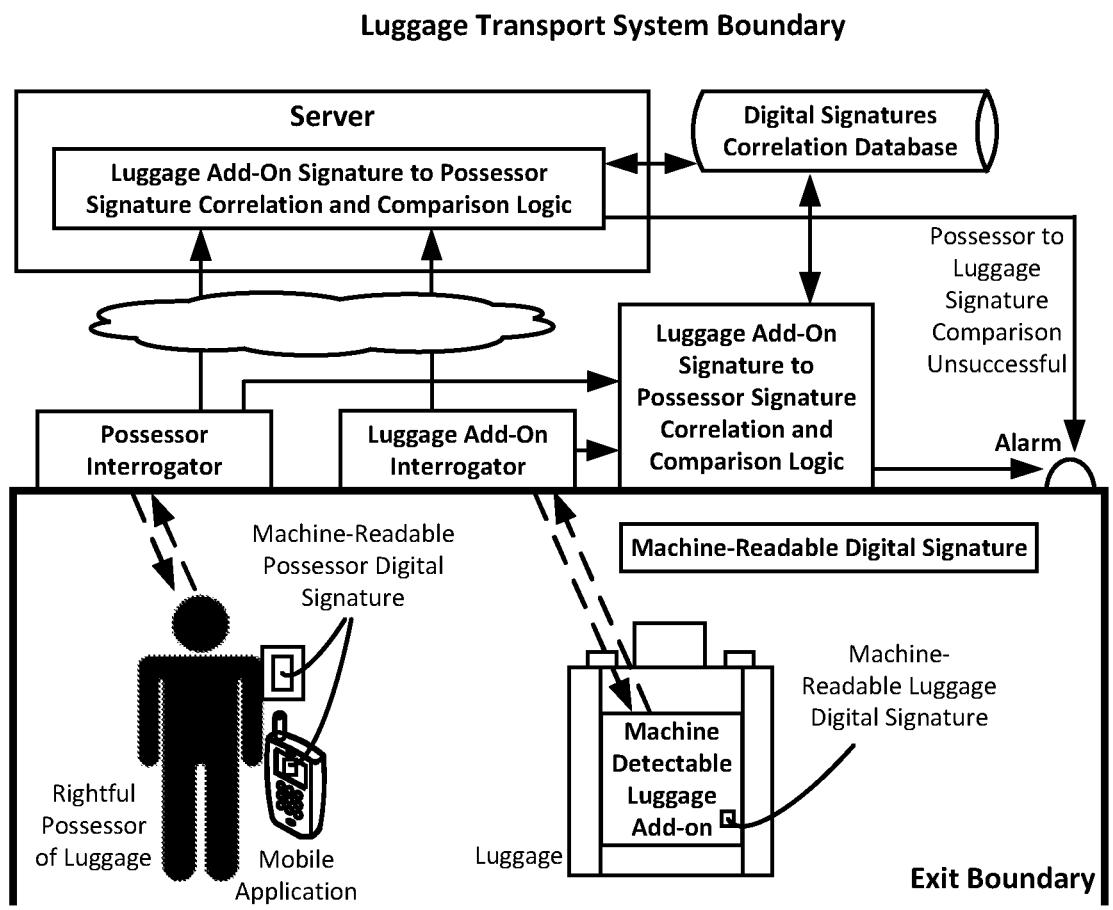
In FIG. 10C there is shown a schematic diagram of an exemplary system for securing luggage passing through a luggage transport system, in accordance with some embodiments of the present invention, wherein system components and system process flow at a luggage transport system boundary is shown.

Reference is now made to FIG. 10C, where there is shown a schematic diagram of an exemplary system for securing luggage passing through a luggage transport system, in accordance with some embodiments of the present invention, wherein system components and system process flow at a luggage transport system boundary is shown.

In the figure, the rightful possessor of the luggage item is shown to approach, or pass through, a luggage transport system boundary such as an airport customs or exit terminal gate. A luggage add-on interrogator detects/picks-up-signal—from the luggage add-on interrogating it for its digital signature. A possessor interrogator detects/picks-up-signal—from the possessor card/pass/mobile-device interrogating it for its digital signature.

The read digital signatures are then communicated to the server's, or a local boundary-integrated, 'luggage add-on signature to possessor signature correlation and comparison logic' that directly compares the two signatures and verifies their matching, or queries/references the digital signatures correlation database records to verify correlation there between.

If the read luggage add-on signature and possessor signature match, or are found to be correlated, the 'luggage add-on signature to possessor signature correlation and comparison logic' then no action is triggered and the luggage possessor can continue beyond the luggage transport system boundary with his, now known to be rightful, luggage item.

If the read luggage add-on signature and possessor signature do not match, or are found to be non-correlated, the 'luggage add-on signature to possessor signature correlation and comparison logic' issues a system alarm (e.g. luggage mix-up) or updates a system notification engine of the non-matching signatures it has just interrogated.

If only a luggage add-on signature was picked-up with no possessor signature detected in proximity, the 'luggage add-on signature to possessor signature correlation and comparison logic' issues a system alarm (e.g. luggage removed by non-rightful possessor) or updates a system notification engine of the sole/non-paired luggage add-on signature it has just interrogated.

If only a possessor signature was picked-up with no luggage add-on signature detected in proximity, the 'luggage add-on signature to possessor signature correlation and comparison logic' issues a system alarm (e.g. luggage left behind by possessor) or updates a system notification engine of the sole/non-paired possessor signature it has just interrogated.

Figure 11:
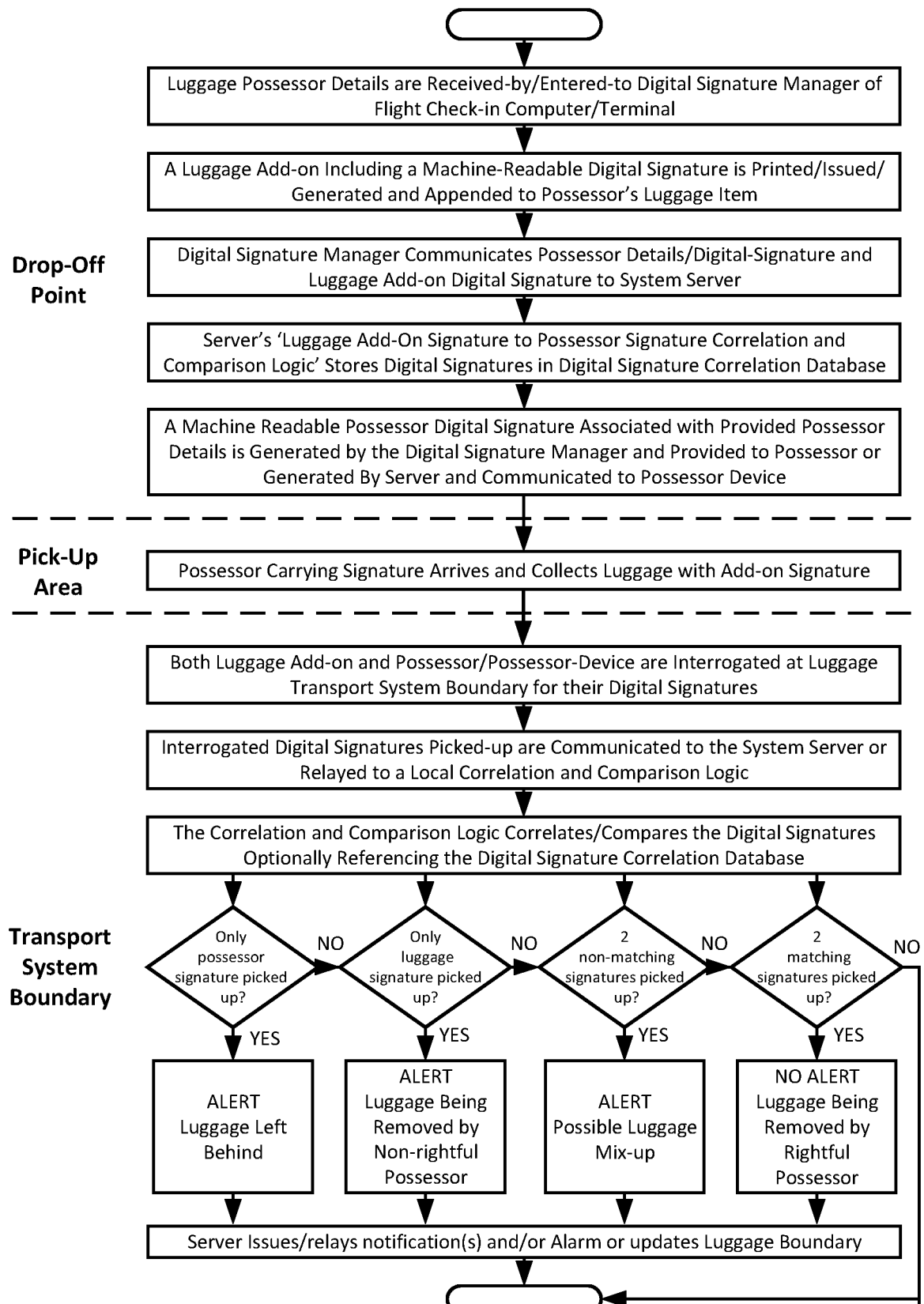
In FIG. 11 there is shown a flowchart of the main steps executed by an exemplary system for securing luggage passing through a luggage transport system, in accordance with some embodiments of the present invention, wherein an exemplary correlation based possessor to luggage authentication is implemented.

Reference is now made to FIG. 11, where there is shown a flowchart of the main steps executed by an exemplary system for securing luggage passing through a luggage transport system, in accordance with some embodiments of the present invention, wherein an exemplary correlation based possessor to luggage authentication is implemented.

Shown exemplary steps executed at the luggage transport system's drop-off point, include: (1) luggage possessor details are received-by/entered-to digital signature manager of flight check-in computer/terminal; (2) a luggage add-on including a machine-readable digital signature is printed/issued/generated and appended to possessor's luggage item; (3) digital signature manager communicates possessor details/digital-signature and digital signature of printed/issued/generated luggage add-on to system server; (4) server's 'luggage add-on signature to possessor signature correlation and comparison logic' stores digital signatures in digital signatures correlation database; and (5) a machine readable possessor digital signature associated with provided possessor details is generated by the digital signature manager and provided to possessor or generated by server and communicated to possessor device.

Shown exemplary step, executed at the luggage transport system's pick-up area, includes: possessor carrying signature/device-signature arrives and collects luggage with add-on signature.

Shown exemplary steps executed at the luggage transport system's transport system boundary, include: (1) both luggage add-on and possessor/possessor-device are interrogated at luggage transport system boundary for their digital signatures; (2) interrogated digital signatures picked-up are communicated to the system server or relayed to a local correlation and comparison logic; (3) the correlation and comparison logic correlates/compares the digital signatures optionally referencing the digital signature correlation database; (4) if only possessor signature is picked up—alert, notify, alarm and/or update of luggage left behind then end process iteration; else (5) if only luggage signature picked up—alert, notify, alarm and/or update of luggage being removed by non-rightful possessor then end process iteration; else (6) if 2 non-matching signatures picked up—alert, notify, alarm and/or update of possible luggage-possessor mix-up then end process iteration; else (7) if 2 matching signatures picked up—no alert, luggage being removed by rightful possessor, update correlation and comparison logic of signature match/successful-correlation, then end process iteration; and else (8) end process iteration.

According to some non-limiting embodiments, an exemplary comprehensive system may electronically link a luggage item with a passenger/possessor as the passenger is passing through an exit boundary (e.g. customs). Based on a code/signature matching system, in the event that a luggage code/signature does not match a boarding pass code, an alarm would sound alerting customs personnel. In the event the luggage code matches the passenger's code, as it may be in most cases, no alarm sounds and the terminal leaving process is smooth.

The comprehensive solution may include two stages: Stage 1) at departure, the airline providing the passenger with 2 luggage add-ons/stickers, using a machine/printer to generate the electronic tag stickers for the luggage item(s) and for the boarding pass of the passenger. Stage 2) on arrival, the passenger collects his/her luggage and will pass through customs/exit-boundary via an electronic article surveillance system (EAS) that may to some extent emulate systems used in shops against shop-lifting. As long as the codes (on the luggage and boarding pass) match, no alarm sounds. In the event of a mismatch an alarm sounds and the mismatch is investigated by alarmed/notified airport security personnel.

Figure 12A:
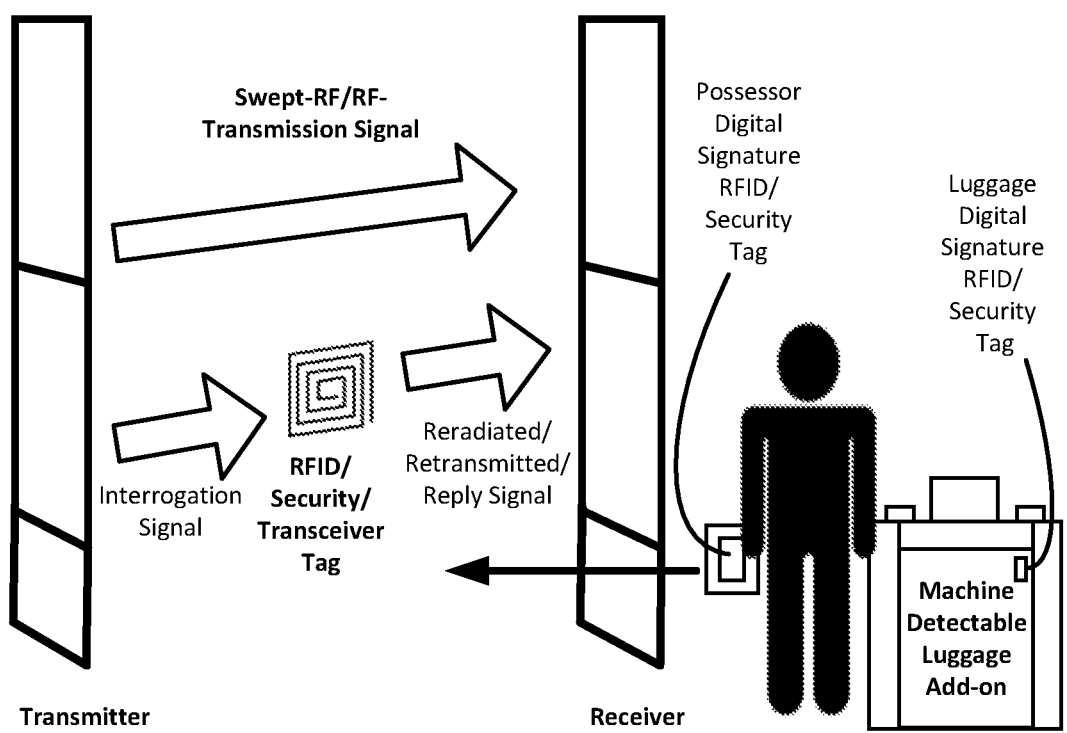
In FIG. 12A there is shown a second exemplary RF EAS interrogation boundary, of an exemplary system for luggage security, in accordance with some embodiments.

Reference is now made to FIG. 12A, where there is shown an exemplary RF EAS interrogation boundary, of an exemplary system for luggage security, in accordance with some embodiments. A label—in the example, a miniature, disposable electronic circuit and antenna—is attached to a label/tag/sticker/add-on and responds to a specific frequency emitted by a transmitter antenna (usually one pedestal of the entry/exit gate). The response from the label is then picked up by an adjacent receiver antenna (the other pedestal). This processes the label response signal and will trigger an alarm when it matches specific criteria—in the example, the matching of a luggage tag to a boarding pass tag. The electronic tags may be printed at the departure-airline/check-in counter, for example, using an EAS printing machine.

Figure 12B:
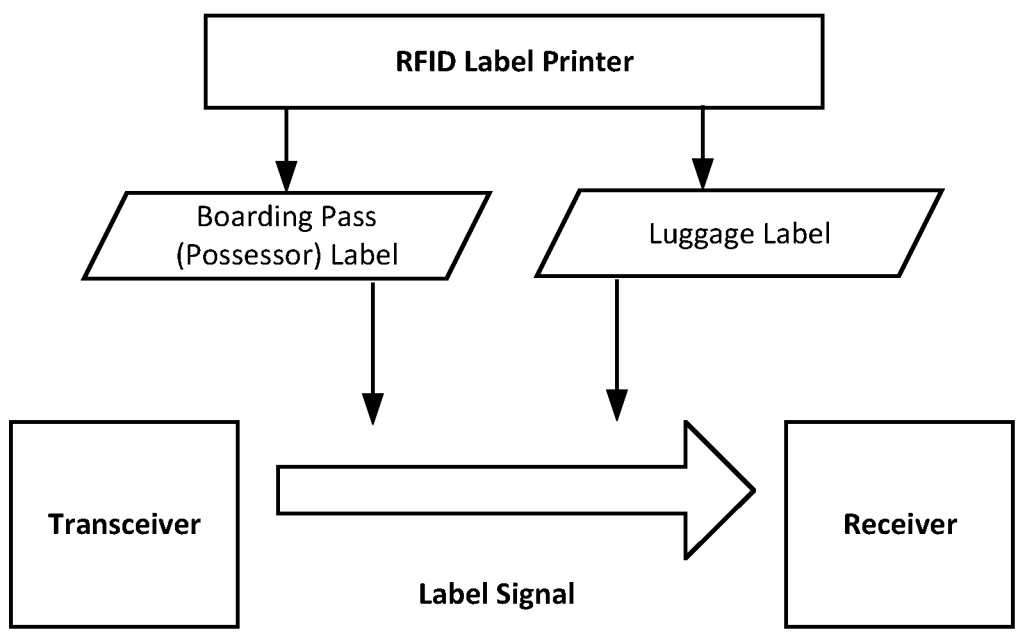
In FIG. 12B there is shown a block diagram of an exemplary luggage to possessor authentication flow of an exemplary system for securing luggage passing through a luggage transport system, in accordance with some embodiments of the present invention.

Reference is now made to FIG. 12B, where there is shown a block diagram of an exemplary luggage to possessor authentication flow of an exemplary system for securing luggage passing through a luggage transport system, in accordance with some embodiments of the present invention, wherein an exemplary correlation based luggage authentication is implemented. An RFID label printer, prints a boarding-pass (possessor/passenger) label and a luggage label. The labels are both interrogated, at an exit interrogation boundary, by a transmitter signal to generate a reradiated signal picked up by the receiver. Received signals are then be compared to verify matching passenger/possessor and luggage.

According to embodiments of the present invention, there may be provided a luggage routing, tracking and security system which may assign to luggage being checked-in a unique identifier which can be encoded within a wirelessly interrogatable add-on placed on or within the luggage. The system may include a database which stores a unique identifier watch list which is accessible from transportation system boundary luggage interrogators.

According to an embodiment, when a rightful luggage possessor collects their luggage, the unique identifier associated with the luggage may be removed or otherwise deactivated from the watch list database. According this embodiment, if a boundary luggage interrogator detects a luggage add-on whose unique identifier is on the watch list (i.e. not free to pass), and/or has not otherwise been deactivated, an alarm may be triggered.

According to some embodiments, a boundary luggage interrogator may include: a luggage item RFID add-on interrogator; an optical luggage item, or luggage item number/characteristic, identification module; and/or a combination of both radio based and optics based luggage item identification solutions, wherein results may be normalized, averaged, cross-verified, or otherwise co-factored as part of a luggage item identification-success optimization process.

According to some embodiments, an optical luggage item counting solution, may be used to detect luggage items as they pass through the boundary luggage interrogator. The number of luggage items passing—over a selected time period—may be dynamically compared to the number of successful (return signal received and read) RFID add-on interrogations over the same selected time period. The difference between the number of items optically counted and the number of successful interrogations may be indicative of the number of unsuccessful interrogations, the number of luggage items not having a system luggage add-on and/or both.

According to another embodiment, when a rightful luggage possessor collects their luggage, the unique identifier associated with the luggage may be added to the watch list database. According to this embodiment, if a boundary luggage interrogator detects a luggage with a luggage add-on whose unique identifier is not on (i.e. was not added to) the watch list, an alarm may be triggered (i.e. only listed identifiers are free to pass).

According to this embodiment, the watch list database is used as a 'pass list' of luggage identifiers that would not trigger an alarm upon luggage interrogation when passing through system boundary. Luggage item identifiers for addition to the 'pass list' may be updated by the passenger upon luggage repossession and may communicated using the passenger's mobile device application, an SMS text message and/or a system kiosk/checkpoint at the luggage collection area. In a similar embodiment, for an environment in which all passengers are participating system users, the system may demand for all luggage items exiting through system interrogation boundary, to be on the 'pass list' for them to not trigger an alarm. In a similar embodiment, for an environment in which a mix of passengers who are system-users and passengers who are non-system-users, the system may list the identifiers of participating passengers at check-in. The system may then only demand for luggage items which belong-to/are-associated-with participating passengers and which are exiting through system interrogation boundary, to be on the 'pass list' for them to not trigger an alarm, while luggage items of non-participating passengers all pass freely.

According to some embodiments, a specific designated group of passengers, for example, first class passengers, business class passengers, or frequent flyers, may be offered to participate as users of the system's luggage security scheme. According to some embodiments, participation may be offered as a benefit or present for a specific group(s) of passengers.

According to some embodiments, an RFID luggage add-on's detection alert may be deactivated by scanning of an associated Barcode/Printed-code using a passenger's mobile device application.

According to some embodiments, an RFID luggage add-on's detection alert may be deactivated by scanning of an associated Barcode/Printed-code at a 'luggage checkout station' or a checkpoint device. The 'luggage checkout station' or checkpoint device, may be a proprietary integral part of the luggage security system and/or may be implemented by a third party while being communicatively and functionally associated with the luggage security system, to notify the system of luggage add-on's detection alerts' deactivations.

According to some embodiments, multiple add-ons, prefabricated or printed and issued during the same check-in process, may include RFID's operating in different frequency ranges and/or utilizing different respond delays, in order to avoid response collisions if the checked in luggage is interrogated together concurrently.

According to some embodiments, RFID tags' different frequency ranges and/or different respond delays may be selected automatically during their fabrication or printing. A control logic may automatically select—from within a set of available frequency ranges and/or a set of available respond delays—specific values for embedment onto fabricated/printed RFID luggage tags. The specific values may be selected at least partially randomly and/or at least partially based on a communication protocol for minimizing RFID tags return signals collusions.

According to further embodiments, a luggage add-on may not provide a specific identifier responsive to RF interrogation, but rather may simply emit a specific radio signal in response to an interrogation signal. The specific signal emitted frequency may be some multiple of the interrogator signal frequency.

When a rightful luggage possessor collects their luggage, the add-on on the luggage may be reconfigured to either stop emitting a response to an interrogator signal or to start responding to an interrogation signal with a signal of a different frequency.

According to some embodiments, add-on operation may be modified upon luggage pickup using a cellphone mobile application which communicates with the add-on through some wireless communication protocol.

According to some embodiments, add-on operation may be modified upon a luggage checkout station or checkpoint device—for example, at the luggage collection area—which communicates with the add-on through some wireless communication protocol.

Figure 13A:
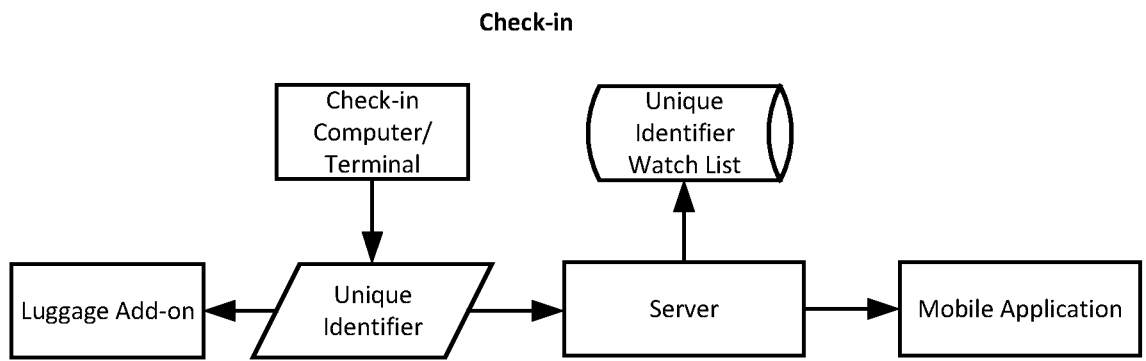
In FIG. 13A there is shown a schematic diagram of luggage check-in operation of an exemplary system for securing and authenticating luggage passing through a luggage transport system, in accordance with some embodiments of the present invention, wherein a unique identifier is issued, and relayed/connected to: a luggage add-on, a unique identifier watch list database and a (passenger's, luggage-possessor's) mobile device application.

Reference is now made to FIG. 13A, where there is shown a schematic diagram of luggage check-in operation of an exemplary system for securing and authenticating luggage passing through a luggage transport system, in accordance with some embodiments of the present invention, wherein a unique identifier is issued, and relayed/connected to: a luggage add-on, a unique identifier watch list database and a (passenger's, luggage-possessor's) mobile device application.

The unique identifier, in accordance with some embodiments, may be generated and/or issued—for example, as a printed RFID tag luggage add-on and a respective digital representation of the unique identifier for communication—by a standalone check-in computer/terminal application, a hosted check-in computer/terminal application or code, or a check-in client application running on a separate/remote computing device.

Figure 13B:
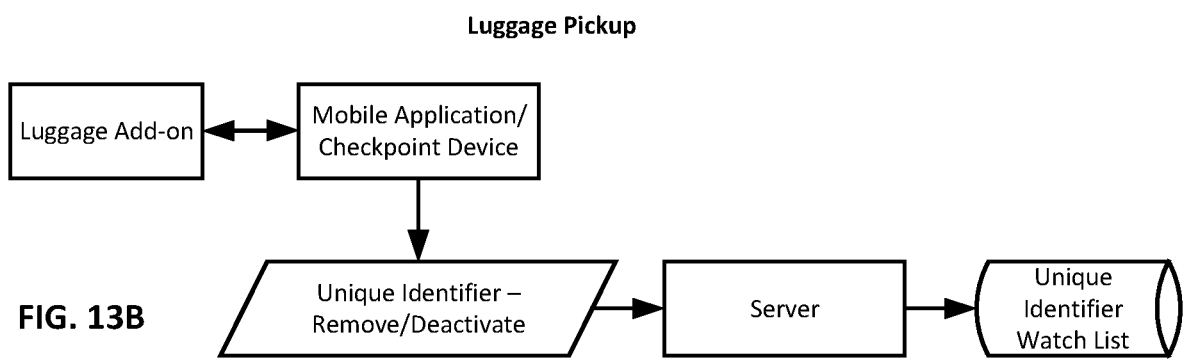
In FIG. 13B there is shown a schematic diagram of luggage pickup operation of an exemplary system for securing and authenticating luggage passing through a luggage transport system, in accordance with some embodiments of the present invention, wherein a mobile device application, or a checkpoint device is utilized for updating a 'unique identifier watch list database' of the removal, or deactivation, of a specific unique identifier or signature.

Reference is now made to FIG. 13B, where there is shown a schematic diagram of luggage pickup operation of an exemplary system for securing and authenticating luggage passing through a luggage transport system, in accordance with some embodiments of the present invention, wherein a mobile device application, or a checkpoint device is utilized for updating a 'unique identifier watch list database' of the removal, or deactivation, of a specific unique identifier or signature.

A mobile device application, in accordance with embodiments, may be an independent client application of the luggage security system, or an application/code integrated/added to a hosting existing application, such as: an airline, an airline alliance, an airport, or another $3^{rd}$ party—mobile client application.

Figure 13C:
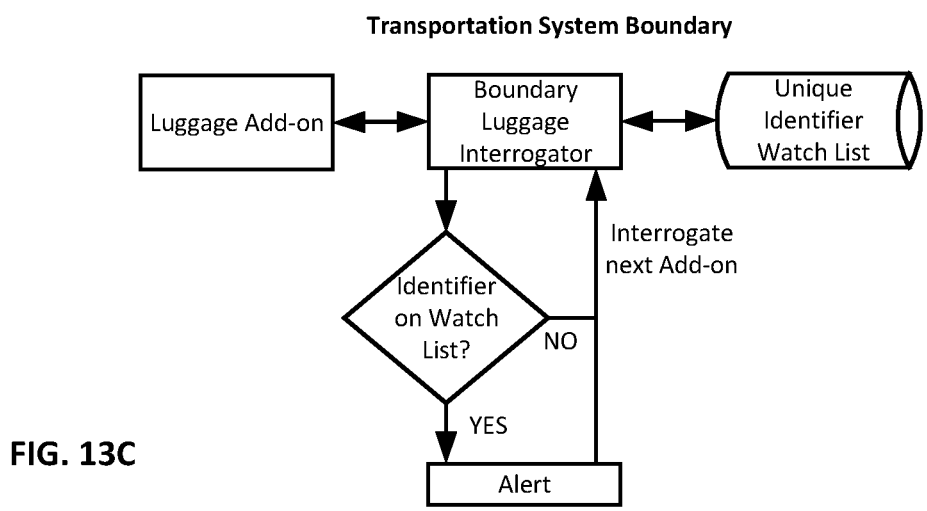
In FIG. 13C there is shown a schematic diagram of transportation system boundary operation of an exemplary system for securing and authenticating luggage passing through a luggage transport system, in accordance with some embodiments of the present invention, wherein a boundary luggage interrogator interrogates a luggage add-on and checks whether the unique signature of the interrogated luggage add-on is still on the watch list and has not been removed or deactivated at an earlier stage.

Reference is now made to FIG. 13C, where there is shown a schematic diagram of transportation system boundary operation of an exemplary system for securing and authenticating luggage passing through a luggage transport system, in accordance with some embodiments of the present invention, wherein a boundary luggage interrogator interrogates a luggage add-on and checks whether the unique signature of the interrogated luggage add-on is still on the watch list and has not been removed or deactivated at an earlier stage, to accordingly ignore, or issue a 'still active/on-list luggage identifier' alert.

Figure 14A:
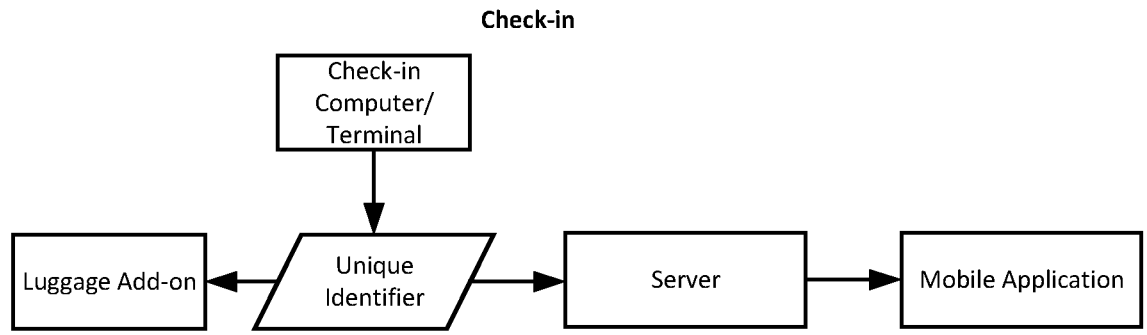
In FIG. 14A there is shown a schematic diagram of luggage check-in operation of an exemplary system for securing and authenticating luggage passing through a luggage transport system, in accordance with some embodiments of the present invention, wherein a unique identifier is issued, and relayed/connected to: a luggage add-on and to a (passenger's, luggage-possessor's) mobile device application.

Reference is now made to FIG. 14A, where there is shown a schematic diagram of luggage check-in operation of an exemplary system for securing and authenticating luggage passing through a luggage transport system, in accordance with some embodiments of the present invention, wherein a unique identifier is issued, and relayed/connected to: a luggage add-on and to a (passenger's, luggage-possessor's) mobile device application.

Figure 14B:
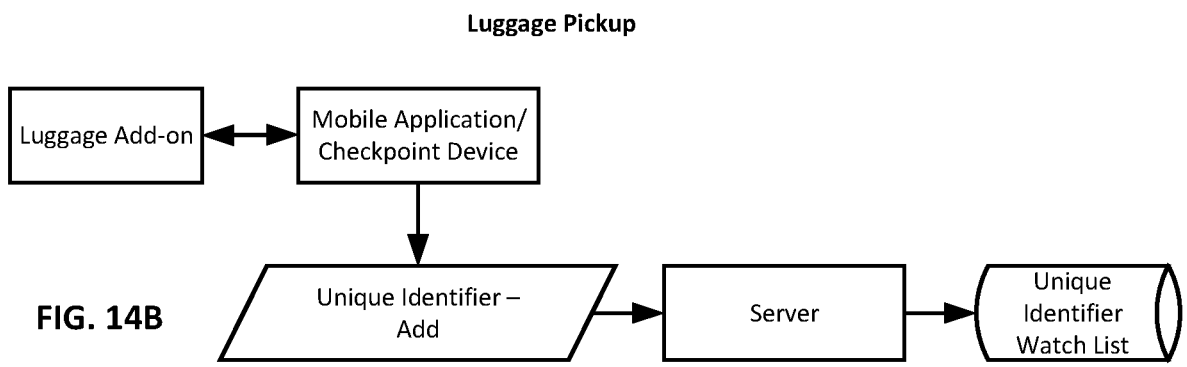
In FIG. 14B there is shown a schematic diagram of luggage pickup operation of an exemplary system for securing and authenticating luggage passing through a luggage transport system, in accordance with some embodiments of the present invention, wherein a mobile device application, or a checkpoint device is utilized for updating a 'unique identifier watch list database' of the adding of a specific unique identifier or signature to the list (i.e. only listed identifiers are free to pass).

Reference is now made to FIG. 14B, where there is shown a schematic diagram of luggage pickup operation of an exemplary system for securing and authenticating luggage passing through a luggage transport system, in accordance with some embodiments of the present invention, wherein a mobile device application, or a checkpoint device is utilized for updating a 'unique identifier watch list database' of the adding of a specific unique identifier or signature to the list (i.e. only listed identifiers are free to pass).

Figure 14C:
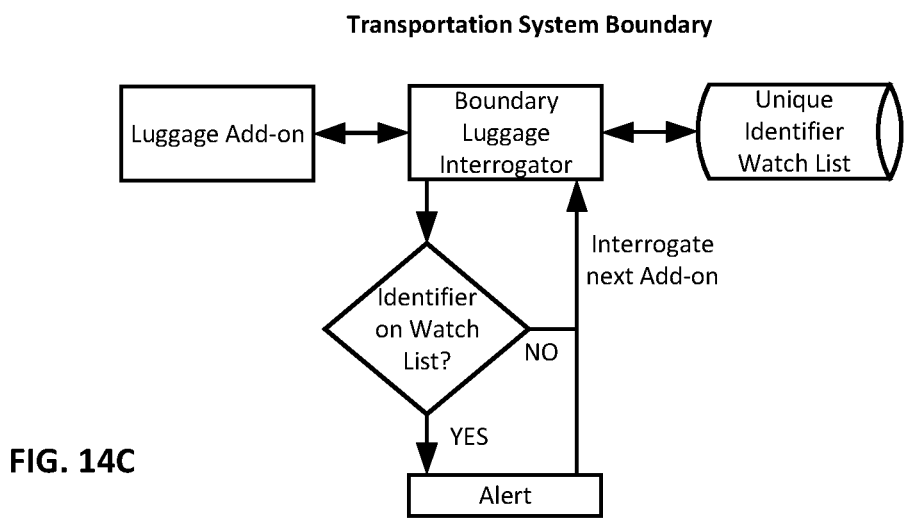
In FIG. 14C there is shown a schematic diagram of transportation system boundary operation of an exemplary system for securing and authenticating luggage passing through a luggage transport system, in accordance with some embodiments of the present invention, wherein a boundary luggage interrogator interrogates a luggage add-on and checks whether the unique signature of the interrogated luggage add-on is on the watch list.

Reference is now made to FIG. 14C, where there is shown a schematic diagram of transportation system boundary operation of an exemplary system for securing and authenticating luggage passing through a luggage transport system, in accordance with some embodiments of the present invention, wherein a boundary luggage interrogator interrogates a luggage add-on and checks whether the unique signature of the interrogated luggage add-on is on the watch list, (was added thereto at an earlier stage) to accordingly ignore and let it pass, or issue a 'non-added luggage identifier' alert (i.e. only listed identifiers are free to pass).

Figure 15A:
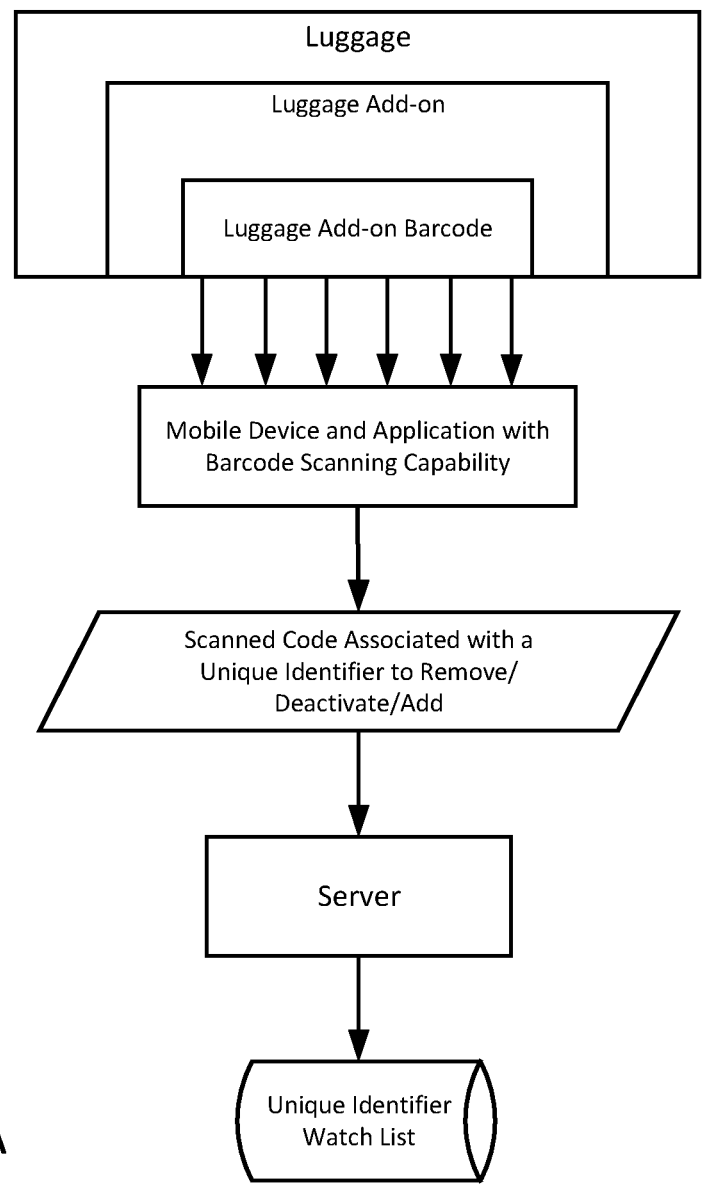
In FIG. 15A there is shown a schematic diagram of operation of a mobile device application of an exemplary system for securing and authenticating luggage passing through a luggage transport system, in accordance with some embodiments of the present invention.

Reference is now made to FIG. 15A, where there is shown a schematic diagram of operation of a mobile device application of an exemplary system for securing and authenticating luggage passing through a luggage transport system, in accordance with some embodiments of the present invention, wherein the mobile application utilizes the mobile device's barcode scanning capability to read a luggage add-on barcode of a luggage add-on and to relay the scanned, identifier associated, code to a 'unique identifier watch list database' for removal from the watch list and thus the prevention of an alert being issued when passing through the system's interrogation/exit boundary.

Figure 15B:
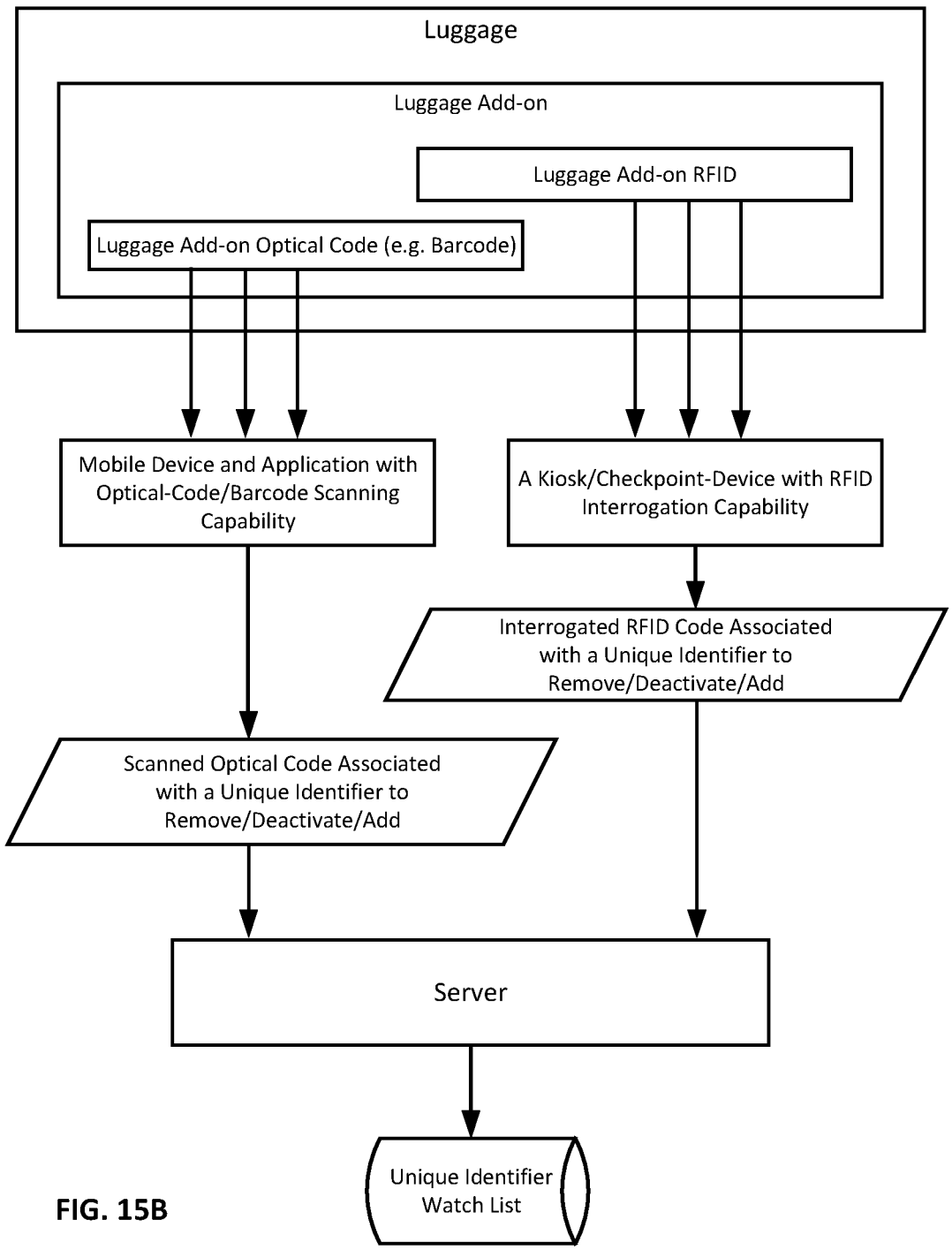
In FIG. 15B there is shown a schematic diagram of operation of a mobile device application and a kiosk/checkpoint of an exemplary system for securing and authenticating luggage passing through a luggage transport system, in accordance with some embodiments of the present invention.

Reference is now made to FIG. 15B, where there is shown a schematic diagram of operation of a mobile device application and a kiosk/checkpoint of an exemplary system for securing and authenticating luggage passing through a luggage transport system, in accordance with some embodiments of the present invention, wherein (i) the mobile application utilizes the mobile device's optical-code/barcode scanning capability to read a optical-code/barcode of a luggage add-on, (ii) the kiosk/checkpoint interrogates an RFID tag of the luggage add-on and (iii) the scanned and interrogated, identifier associated, codes are relayed to a 'unique identifier watch list database' for removal from the watch list and thus the prevention of an alert being issued when passing through the system's interrogation/exit boundary.

The acquisition and communication of both an optically obtained code/identifier and a radio signal obtained code/identifier may, in accordance with some embodiments, be used for verification of successful and correct luggage add-on identifier acquisition, by searching-for, and comparison of, matching pairs of optically and radio obtained identifiers. Receipt of both a mobile device and a kiosk/checkpoint acquired identifier may further be utilized for verification of (i) the luggage owner being in possession of the luggage item, which would be needed for the optical code to be scanned and (ii) the luggage, and owner, being at a specific location within the luggage collection area, based on the identity of the kiosk/checkpoint used for radio identifier acquisition. The times of, and time differences between, acquisition/receipt of the optically and radio acquired identifiers of a same luggage add-on (i.e. identical/same/matching identifiers received in both acquisition methods), may be utilized to estimate or determine that they have been carried out by the same user—the owner of the repossessed luggage item(s).

A system in accordance with embodiments, may implement a combination of luggage add-on identifier acquisition layers, including but not limited to: RFID based, optically read tag/code based, optical identification of luggage item itself and/or other. Data obtained from multiple acquisition layers may be cross-correlated, compared, statistically analyzed, used as backup for data from another layer, used for error detection, used as training data for machine learning or an AI deep learning model and/or otherwise processed, to optimize successful identification of system monitored luggage items.

Figure 16A:
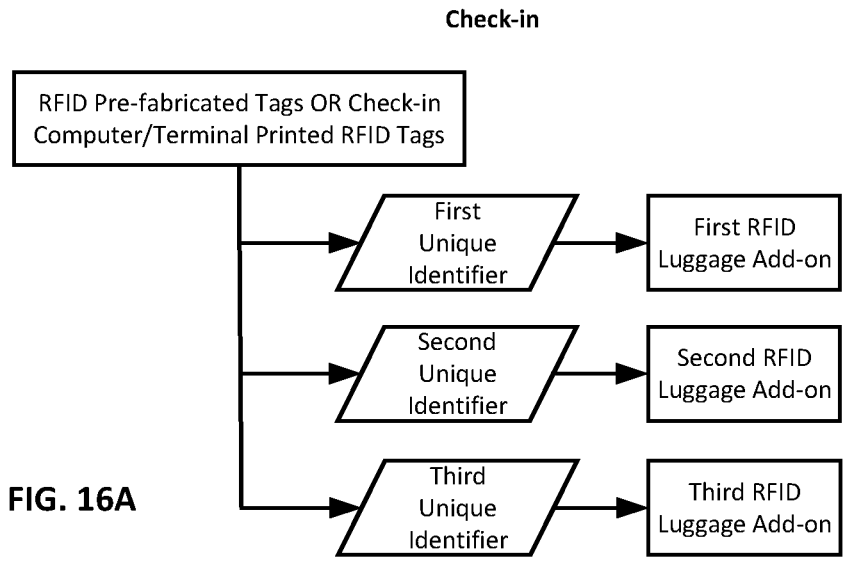
In FIG. 16A there is shown a schematic diagram of luggage check-in operation of an exemplary system for securing and authenticating luggage passing through a luggage transport system, in accordance with some embodiments of the present invention.

Reference is now made to FIG. 16A, where there is shown a schematic diagram of luggage check-in operation of an exemplary system for securing and authenticating luggage passing through a luggage transport system, in accordance with some embodiments of the present invention, wherein multiple different add-ons including multiple unique identifiers, are issued as part of a specific (e.g. same flight/airline/arrival-time/departure-time/destination) check in process.

Figure 16B:
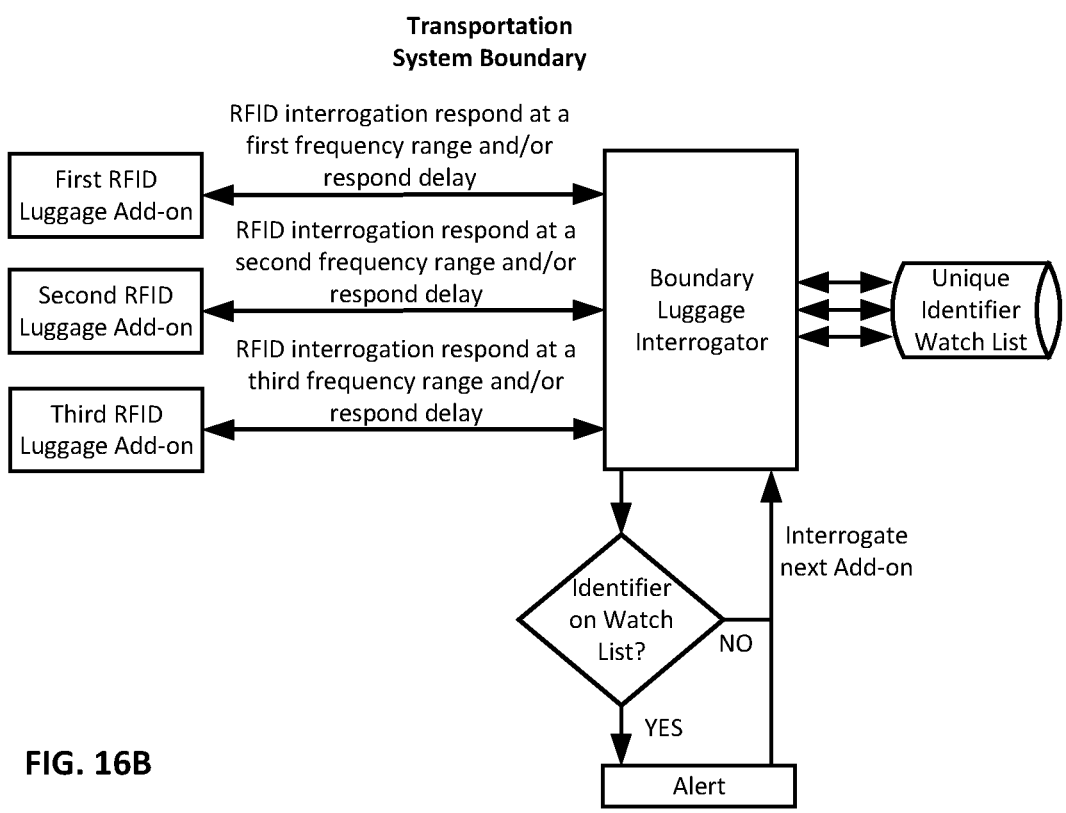
In FIG. 16B there is shown a schematic diagram of transportation system boundary operation of an exemplary system for securing and authenticating luggage passing through a luggage transport system, in accordance with some embodiments of the present invention.

Reference is now made to FIG. 16B, where there is shown a schematic diagram of transportation system boundary operation of an exemplary system for securing and authenticating luggage passing through a luggage transport system, in accordance with some embodiments of the present invention, wherein a boundary luggage interrogator interrogates the multiple luggage RFID add-ons, each of which responds to the interrogation at a different frequency range that may for example be a multiplication of the interrogating signal, or responds with a different response time-delay, thus preventing collusions, clashes and/or confusions, between multiple response signals of multiple add-ons being concurrently interrogated and minimizing the number of unsuccessful add-on interrogations increasing the interrogation success rate.

Figure 17A:
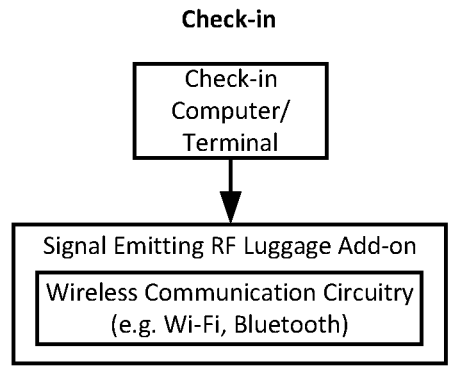
In FIG. 17A there is shown a schematic diagram of luggage check-in operation of an exemplary system for securing and authenticating luggage passing through a luggage transport system, in accordance with some embodiments of the present invention.

Reference is now made to FIG. 17A, where there is shown a schematic diagram of luggage check-in operation of an exemplary system for securing and authenticating luggage passing through a luggage transport system, in accordance with some embodiments of the present invention, wherein a boundary-passage indicating RF luggage tag (a non-identifying tag—e.g. similar to a clothing store anti-theft tag) is issued at luggage check-in and relayed/connected to a luggage add-on.

The exemplary luggage add-on shown, includes wireless communication circuitry—and may further include any combination of additional processing, control, logic, registry, memory, power and/or communication components—to facilitate direct communication between a user device mobile application and the luggage add-on, for user altering, modifying, or at least partially disabling of the ability of the add-on to return a signal in response to its interrogation.

Figure 17B:
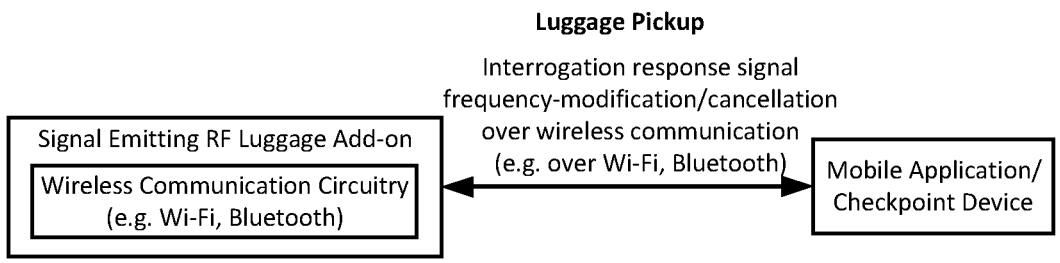
In FIG. 17B there is shown a schematic diagram of luggage pickup operation of an exemplary system for securing and authenticating luggage passing through a luggage transport system, in accordance with some embodiments of the present invention.

Reference is now made to FIG. 17B, where there is shown a schematic diagram of luggage pickup operation of an exemplary system for securing and authenticating luggage passing through a luggage transport system, in accordance with some embodiments of the present invention, wherein a mobile device application, or a checkpoint device, is utilized for frequency-modifying, delay-modifying, and/or completely canceling, of the luggage add-on RF tag's interrogation response signal, over a wireless communication session between the mobile device and the luggage add-on. Frequency-modifying and/or delay-modifying, may be automatically generated or issued in tags sets of non-repeating or non-returning frequencies/delays—such that along a specific period of time, or a specific number of changed frequencies/delays, the same frequency or delay does not repeat more than once or another predefined threshold value.

Figure 17C:
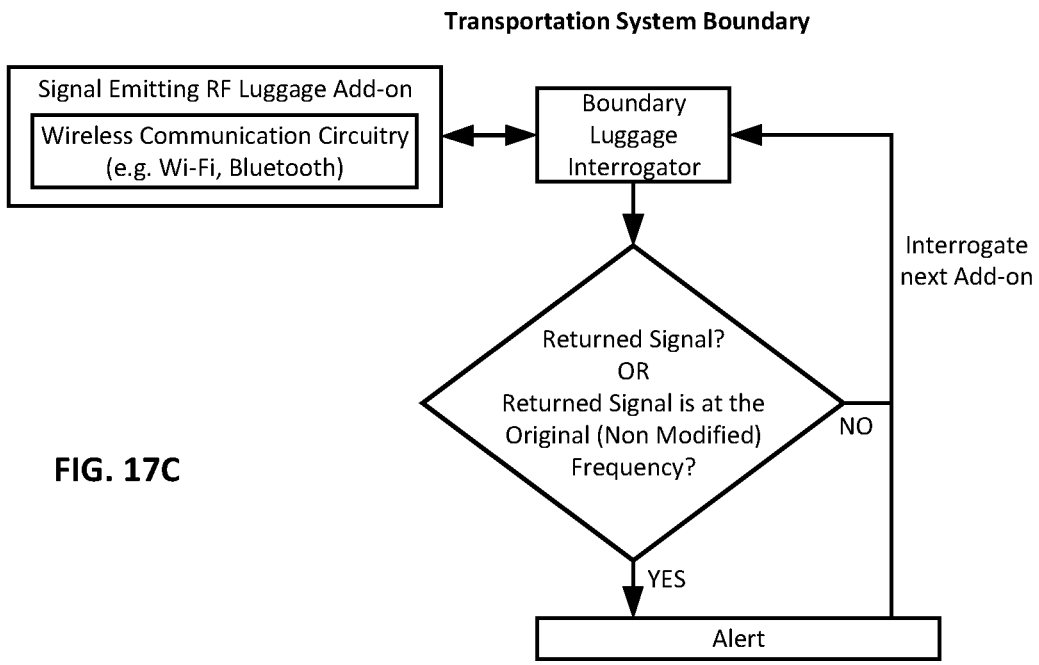
In FIG. 17C there is shown a schematic diagram of transportation system boundary operation of an exemplary system for securing and authenticating luggage passing through a luggage transport system, in accordance with some embodiments of the present invention.

Reference is now made to FIG. 17C, where there is shown a schematic diagram of transportation system boundary operation of an exemplary system for securing and authenticating luggage passing through a luggage transport system, in accordance with some embodiments of the present invention, wherein a boundary luggage interrogator interrogates a signal emitting RF luggage add-on and checks whether an interrogation return signal is received, or if the received return signal is at a non-modified frequency (not changed at baggage pick-up), to accordingly ignore, or issue a 'still-returning-signal/returning-non-modified-signal' luggage alert.

The term non-identifying Radio Frequency (RF) tags, or 'RF tags', as described herein and in accordance with some embodiments, may refer to any radio interrogatable tags that all send the same signal and tell the receiver/interrogator that something is present at, or has passed through, an interrogation point/boundary. For example, such or similar non-identifying RF tags may be substantially similar to those frequently used in what is called Electronic Article Surveillance (EAS) an anti-shoplifting technique. This is to differentiate from Radio Frequency Identification (RFID) tags, as described herein and in accordance with some embodiments, which may send more complex signals that uniquely identify themselves and thus whatever they are attached to.

Figure 18A:
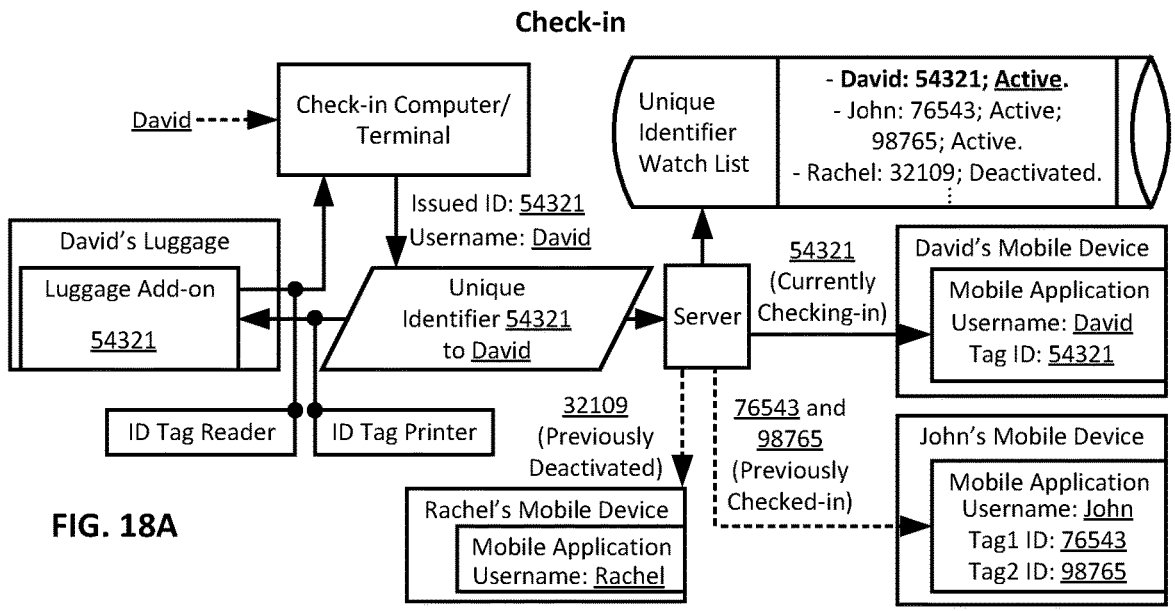
In FIG. 18A there is shown a block and dataflow diagram of system operation as part of a luggage check-in scenario of an exemplary system for securing and authenticating luggage passing through a luggage transport system, in accordance with some embodiments of the present invention.

Reference is now made to FIG. 18A, where there is shown a block and dataflow diagram of system operation as part of a luggage check-in scenario of an exemplary system for securing and authenticating luggage passing through a luggage transport system, in accordance with some embodiments of the present invention, wherein a unique identifier is issued, and relayed/connected to: a luggage add-on, a unique identifier watch list database and a (passenger's, luggage-possessor's) mobile device application.

The unique identifier, in accordance with some embodiments, may be generated and/or issued—for example, as a printed RFID tag luggage add-on and a respective digital representation of the unique identifier for communication—by a standalone check-in computer/terminal application, a hosted/integrated check-in computer/terminal application or code, or a check-in client application running on a separate/remote computing device.

In the figure, as part of check-in, the check-in computer/terminal receives a passenger's system username [David], or a passenger identifier (e.g. passport number, cc number) associated with his username. A unique identifier is issued for David's checked-in luggage item. The identifier is either: (i) generated at the check-in computer/terminal and printed, using the shown ID tag printer, onto a luggage add-on tag intended for binding/connection to David's luggage item, or (ii) prefabricated and scanned/interrogated, using the shown ID tag reader, before/after/as-part-of its binding/connection to David's luggage item, for input to the check-in computer/terminal.

The generated/read identifier [54321] is then communicated to the shown system/application server. The server then: (i) communicates the identifier to the mobile device of the provided username (David's); and (ii) adds the identifier as a new record in the shown 'unique identifier watch list' database indicating its status as 'active'.

In the figure, there are further shown mobile devices and applications, and associated database records of additional users/passengers. Rachel, has previously traveled while securing her luggage using the system. As the database indicates, she has already deactivated her luggage identifier [32109] (when she arrived at destination and repossessed her luggage). Rachel's mobile device application indicates neither checked-in nor 'active' luggage items. John, on the other hand, has two currently checked-in luggage items

[76543] and [98765] that are in an 'active' status, as indicated in the shown database records and on John's mobile application records.

In the example, John may, or may not, be travelling on the same flight or airline as David is; may, or may not, be travelling from the same origin as David is; and may, or may not, be travelling to the same destination as David is. Accordingly, their luggage items may be checked-in at different check-in counters offering system capabilities and, upon arrival may be reclaimed and then interrogated, for their activation status, at different system interrogation boundaries.

According to some embodiments, the system's check-in computer component may identify checking in passengers as either new, or already registered, system users. Registered system users may be offered the same add-on identifier they used for their luggage items on prior journeys.

According to some embodiments, specific identifiers may be reserved for respective luggage items of a passenger/user, may be associated with user or system given 'aliases' (e.g. The big Samsonite, My small briefcase, David's blue Samsonite, Michelle's black Louis Vuitton) and may use the specific identifiers or aliases for check-in, or early/online/mobile-application check-in purposes, wherein luggage items to be checked-in are selected by the user from a listing—of all luggage items checked-in on his prior trips—presented on the mobile device application.

According to some embodiments, the system may include, or may be adapted to functionally associate and operate with, identifier chips/tags/add-ons integrated into specific luggage-items/baggage-items/suitcases. Integrated luggage-items tags/add-ons may be adapted to transmit, in response to interrogation, an identification signal and optionally a signal representing additional luggage-item related data. Integrated luggage-items tags/add-ons identifiers may be associated with, and continuously reserved for, specific system users.

Figure 18B:
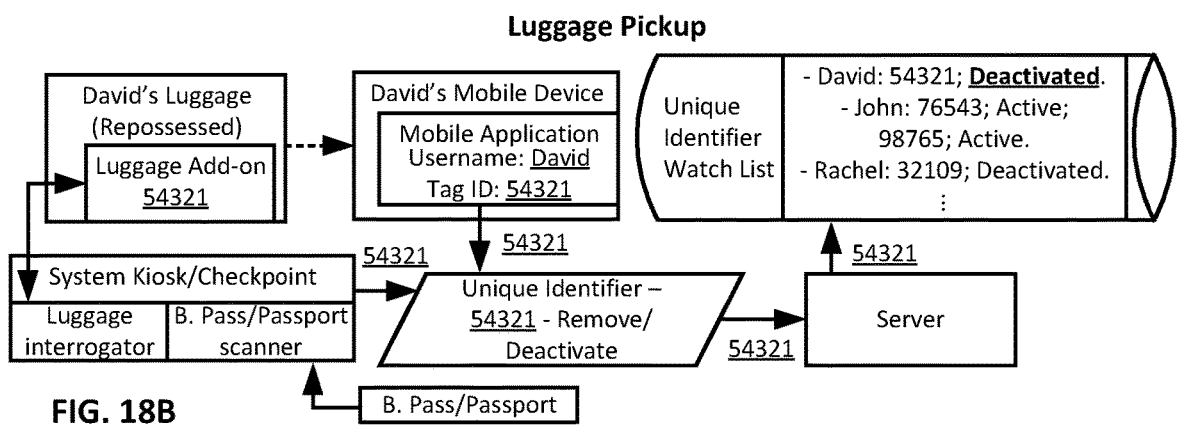
In FIG. 18B there is shown a block and dataflow diagram of system operation as part of a luggage pickup scenario of an exemplary system for securing and authenticating luggage passing through a luggage transport system, in accordance with some embodiments of the present invention.

Reference is now made to FIG. 18B, where there is shown a block and dataflow diagram of system operation as part of a luggage pickup scenario of an exemplary system for securing and authenticating luggage passing through a luggage transport system, in accordance with some embodiments of the present invention, wherein a mobile device application, or a checkpoint device is utilized for updating a 'unique identifier watch list database' of the removal, or deactivation, of a specific unique identifier or signature.

A mobile device application, in accordance with embodiments, may be an independent client application of the luggage security system, or an application/code integrated/added to a hosting existing application, such as: an airline, an airline alliance, an airport, or another $3^{rd}$ party—mobile client application.

In the figure, following to David's arrival at his destination and upon repossession of his checked-in luggage item, David utilizes his mobile application and device to communicate his luggage item unique identifier [54321]—received at David's device as part of check-in—to the system/application server. The server, in response, updates the database record of the received identifier to indicate a Deactivated status.

A system in accordance with some embodiments, may implement any combination of additional or alternative methods for luggage item identifier Deactivation. For example, an SMS based method, where a text message (i.e. over cellular connection, no need for mobile data connection) including the luggage identifier is sent to a specific number and then relayed to the system server for update to the database.

Additionally, or alternatively, a kiosk/check-point—positioned at the luggage collection area—may include an RFID interrogator and an optical scanner, enabling the correlation of: (i) a luggage item's identifier which is in proximity to the kiosk—by the kiosk's RFID interrogation; with (ii) an identifier of the passenger/user currently in possession of the luggage item—by optically scanning (substantially during the same time point or period when the luggage RFID is emitting a response signal) a graphic code, text, or symbol on the passenger's/user's boarding-pass, passport, or other. Successful correlation may indicate authentication of luggage possession and trigger the status of the luggage item in the database to be updated to Deactivated status.

The mobile device application, in accordance with embodiments, may be adapted to present to the passenger/user targeted service offerings or advertisements selected by the system based on the knowledge of his position/location and his possible needs or interests—derived from data associated with his checked-in luggage items. For example, upon luggage check-in indication at the system server, offers for duty free products or special deals and sales may be offered; upon indication of luggage identifier Deactivation, understanding that the user has repossessed his luggage and thus arrived, offers for transportation, car rentals, hotels or restaurants; and/or upon interrogation of the luggage item identifier at the exit boundary, airport and flight connection information.

Figure 18C:
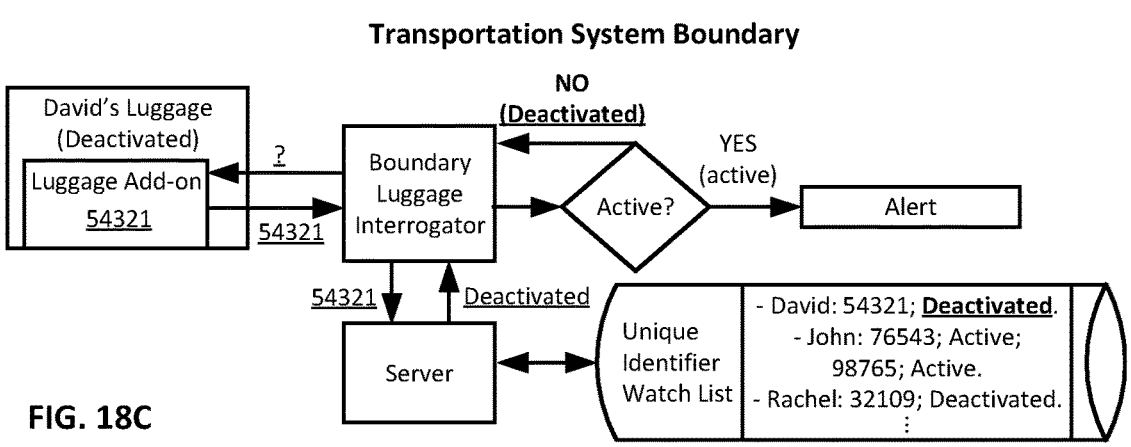
In FIG. 18C there is shown a block and dataflow diagram of system operation as part of a transportation system boundary scenario of an exemplary system for securing and authenticating luggage passing through a luggage transport system, in accordance with some embodiments of the present invention.

Reference is now made to FIG. 18C, where there is shown a block and dataflow diagram of system operation as part of a transportation system boundary scenario of an exemplary system for securing and authenticating luggage passing through a luggage transport system, in accordance with some embodiments of the present invention, wherein a boundary luggage interrogator interrogates a luggage add-on and checks whether the unique signature of the interrogated luggage add-on is still on the watch list and has not been removed or deactivated at an earlier stage, to accordingly ignore, or issue a 'still active/on-list luggage identifier' alert.

In the figure, leaving the luggage collection area to exit, David passes through a system boundary including a boundary luggage interrogator. The interrogator interrogates David's luggage add-on receiving in response the identifier [54321]. The identifier is then communicated to the server that queries the 'unique identifier watch list' database for the status value/indication in the record of the received identifier. The server returns a Deactivated status indication—as the status indication in the database was updated through David's mobile application and device upon repossessing his luggage—and system alert and/or notifications are not triggered issued.

In the example, had David's luggage item been unlawfully or mistakenly removed by another person or passenger from the luggage collection carousel and taken through the system boundary, the interrogation and following database query would return a still Active status—as David's luggage add-on can only be deactivated from David's mobile application (may need to be: running, logged into and/or online)—and the system alarm/notifications would be triggered to prevent the unlawfully or mistakenly luggage removing person/passenger from leaving with David's luggage item.

As described herein, David may likewise approach a system kiosk or checkpoint positioned in the luggage collection area to identify himself, for example by boarding card or passport scan, while his luggage item is being interrogated for its identifier's Deactivation.

According to some embodiments of the present invention, a luggage routing, tracking and security system and a luggage handling system may operate in concert to facilitate checked-in luggage security solutions. Systems, components, methods and/or solutions described herein, may separately relate to the luggage security system or to the luggage handling system, or may relate to configurations and processes combining elements from, and utilizing interrelations between, both the luggage security system and the luggage handling system.

A luggage security system, in accordance with some embodiments, may include an application server communicatively networked and functionally associated with a mobile device application running on user (e.g. passenger) device. A luggage handling server, functionally integrated and/or associated with the application server, may communicate and interface with a luggage handling system interface, to receive data collected by cameras and sensors of the luggage handling system and to relay requests and commands to components of the luggage handling system through a luggage handling system controller. The luggage handling server and the application server may be collectively referred to herein as 'system and application server'.

According to some embodiments, as part of a luggage check-in stage, a unique visually readable, or elsewise machine interrogatable/readable, ID—for example in the form of a code, a mark, or an image attached onto the checked-in luggage—and visual/biometric signatures of all parties/persons authorized/eligible to collect the luggage, are communicated to the system and application server that stores the information to a database.

The unique visually readable luggage ID and the visual signatures of parties authorized to collect the luggage may be acquired by: a check-in computer/terminal camera/scanner, for example, as part of airport departures terminal check-in; and/or the mobile device application and camera/scanner of the device, for example, as part of self or home check-in.

As the visually identified checked-in luggage item makes its journey, the luggage handling system may update the system and application server when and/or where the luggage item is/was identified by the handling system's cameras, scanners or computer vision systems.

The mobile device application may receive server notifications relating to the journey of luggage associated with the same specific application user or device; and/or may enable the access of luggage journey related data, such as tracked locations of the luggage and their times.

According to some embodiments, as part of a luggage collection stage, unique visually readable IDs, associated with luggage items to be placed into a luggage holding/buffering system/area, are communicated by the server to the luggage handling system interface. The luggage handling system then updates the server with unique visually readable IDs associated with luggage items arrived and placed into luggage holding/buffering.

The server may notify each specific mobile device application when checked-in luggage, associated with that specific mobile application, has arrived and placed into holding/buffering. The notification may optionally include an amount of time it would take for the luggage item to be released onto the luggage collection carousel from time of receipt of a release request. The notification may optionally include a set of available luggage disposal options, for example: selectable collection carousel numbers, collection at a VIP lounge dispenser, delivery to hotel and/or other.

The passenger, or an authorized collector, may use the mobile device application—upon receipt of notification that their luggage has arrived and been placed into holding/buffering—to send a luggage release authorization to the server for relaying on to the luggage handling system. The luggage release authorization may for example, include: requested time to release luggage onto carousel, number of preferred/selected collection carousel, request for luggage collection at a VIP lounge dispenser, delivery to hotel and/or other.

According to some embodiments, an exemplary held luggage release process, that may be implemented as part of a luggage collection stage, may include: holding/buffering systems of the luggage handling system acquiring and relaying to the controller readings/visuals of the luggage unique IDs of each held/buffered luggage item; mobile device application is utilized by the passenger for communicating a luggage release request including the luggage associated unique ID to the server; and from the server on to the luggage handling system interface and controller; and/or the holding/buffering area controller then commanding a holding/buffering area system/component to mobilize/route 'request matching' held/buffered luggage item onto luggage collection carousel, a luggage dispenser or for hotel delivery.

According to some embodiments, an exemplary luggage item remover to authorized luggage collectors comparison process, that may be implemented as part of a luggage collection stage, may include: a luggage handling computer vision system acquiring and relaying to the server, through the luggage handling system interface, luggage unique IDs of collection carousel circulating luggage items; the computer vision system, upon removal of a luggage item from the collection carousel, acquiring (or deducting based on item going missing from coverage area) and further relaying to the server: (i) the luggage unique ID of the luggage item removed and, (ii) acquired image(s) of the luggage item removing person; the server comparing acquired images of the luggage removing person to visual signatures of all authorized luggage collectors of the specific luggage item removed; the server issuing an 'authorized luggage collection' notification to mobile device application of user(s) associated with and eligible/authorized to collect the removed luggage item—if the comparison is successful; and/or the server issuing: (i) an 'unauthorized luggage collection' notification to mobile device application of user (s) associated with and eligible/authorized to collect the removed luggage item and, (ii) an 'unauthorized luggage collection' notification along with acquired images of the unauthorized luggage remover to security/control personnel and/or systems—if the comparison is unsuccessful.

According to some embodiments, an exemplary removed luggage item ID to user scanned luggage item ID comparison process, that may be implemented as part of a luggage collection stage, may include: the computer vision system, upon removal of a luggage item from the collection carousel, acquiring (or deducting based on item going missing from coverage area) and relaying to the server the luggage unique ID of the luggage item removed; the mobile device application is used by the passenger for scanning/acquiring the luggage unique ID of the luggage item he removed and communicating it to the server; the server comparing the computer vision system acquired luggage unique ID to the luggage unique ID received from, and acquired by, the mobile device application of an authorized-collector of the specific luggage item removed; the server issuing an 'authorized luggage collection' notification to mobile device application of user(s) associated with and eligible/authorized to collect the removed luggage item—if the comparison is successful; and/or the server issuing: (i) an 'unauthorized luggage collection' notification to mobile device application of user(s) associated with and eligible/authorized to collect the removed luggage item and, (ii) an 'unauthorized luggage collection' notification along with acquired images of the unauthorized luggage remover to security/control personnel and/or systems—if the comparison is unsuccessful or, optionally, if a luggage unique ID of a carousel removed luggage item is not received at the server, from a corresponding mobile device application, within a predefined time period.

Figure 19:
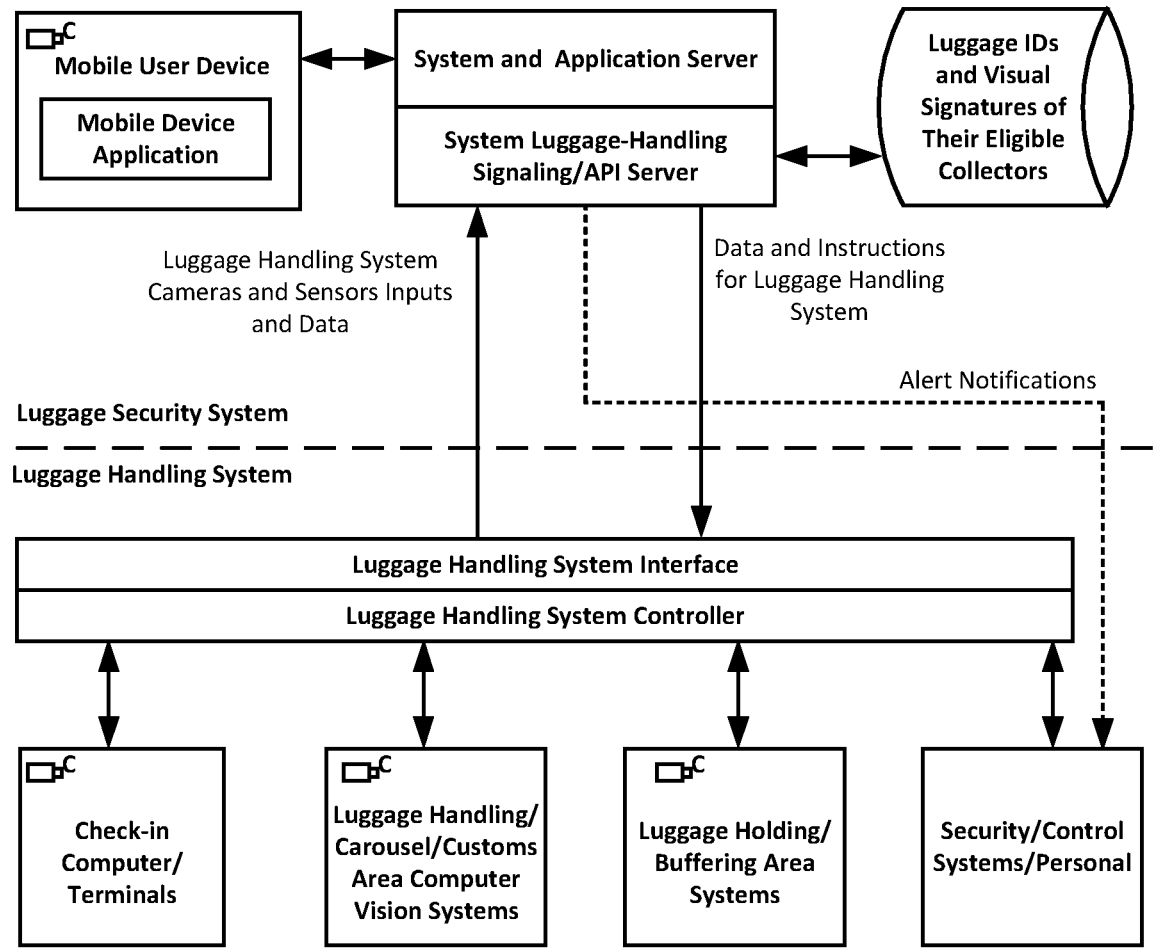
In FIG. 19 there is shown a block diagram of an exemplary luggage security system and an exemplary luggage handling system, including components thereof and interconnections there between, in accordance with some embodiments of the present invention.

Reference is now made to FIG. 19, where there is shown a block diagram of an exemplary luggage security system and an exemplary luggage handling system, including components thereof and interconnections there between, in accordance with some embodiments of the present invention.

Figure 20A:
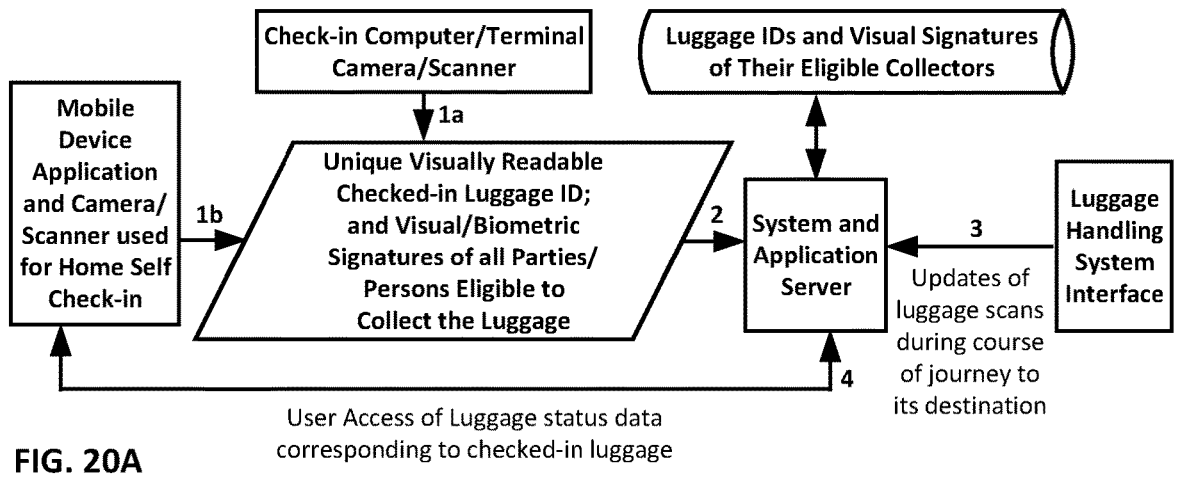
In FIG. 20A there is shown a block diagram of an exemplary luggage security system implementing a luggage check-in operation, in accordance with some embodiments of the present invention.

Reference is now made to FIG. 20A, where there is shown a block diagram of an exemplary luggage security system implementing a luggage check-in operation, in accordance with some embodiments of the present invention.

Figure 20B:
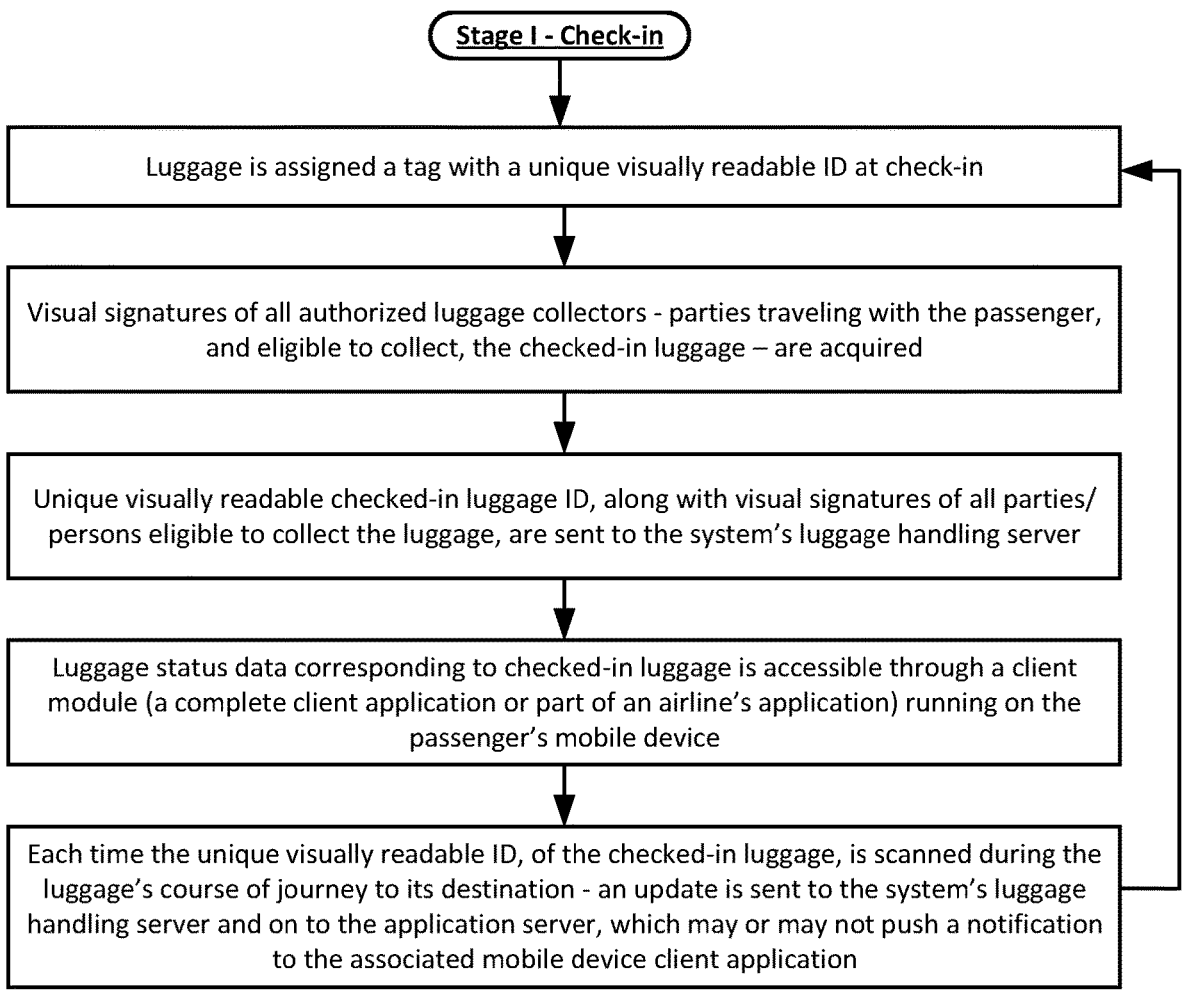
In FIG. 20B there is shown a flowchart of the main steps executed as part of an exemplary luggage check-in process implemented by a luggage security system, in accordance with some embodiments of the present invention.

Reference is now made to FIG. 20B, where there is shown a flowchart of the main steps executed as part of an exemplary luggage check-in process implemented by a luggage security system, in accordance with some embodiments of the present invention.

Figure 21A:
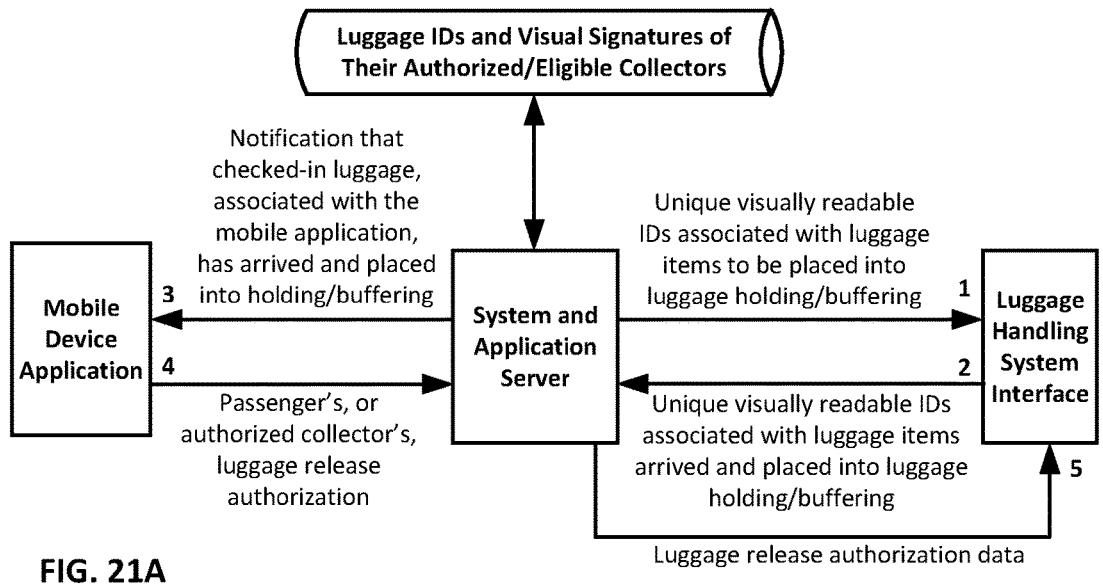
In FIG. 21A there is shown a block diagram of an exemplary luggage security system implementing a luggage collection operation, in accordance with some embodiments of the present invention.

Reference is now made to FIG. 21A, where there is shown a block diagram of an exemplary luggage security system implementing a luggage collection operation, in accordance with some embodiments of the present invention.

Figure 21B:
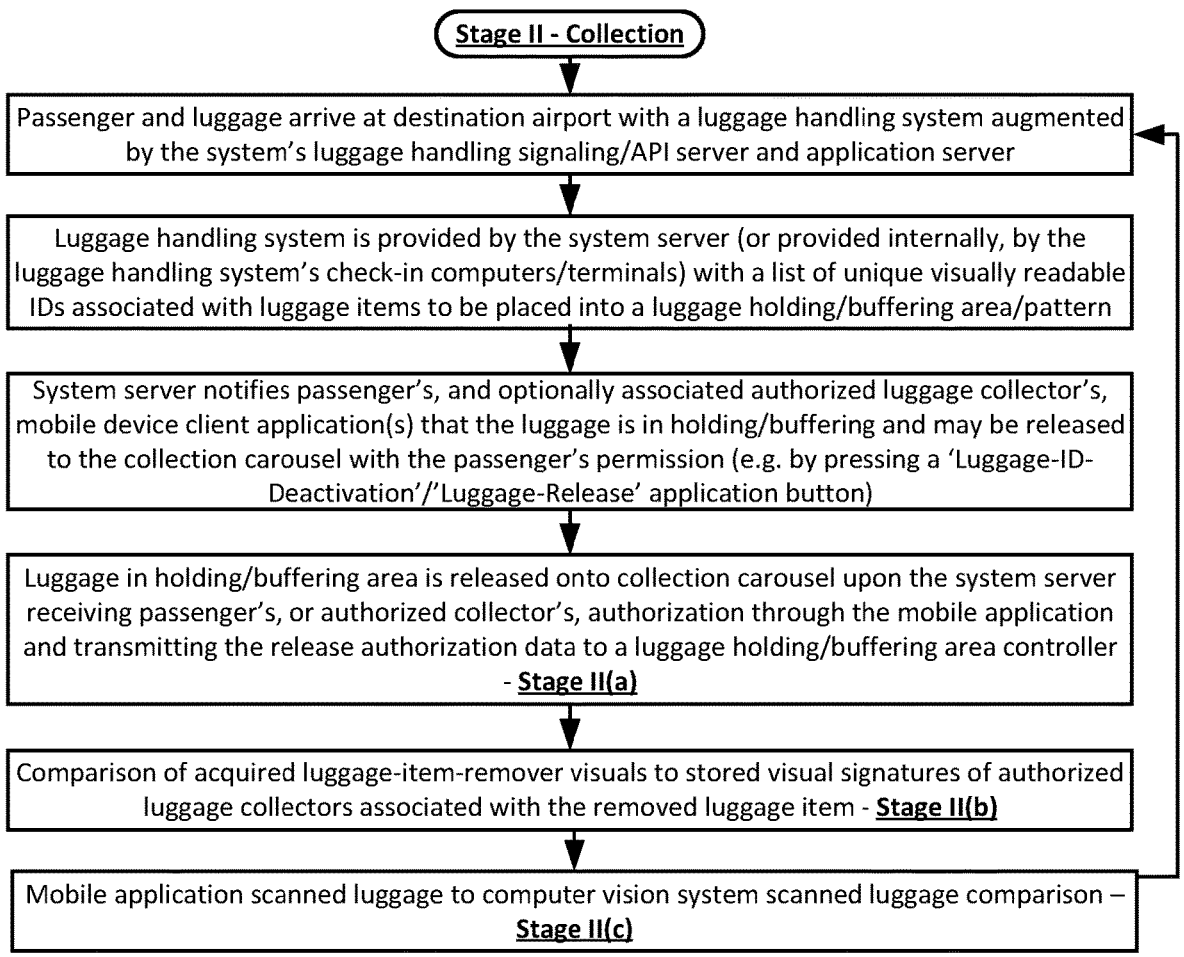
In FIG. 21B there is shown a flowchart of the main steps executed as part of an exemplary luggage collection process implemented by a luggage security system, in accordance with some embodiments of the present invention.

Reference is now made to FIG. 21B, where there is shown a flowchart of the main steps executed as part of an exemplary luggage collection process implemented by a luggage security system, in accordance with some embodiments of the present invention.

Figure 22A:
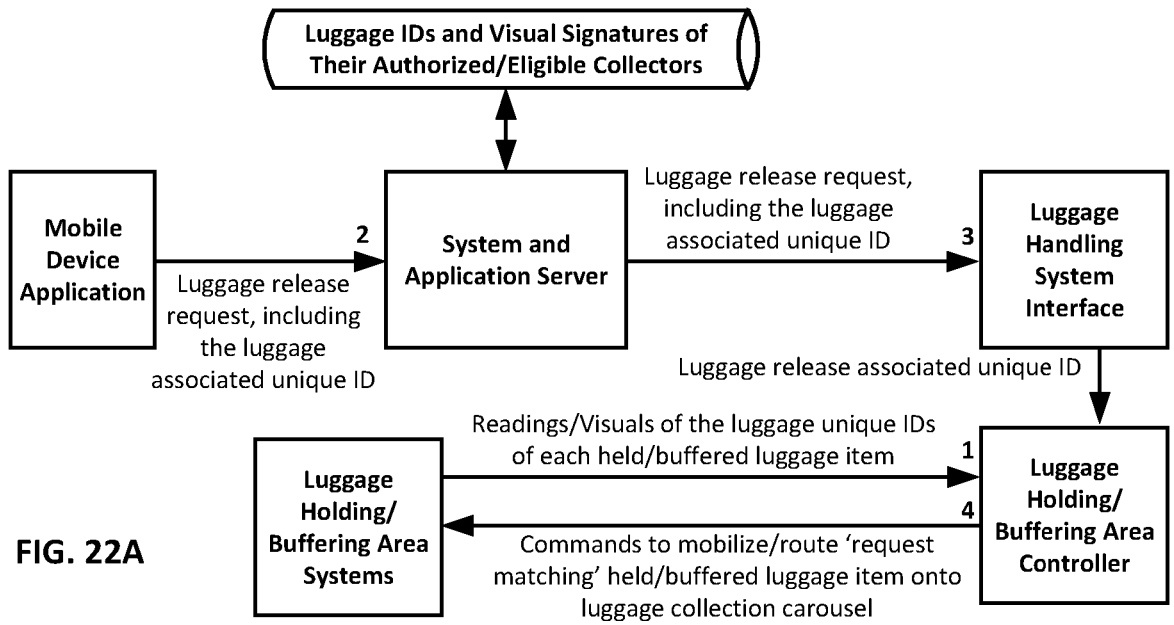
In FIG. 22A there is shown a block diagram of an exemplary luggage security system implementing a held luggage release solution as part of a luggage collection stage, in accordance with some embodiments of the present invention.

Reference is now made to FIG. 22A, where there is shown a block diagram of an exemplary luggage security system implementing a held luggage release solution as part of a luggage collection stage, in accordance with some embodiments of the present invention.

Figure 22B:
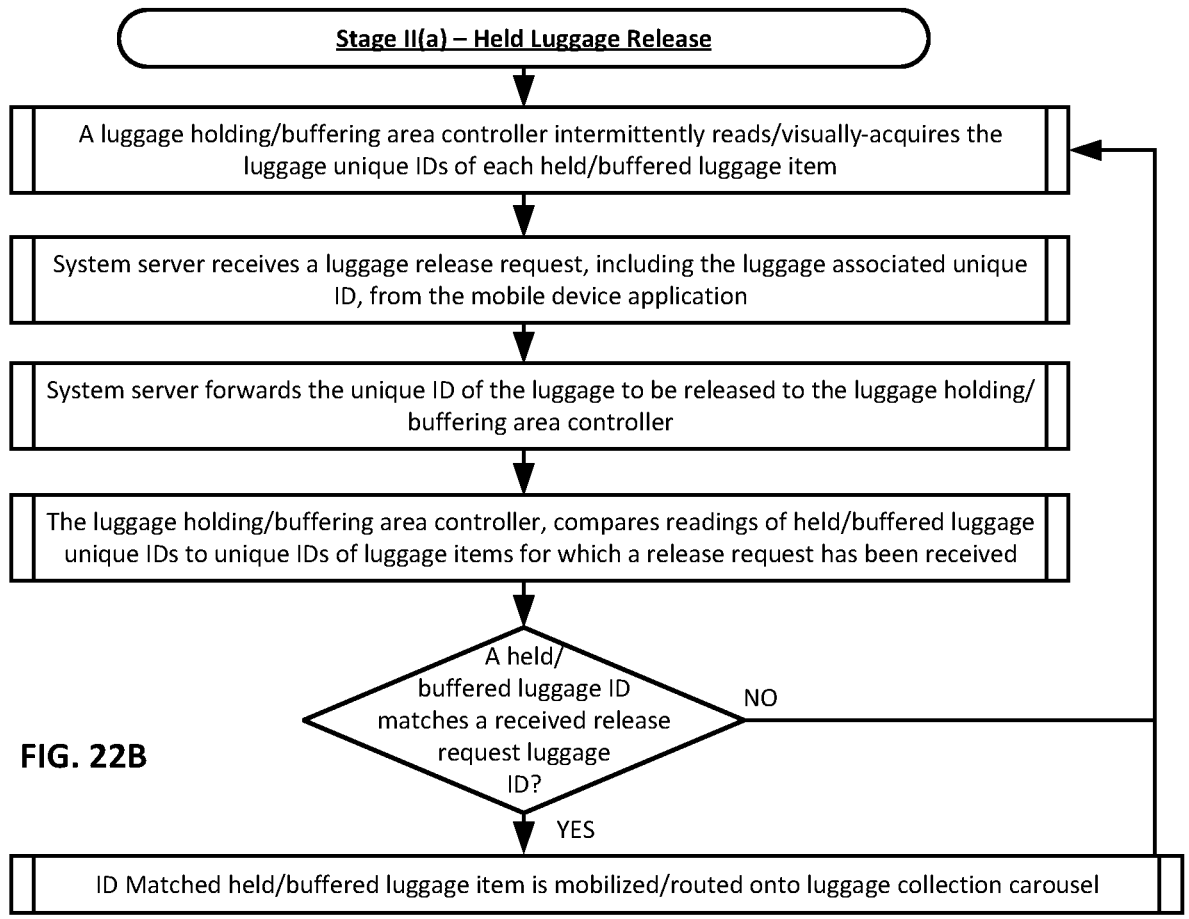
In FIG. 22B there is shown a flowchart of the main steps executed as part of an exemplary held luggage release process implemented by a luggage security system, in accordance with some embodiments of the present invention.

Reference is now made to FIG. 22B, where there is shown a flowchart of the main steps executed as part of an exemplary held luggage release process implemented by a luggage security system, in accordance with some embodiments of the present invention.

Figure 23A:
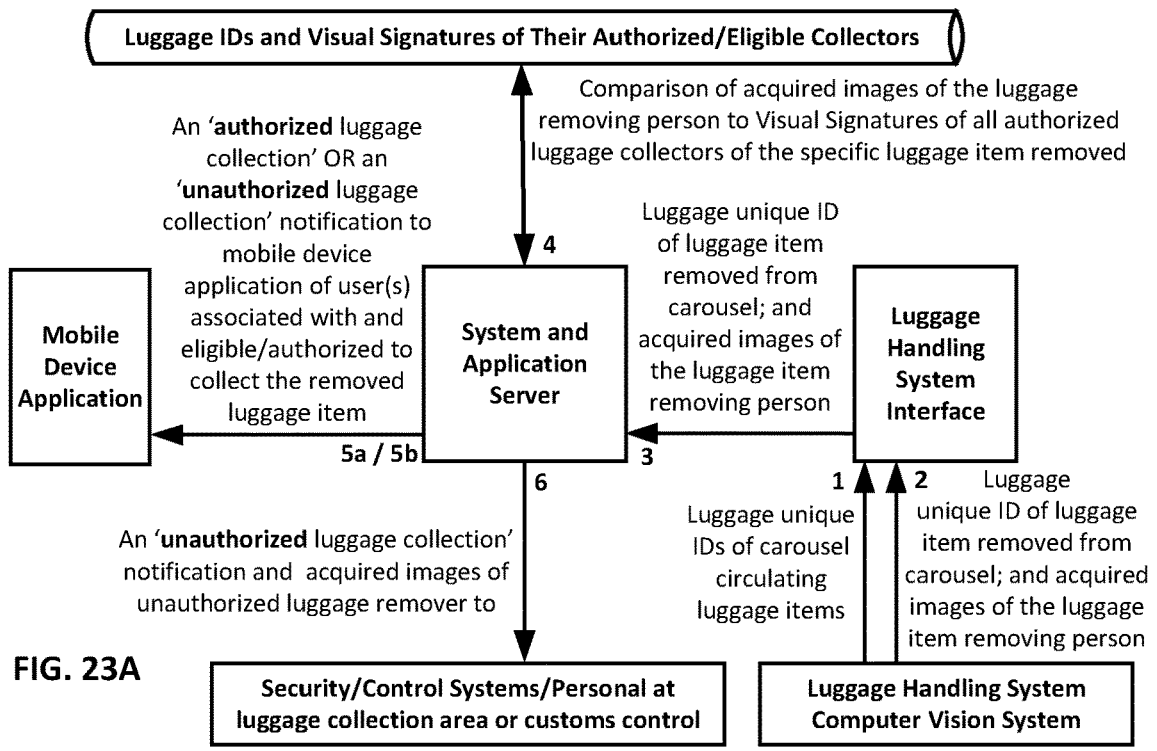
In FIG. 23A there is shown a block diagram of an exemplary luggage security system implementing a luggage item remover to authorized luggage collectors comparison solution as part of a luggage collection stage, in accordance with some embodiments of the present invention.

Reference is now made to FIG. 23A, where there is shown a block diagram of an exemplary luggage security system implementing a luggage item remover to authorized luggage collectors comparison solution as part of a luggage collection stage, in accordance with some embodiments of the present invention.

Figure 23B:
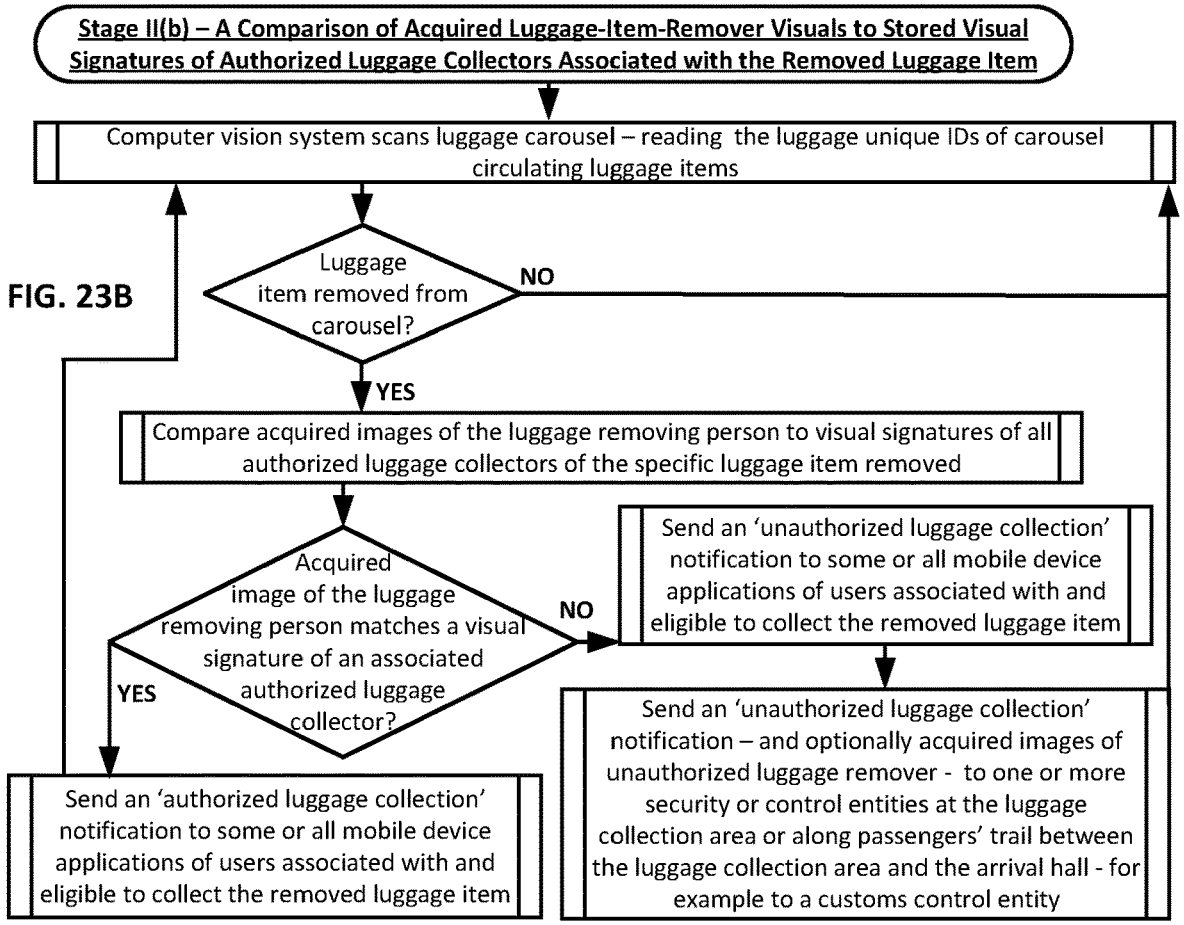
In FIG. 23B there is shown a flowchart of the main steps executed as part of an exemplary luggage item remover to authorized luggage collectors comparison process implemented by a luggage security system, in accordance with some embodiments of the present invention.

Reference is now made to FIG. 23B, where there is shown a flowchart of the main steps executed as part of an exemplary luggage item remover to authorized luggage collectors comparison process implemented by a luggage security system, in accordance with some embodiments of the present invention.

Figure 24A:
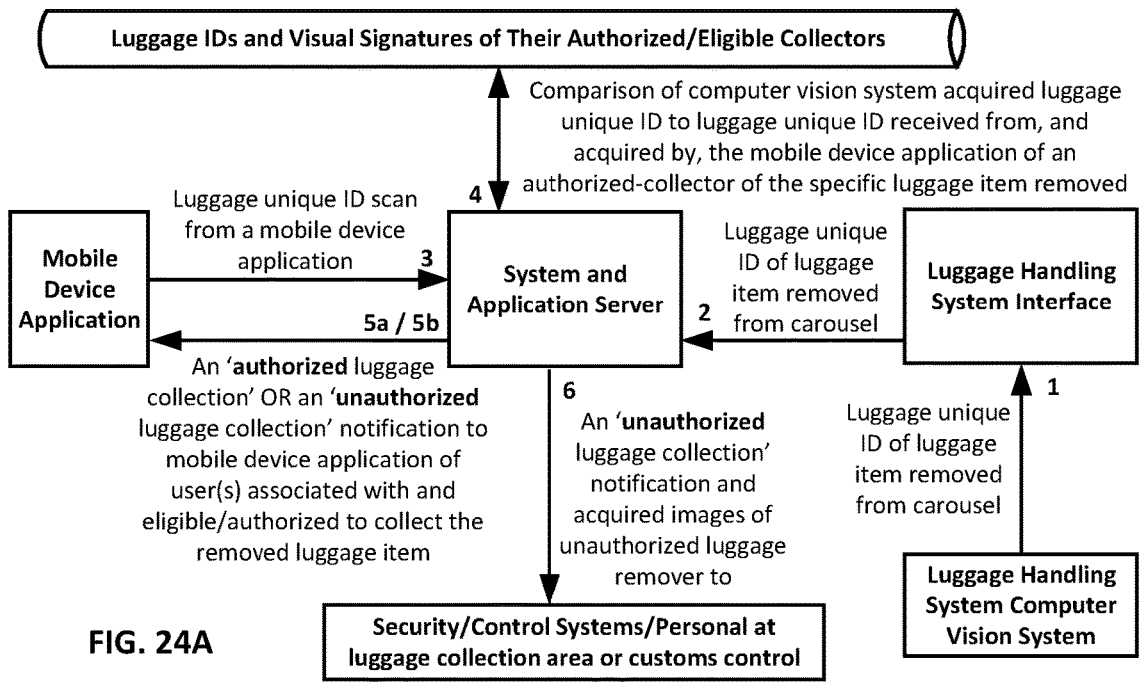
In FIG. 24A there is shown a block diagram of an exemplary luggage security system implementing a removed luggage item ID to user scanned luggage item ID comparison solution as part of a luggage collection stage, in accordance with some embodiments of the present invention; and In FIG. 24B there is shown a flowchart of the main steps executed as part of an exemplary removed luggage item ID to user scanned luggage item ID comparison process implemented by a luggage security system, in accordance with some embodiments of the present invention.

Reference is now made to FIG. 24A, where there is shown a block diagram of an exemplary luggage security system implementing a removed luggage item ID to user scanned luggage item ID comparison solution as part of a luggage collection stage, in accordance with some embodiments of the present invention.

Figure 24B:
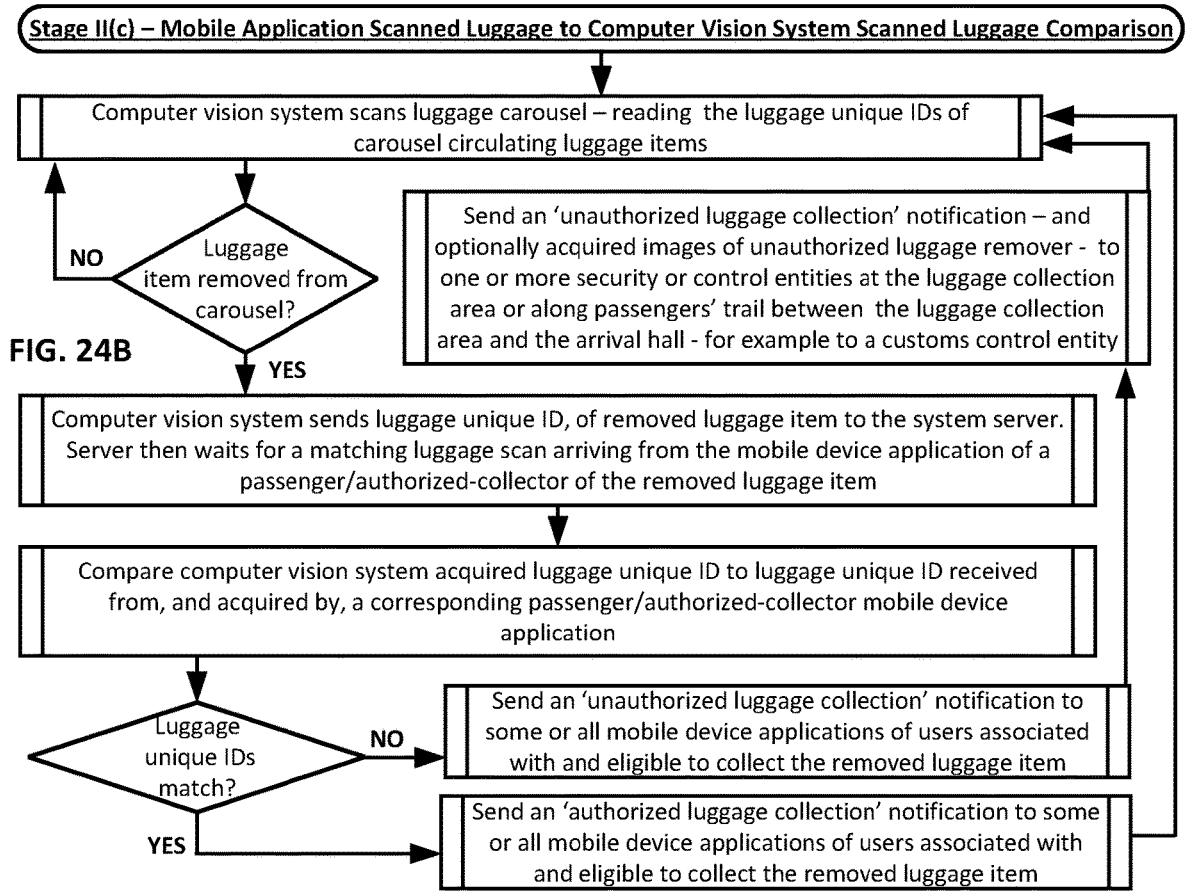

Reference is now made to FIG. 24B, where there is shown a flowchart of the main steps executed as part of an exemplary removed luggage item ID to user scanned luggage item ID comparison process implemented by a luggage security system, in accordance with some embodiments of the present invention.

According to some embodiments of the present invention, a system for dynamically routing a luggage item may include: a system server for receiving and associating each of a set of unique identifiers of luggage items with unique identifiers of passengers checking-in those luggage items; one or more luggage identifier acquisition devices, positioned along the routes of an arrival terminal's luggage handling system, to each acquire and relay to said system server the unique identifiers of luggage items mobilized through the luggage handling system, as they pass a specific one of said luggage identifier acquisition devices; said system server to send a notification to a passenger device application of a passenger having a unique passenger identifier that is associated with a unique luggage item identifier acquired by and received from said specific luggage identifier acquisition device; and wherein the notification includes an indication relating to the position of the luggage item along the routes of the arrival terminal's luggage handling system, based on the known position of said specific luggage identifier acquisition device.

According to some embodiments, the passenger notification may include a time prediction.

According to some embodiments, the system server may be further adapted to: receive a luggage routing instruction or selection communicated by said passenger device application; and relay one or more luggage routing requests, for applying on a luggage item associated with that specific said passenger device application from which the instruction or selection was communicated, to a controller of the luggage handling system for execution.

According to some embodiments, the routing instruction may be a luggage buffering request. According to some embodiments, the routing instruction may include a delivery destination.

According to some embodiments, the routing instruction may be selected from the group consisting of the following requests: a buffer luggage item for a selected time period request, a buffer luggage item until notified otherwise request, an on-demand request to release luggage item from buffering for passenger collection, a request to release luggage item from buffering for passenger collection within a selected time period or at a specific time, a request to deliver luggage item to a hotel, a carousel, a dispenser, or a terminal lounge, a request to deliver luggage item to a hotel, a carousel, a dispenser, or a terminal lounge at a specific time, and a request to deliver luggage item to a specific carousel or dispenser.

According to some embodiments, the luggage identifier acquisition devices may be cameras. According to some embodiments, the luggage identifier acquisition devices may be RFID interrogators. According to some embodiments, the luggage identifiers and the passenger identifiers may be acquired and communicated to the server by the passenger device application.

According to some embodiments, one or more of the luggage identifier acquisition devices may be positioned at, or at the proximity of, a luggage entry of a collection carousel of the luggage handling system; and the system server may be further adapted to send a luggage collection notification to a specific passenger device application associated with a luggage item identifier acquired by the luggage identifier acquisition device positioned at, or at the proximity of, a luggage entry of a collection carousel.

According to some embodiments, one or more of the luggage identifier acquisition devices and one or more cameras may be positioned in the proximity of a luggage collection carousel; and a luggage item identifier acquired by the one or more of luggage identifier acquisition devices and a passenger identifier acquired by the one or more cameras, may be communicated to the system server for a comparison to authenticate removers of luggage items as their authorized possessors.

According to some embodiments, the system server may be adapted to send a check-out request notification—a predetermined time period after—to a passenger device application of a passenger associated with a luggage item identifier acquired by the luggage identifier acquisition device positioned at, or at the proximity of, a luggage entry of a collection carousel.

According to some embodiments, the system server is further adapted to trigger an escalating protocol for check-out request notifications if a respond to the check-out request notification is not received within a predetermined time period.

According to some embodiments, the system may include a luggage identifier interrogator at a boundary of the arrival terminal to acquire and communicate to the system server the identifiers of passing luggage items; and wherein the system server is further adapted to reference, using the received identifier, a watch list of luggage items unreleased by their associated passengers and alert if the received identifier matches an unreleased luggage item in the list.

According to some embodiments, the system may include a luggage identifier interrogator at a boundary of the arrival terminal to acquire and communicate to said system server the identifiers of passing luggage items and passing passengers; and wherein the system server is further adapted to compare acquired pairs of luggage items and passenger identifiers and alert of luggage item identifiers having no match.

According to some embodiments, at least some of the unique luggage identifiers may be embedded as part of a luggage add-on contactable to a luggage item. According to some embodiments, at least some of the unique luggage identifiers may be based on one or more characteristics of the luggage item.

According to some embodiments of the present invention, a method for dynamically routing a luggage item may include: receiving and associating each of a set of unique identifiers of luggage items with unique identifiers of passengers checking-in those luggage items; acquiring and relaying unique identifiers of the luggage items as they are mobilized through a luggage handling system and pass upon a luggage identifier acquisition device; notifying a passenger device application of a passenger having a unique passenger identifier that is associated with a unique luggage item identifier acquired and relayed by the luggage identifier acquisition device; wherein the notification includes an indication relating to the position of the luggage item along the routes of the luggage handling system, based on the known position of the luggage identifier acquisition device by which the luggage item identifier was relayed.

The subject matter described above is provided by way of illustration only and should not be constructed as limiting. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A system for dynamically routing a luggage item, said system including:
   a system server for receiving and associating each of a set of unique identifiers of luggage items with unique identifiers of passengers checking-in those luggage items;
   one or more luggage identifier acquisition devices including a camera, positioned along the routes of an arrival terminal's luggage handling system, to each acquire and relay to said system server the unique identifiers of luggage items mobilized through the luggage handling system, as they pass a specific one of said luggage identifier acquisition devices; and
   wherein said specific luggage identifier acquisition device is positioned at, or at the proximity of, a luggage entry of a collection carousel of the luggage handling system, and said system server is further adapted to:
   send a luggage collection notification, indicating entry of a luggage item onto a collection carousel or a collection device of the luggage handling system, to a passenger mobile communication device application of a passenger having a unique passenger identifier that is associated with the unique luggage item identifier acquired by said specific luggage identifier acquisition device;
   send a check-out request notification—a predetermined time period after sending the luggage collection notification—to said passenger mobile communication device application;
   trigger an escalating protocol of one or more additional check-out request notifications if a response to the check-out request notification is not received within a predetermined time period; and
   receive and apply a luggage routing instruction communicated by said passenger mobile communication device application to a luggage item associated with that specific said passenger mobile communication device application from which the luggage routing instruction was sent.

2. The system according to claim 1, wherein the routing instruction is a luggage buffering request.

3. The system according to claim 1, wherein the routing instruction includes a delivery destination.

4. The system according to claim 1, wherein routing instruction is selected from the group consisting of the following requests: a buffer luggage item for a selected time period request, a buffer luggage item until notified otherwise request, an on-demand request to release luggage item from buffering for passenger collection, a request to release luggage item from buffering for passenger collection within a selected time period or at a specific time, a request to deliver luggage item to destination outside the arrival terminal, a carousel, a dispenser, or a terminal lounge, a request to deliver luggage item to a destination outside the arrival terminal, a carousel, a dispenser, or a terminal lounge—at a specific time, and a request to deliver luggage item to a specific carousel or dispenser.

* * * * *